(12) United States Patent
Roach et al.

(10) Patent No.: US 8,483,473 B2
(45) Date of Patent: Jul. 9, 2013

(54) SYSTEMS AND METHODS FOR OBTAINING FINANCIAL OFFERS USING MOBILE IMAGE CAPTURE

(71) Applicants: John J. Roach, San Diego, CA (US); Grisha Nepomniachtchi, San Diego, CA (US); Robert Couch, Poway, CA (US); Mikhail Avergun, San Diego, CA (US)

(72) Inventors: John J. Roach, San Diego, CA (US); Grisha Nepomniachtchi, San Diego, CA (US); Robert Couch, Poway, CA (US); Mikhail Avergun, San Diego, CA (US)

(73) Assignee: Mitek Systems, Inc., San Diego, CA (US)

( * ) Notice: Subject to any disclaimer, the term of this patent is extended or adjusted under 35 U.S.C. 154(b) by 0 days.

(21) Appl. No.: 13/663,450

(22) Filed: Oct. 29, 2012

(65) Prior Publication Data

US 2013/0051610 A1 Feb. 28, 2013

Related U.S. Application Data

(63) Continuation-in-part of application No. 12/906,036, filed on Oct. 15, 2010, which is a continuation-in-part of application No. 12/778,943, filed on May 12, 2010, and a continuation-in-part of application No. 12/346,026, filed on Dec. 30, 2008, now Pat. No. 7,978,900.

(60) Provisional application No. 61/022,279, filed on Jan. 18, 2008.

(51) Int. Cl.
*G06K 9/00* (2006.01)
*G06Q 40/00* (2012.01)

(52) U.S. Cl.
USPC .............................. 382/137; 235/379; 705/39

(58) Field of Classification Search
USPC ........ 382/100, 137–140; 705/39–45; 235/379
See application file for complete search history.

(56) References Cited

U.S. PATENT DOCUMENTS

| 7,950,698 | B2 * | 5/2011 | Popadic et al. | 283/70 |
| 8,025,226 | B1 * | 9/2011 | Hopkins et al. | 235/384 |
| 8,109,436 | B1 * | 2/2012 | Hopkins, III | 235/380 |
| 8,370,254 | B1 * | 2/2013 | Hopkins et al. | 705/39 |
| 2008/0306787 | A1 * | 12/2008 | Hamilton et al. | 705/7 |

* cited by examiner

*Primary Examiner* — Shefali Goradia
(74) *Attorney, Agent, or Firm* — Procopio, Cory, Hargreaves & Savitch LLP; Noel C. Gillespie

(57) ABSTRACT

Systems and methods for applying for and creating balance transfers with a mobile device are provided. An image of a customer's financial statement can be taken using a mobile device, after which the image is analyzed to extract information relevant to creating a balance transfer. The extracted information is then communicated to a bank over a network connected with the mobile device, where the bank can process the information and create an offer to the customer for a balance transfer in real-time. An example financial statement is a credit card statement. These systems and methods may comprise capturing an image of a document using a mobile communication device; transmitting the image to a server; detecting relevant information within the image; transmitting the information to a bank; and transmitting a resulting balance transfer offer from the bank to the mobile device.

19 Claims, 54 Drawing Sheets

Mobile Device Processing

Server Side Processing

Image Correction Module

Detect Document in Image

Convert original color image into smaller color image (color "icon" image)

The check in this image is intentionally depicted in landscape orientation.

Document Processing

Check Processing

This figure is intentionally blurry.

This figure is intentionally blurry.

This figure is intentionally blurry.

Test Document Contrast

This figure is intentionally blurry.

Test Document Skew

Cut-Off Corner Test

This figure is intentionally blurry.

Warped Image Test

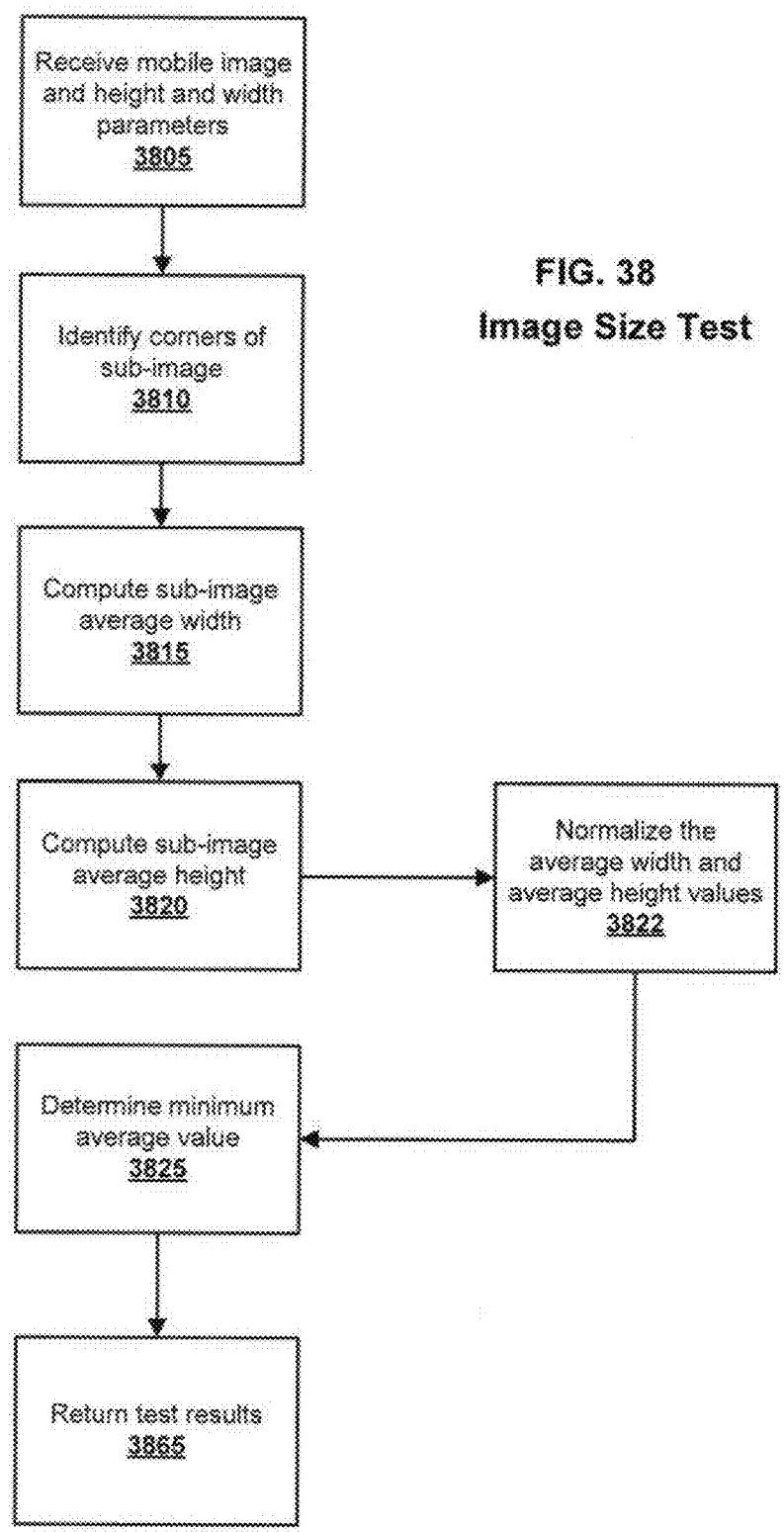

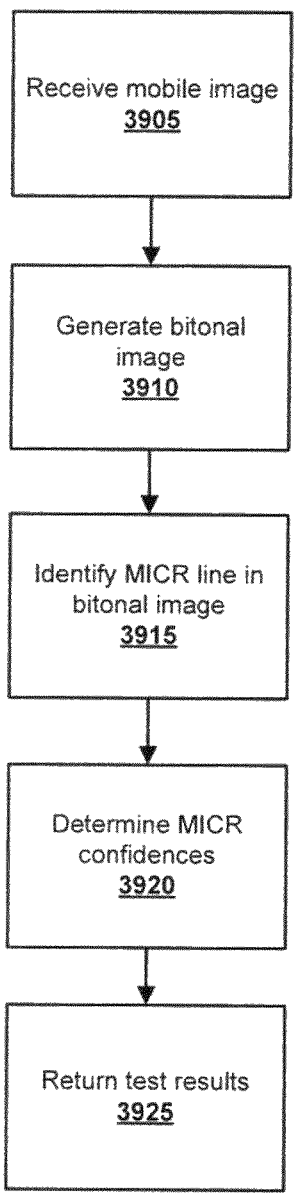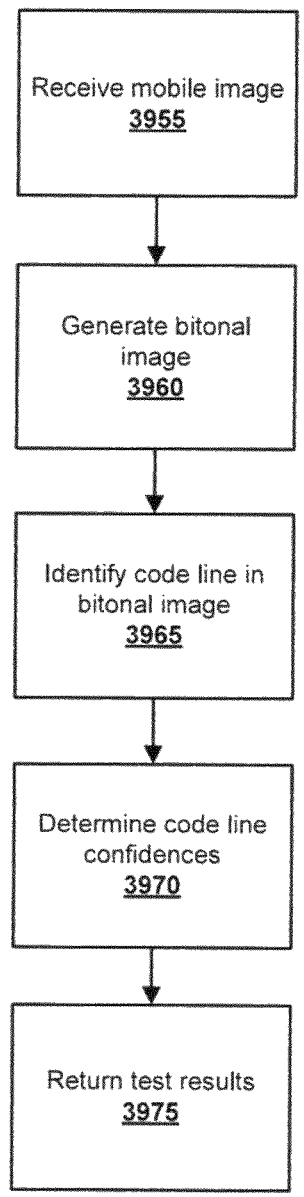
FIG. 39A
MICR-line Test
FIG. 39B
Code line Test

Aspect Ratio Test
For Two-Side Documents

Front-as-Rear Test

Form Identification
and Data Extraction

Dynamic Data Capture

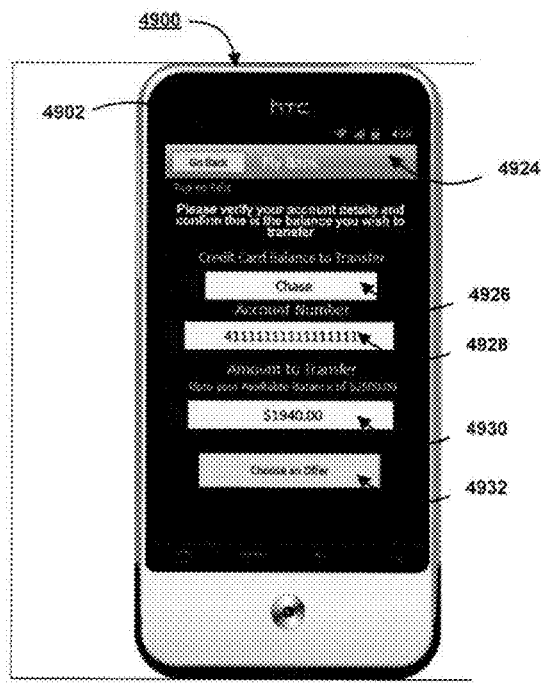 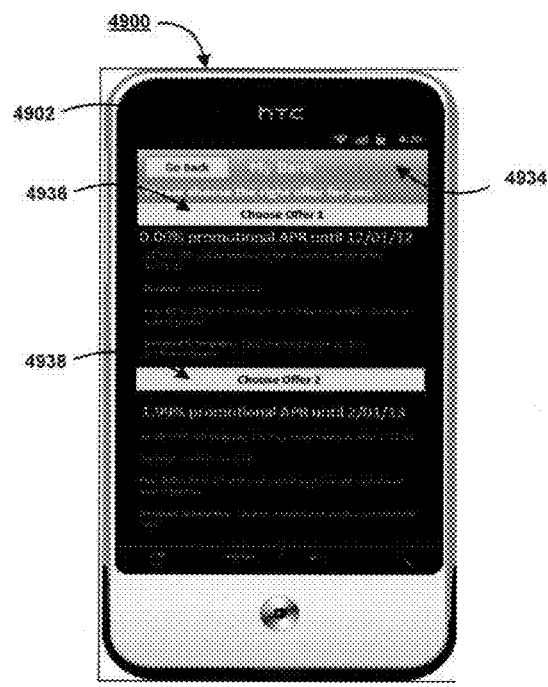
FIG. 49EFIG. 49F

SYSTEMS AND METHODS FOR OBTAINING FINANCIAL OFFERS USING MOBILE IMAGE CAPTURE

RELATED APPLICATIONS INFORMATION

This application is a continuation in part of U.S. patent application Ser. No. 12/906,036, filed on Oct. 15, 2010, which in turn claims priority as a continuation-in-part of U.S. patent application Ser. No. 12/778,943, filed on filed May 12, 2010, as well as a continuation in part of U.S. patent application Ser. No. 12/346,026 filed on Dec. 30, 2008, now U.S. Pat. No. 7,978,900, which in turn claims the benefit of U.S. Provisional Application No. 61/022,279, filed Jan. 18, 2008, all of which are incorporated herein by reference in their entirety as if set forth in full. This application is also related to U.S. patent application Ser. No. 12/717,080 filed Mar. 3, 2010, which is now U.S. Pat. No. 7,778,457, which is incorporated herein by reference in its entirety as if set forth in full.

BACKGROUND

1. Technical Field

The embodiments described herein generally relate to automated document processing of financial document images captured by a mobile device, and more particularly to systems and methods for mobile document image processing of a financial statement which extracts and sends information to a financial institution for generating an offer for the transfer of money to another financial account.

2. Related Art

Financial institutions which issue credit cards frequently offer a service known as a balance transfer, where a customer with a balance due on a credit card can transfer some or all of the outstanding balance from one credit card to another credit card. Customers typically transfer balances from one card to another to obtain a lower interest rate, more favorable payment schedule, or other benefits offered by a credit card for carrying a balance with a particular financial institution. A balance transfer may also be similar to a cash advance, where a customer can transfer a sum of money from their credit card into their bank account, resulting in a balance due on the credit card but giving the customer cash in their bank account.

In some situations, the customer already holds the credit card where the balance is being transferred, while in other situations, the customer may be opening a new credit card and transferring a balance to the new credit card. Banks often compete with other banks to advertise lower interest rates and favorable payment terms on a balance transfer. However, it is often difficult for a customer to find out which balance transfer offers are available and what the terms of the balance transfer will be, as many balance transfer terms are dependent on the amount of the balance being transferred or the credit rating of the customer.

The balance transfer process is cumbersome for both the customer and the bank. The customer must obtain several different pieces of information, including the customer's name, contact information, credit card number, the current balance and the applicable interest rates that are applicable to the balance. If the balance is being transferred to a bank account, other information may be needed, such as a bank account number and routing number. A bank may also want to evaluate the credit history of the customer to determine whether to accept the balance transfer application, in which case the customer will need to provide even more information, such as a social security number, driver's license number or additional financial information.

Once this information is entered into an application for a balance transfer, the receiving bank evaluates the information to determine whether to accept the balance transfer request. This process may take a significant amount of time—generally several days. Once accepted, it may take several more day or even weeks before the money is transferred.

Therefore, there is a need for streamlining the process of applying for and processing financial offers, such as credit card balance transfers.

SUMMARY

Systems and methods are provided for creating an offer to transfer money based on information from an image of a financial statement captured by a mobile device. A user captures an image of a financial statement with the mobile device, and the captured image is processed to identify information relevant to creating an offer for transferring money from one financial institution to another. The relevant information is used by a financial institution to create an offer for the user to transfer money to the financial institution. The offer may be transmitted to the user in real-time, such that the user receives an offer almost immediately after capturing the image of the financial statement. By obtaining relevant information directly from the financial statement, the financial institution can prepare an offer which is competitive with the user's current financial institution. The financial statement also provides information about the user which can be used to perform credit checks or other background checks on the user which may influence the offer that the user receives. The financial document may be any type of financial statement, for example, a credit card statement.

According to one embodiment, a computer implemented method for processing balance transfers using a mobile device is provided where one or more processors are programmed to perform steps of the method. The steps of the method include receiving a mobile image of a financial statement captured with the mobile device; extracting information from the mobile image; transmitting the information to a remote server; creating a balance transfer offer based on the information; and transmitting the balance transfer offer to the mobile device.

According to another embodiment, a system for processing balance transfers using a mobile device is provided. The system includes a receiving unit which receives a mobile image of a financial statement captured with the mobile device; an extraction unit which extracts information from the mobile image; a communication unit which transmits the information to a remote server; and a calculation unit at the remote server which creates a balance transfer offer based on the information; wherein the communication unit receives the balance transfer offer from the calculation unit and transmits the balance transfer offer to the mobile device.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

The various embodiments provided herein are described in detail with reference to the following figures. The drawings are provided for purposes of illustration only and merely depict typical or example embodiments. These drawings are provided to facilitate the reader's understanding of the invention and shall not be considered limiting of the breadth, scope, or applicability of the embodiments. It should be noted that for clarity and ease of illustration these drawings are not necessarily made to scale.

FIG. 38 is a flow diagram of a process that for performing an Image Size Test on a subimage according to an embodiment.

FIG. 39A is a flow chart of a method for executing a MICR-line Test according to an embodiment.

FIG. 39B is a flow chart of a method for executing a code line Test according to an embodiment.

FIGS. 49A-J illustrate aspects of a balance transfer application that uses an image of a financial statement captured by a mobile device, according to an embodiment.

DETAILED DESCRIPTION

Figure 1:
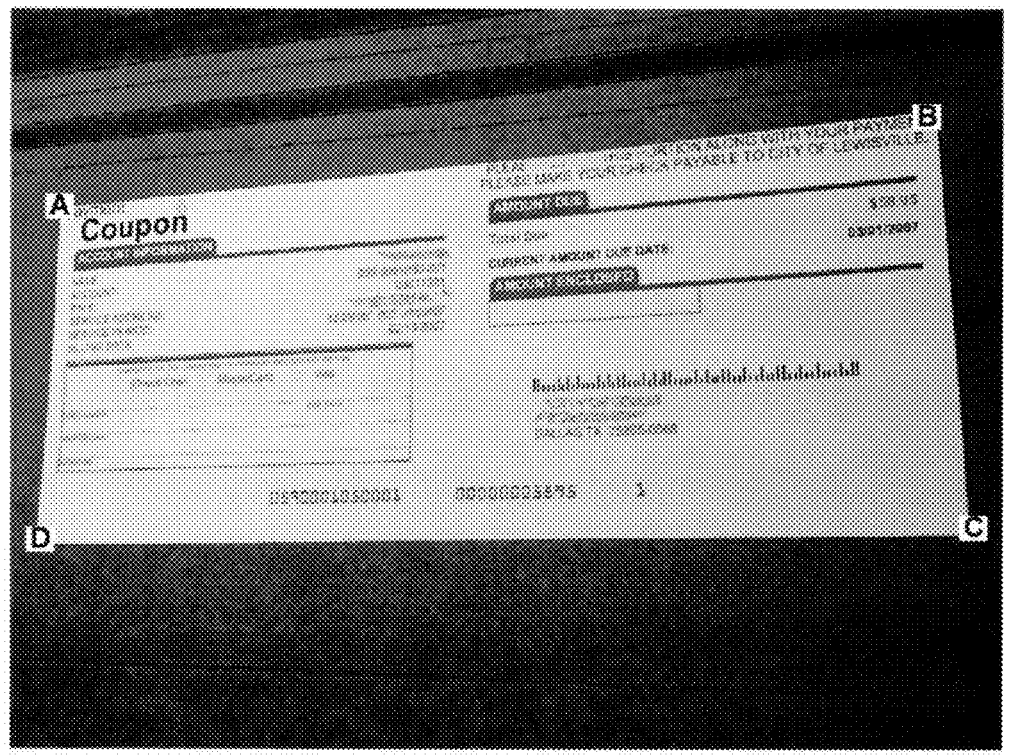
FIG. 1 is an image of a remittance coupon 100 illustrating an example remittance coupon that might be imaged with the systems and methods described herein.

The embodiments described herein are directed towards automated document processing, and systems and methods for obtaining financial information from a financial document using a camera on a mobile device. More specifically, system and methods are provided for processing an image of a credit card statement captured using a mobile device to obtain information which is transmitted to a financial institution to create a balance transfer offer. Image processing techniques extract specific categories of information from the financial statement which are needed to prepare a balance transfer offer, and this information is then transmitted to a remote server where the extracted information is used to prepare the balance transfer offer. The balance transfer offer is then transmitted back to the mobile device and displayed to a user to evaluate whether the offer should be accepted. The financial document may be a credit card statement, although the type of financial statement should not be limited thereto.

The methods may be completed in real-time so that a user may instantly receive a balance transfer offer after uploading the financial statement image, thereby avoiding the need to manually enter the information needed for a balance transfer application and additionally avoiding the lengthy wait times typically experienced in processing a balance transfer application and offer.

Balance Transfer

In one embodiment, mobile balance transfer processing includes image capture of a financial statement with a mobile device and communication of extracted information to a bank to provide real-time balance transfer offers. Embodiments of the systems and methods described herein provide image optimization and enhancement such that data can be extracted from the image of the financial statement without requiring a user to physically enter the data into an application. Software running on the mobile device may identify relevant information on the financial statement which is needed for applying for and processing a balance transfer. Information extracted from the financial statement may also be used to more accurately determine the content of the financial document, such as an account number, biller, balance, etc.

Once the needed information is obtained from the financial document, the relevant information is then sent over a network to a bank for processing, where the bank can determine what type of balance transfer offer to send to the customer. The bank can then communicate the offer in real-time to the customer, and the customer can immediately accept the offer. The entire process of applying for a balance transfer, receiving an offer, and accepting the offer can therefore be significantly shortened.

Some embodiments described herein involve a mobile communication device capturing an image of a document and transmitting the captured image to a server for image optimization and enhancement. In some embodiments, the extraction of relevant information from the financial statement can be implemented on a remote server, such as a mobile phone carrier's server or a web server, such that the mobile device routes the mobile image to be assessed to the remote server. Optional processing parameters may be sent to the remote server, and the test results can be passed from the remote server to the mobile device.

In other embodiments, the optimization and enhancement of the captured image may be performed on the mobile device, and information from the remote server may be obtained to more accurately determine the content of the financial document without requiring transmission of the captured image to a remote server. The captured image may therefore be significantly paired down before being transmitted to the remote server for extracting specific content, or the captured image may not need to be transmitted to the remote server.

Figure 47:
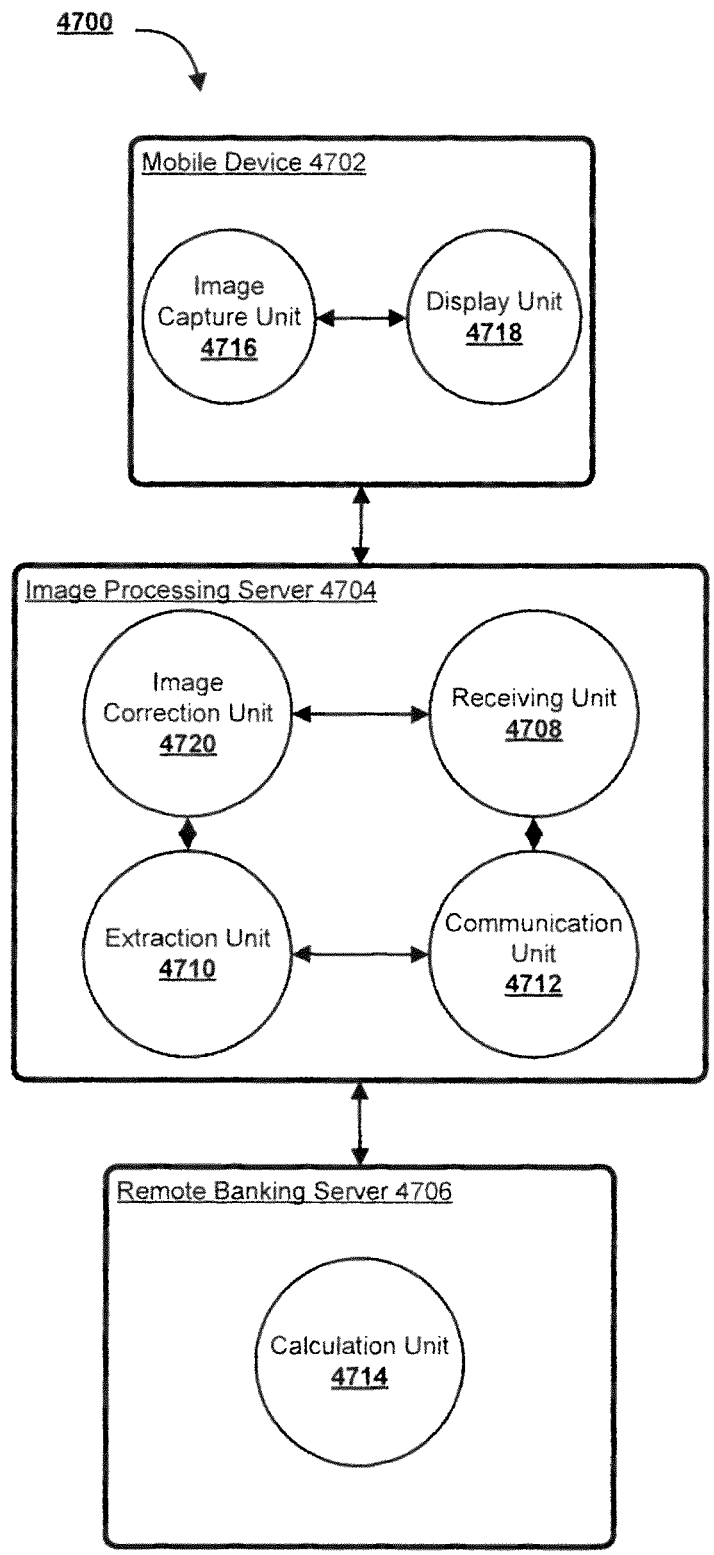
FIG. 47 is a block diagram of a system balance transfer processing using mobile image capture, according to an embodiment.

In one embodiment, a system and method for processing balance transfers begins first with the capture of a mobile image of a financial statement using a mobile device 4702, as illustrated in FIG. 47. The mobile device, such as a cell phone, smartphone, tablet or laptop, will capture the mobile image of a financial statement using an image capture unit 4716, such as a camera on or attached with the mobile device. The image capture unit 4716 may also include software which a user interacts with to capture the mobile image and transmit the mobile image to an image processing server 4704. The mobile image could be a single image captured all at once or a series of smaller images of the financial statement which are combined into a single, larger image which provides clear resolution of the entire financial statement. Several pre-processing steps may be performed on the mobile image at the mobile device, which are described separately below.

In one embodiment, the mobile image is then transmitted from the mobile device 4702 to an image processing server 4704 to process the mobile image and extract information that is needed for determining an offer for a balance transfer. A receiving unit 4708 receives the mobile image from the mobile device 4702. An extraction unit 4710 will then process the mobile image to determine the content of the financial statement, including information that is needed to complete a balance transfer application process and generate a balance transfer offer. The information may include a balance (the amount a user owes on the credit card), an account number, regex number or BIN number to identify the bank or issuer of the credit card, one or more interest rates that the user is being charged on the balance, a yield indicating the percentage or amount that a balance has increased (for a retirement account), a fee, a cost, a user's name, address, phone number or e-mail address. Additional information, such as a credit card number, a bank account number, routing number, etc. may be extracted in order to expedite the processing of the balance transfer offer. Information may be obtained from the account number, regex number or BIN number which may be used to more accurately obtain content from the financial statement, as will be described in further detail below. The extraction unit 4710 may also extract date information to determine whether the outstanding balance is current or determine when a particular interest rate on the outstanding balance will change. The extraction unit 4710 identifies different fields on the financial statement which will include the information needed, such as a credit card number field, an account number field, a balance field, an interest rate field, a bank account number field, a routing number field, a yield field, a fee field, a cost field, a user name field, a user address field, a user phone number field and a user e-mail field. The identification of these fields from the mobile image of the financial statement is described further below with regard to identifying an issuer or owner and with regard to obtaining information from remittance coupons.

In one embodiment, the processing of the mobile image may first include an image correction unit 4720 which corrects abnormalities in the mobile image that would prevent the extraction unit 4710 from determining the fields and the information contained within the fields on the financial statement. An explanation of the image corrections that may be applied by the image correction unit 4720 are described in further detail below.

The information extracted from the mobile image by the extraction unit 4710 is then provided to a communication unit 4712, which transmits the extracted information from the image processing server to a remote server 4706. The remote server 4706 may be owned or operated by a financial institution, such as a bank or credit card issuer, which considers the information in order to make a balance transfer offer to the user.

In one embodiment, the components of the image processing server 4704 may be incorporated within the mobile device 4702, such that all of the image capture, image processing and content extraction steps may be performed at the mobile device 4702. Only the extracted content relevant to creating a balance transfer would need to be transmitted to the remote banking server 4706.

The information needed to create a credit card balance transfer may include the credit card number, the outstanding balance on the credit card, and an interest rate on the outstanding balance. The financial institution may consider the outstanding balance and the current interest rate to determine whether it can offer the user a balance transfer offer for the user to transfer some or all of the outstanding balance to a credit card of the financial institution. In one embodiment, a calculation unit 4714 on the remote banking server 4706 takes the extracted information and compares it with a database or table of information to determine whether a balance transfer offer that can be made and, if so, the terms of the offer. The database or table of information may include programmed parameters for balance transfers that can be offered based on the financial institution's opinions or analysis of whether a balance transfer will be profitable or too risky. The stored database or table of information will also be compared with the extracted information from the financial statement to determine whether the interest rate being charged on the credit card can be lowered and whether the entire outstanding balance can be transferred.

A credit card balance transfer offer may have a proportional relationship between an interest rate and an amount to be transferred, with a lower interest rate being offered for a larger transferred balance, and a higher interest rate being offered for a lower transferred balance. Further, the length of time for which an interest rate will be applied will also factor into the balance transfer offer, and may also depend on stored information at the remote server 4706 as well as extracted information from the credit card statement which indicates the length of time that a current interest rate is being applied. A balance transfer offer may have a proportional relationship between an interest rate and a length of time that the interest rate will be applied, with a lower interest rate being offered for a shorter period of time, and a higher interest rate being offered for a longer period of time.

In one embodiment, a plurality of balance transfer offers may be created to allow a user to compare and evaluate different types of offers which may be better suited to their particular financial situation. The plurality of balance transfer offers may all come from a single financial institution, or may originate from multiple different financial institutions which each receive the extracted information and make separate decisions on the types of balance transfer offers to make. The user will then receive multiple offers to consider.

In one embodiment, the calculation unit 4714 may also obtain credit history information about the user when determining a balance transfer offer. The credit history information may be obtained by using information about the user obtained from the financial statement, such as the user's name, address, phone number, social security number, etc., or by requesting additional information from the user through prompts presented to the user at the mobile device. The additional information may include a social security number or driver's license number. The credit history may include information on the user's other credit card balances and debts, accounts and respective balances, payment history of debts, or an overall credit score representing the user's credit worthiness. The credit history information may be used to evaluate the type of balance transfer offer to provide the user. For example, a customer with poor credit history, such as missed payments, high debt balances and low account balances may receive a credit card balance transfer offer with a higher interest rate and a lower maximum allowed transfer amount. By contrast, a customer with an excellent credit rating and large balances in their checking and other retirement accounts might receive a balance transfer offer with a lower interest rate and larger maximum allowed transfer amount.

In one embodiment, the decision on the type of balance transfer offer to make may be made using information stored at the remote server 4706 and obtained from the financial statement. The extracted information and stored information may be evaluated using a number of proprietary algorithms or tables which can quickly input the extracted information and output a corresponding balance transfer offer. The creation of a balance transfer offer can therefore be completed instantaneously upon receipt of the extracted information from the financial statement, so that the user can receive a balance transfer offer in real-time.

Once the balance transfer offer has been created, the balance transfer offer is communicated back to the mobile device 4702 from the remote server 4706, and the balance transfer offer may then be displayed to the user with a display unit 4718 on the mobile device 4702. The display unit 4718 may include a display screen to display the balance transfer offer, or an audio device to read the balance transfer offer to the user. In one embodiment, the balance transfer offer may be communicated from the remote server 4706 through the image processing server 4704 and subsequently to the mobile device 4702; however, in the embodiment described above where image processing takes place on the mobile device 4702, the balance transfer offer may be transmitted directly from the remote banking server 4706 to the mobile device 4702.

Figure 48:
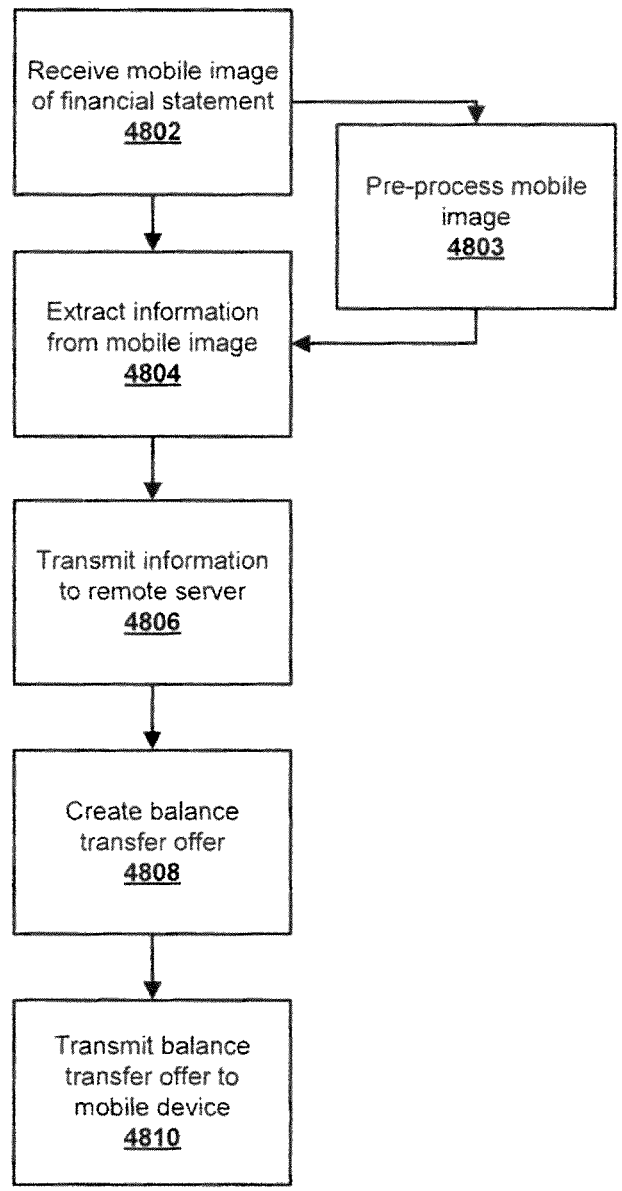
FIG. 48 is a block diagram of a method of balance transfer processing using mobile image capture, according to an embodiment.

FIG. 48 illustrates one embodiment of a method of creating balance transfer offers using an image of a credit card statement captured by a mobile device. In a first step 4802, the mobile image of the financial statement is received. The information relevant to creating a balance transfer offer is then extracted from the mobile image in step 4804. The extracted information is then transmitted to a remote server in step 4806, where a balance transfer offer is created (step 4808). The balance transfer offer is then transmitted to the mobile device in step 4810. The additional step of processing the mobile image to correct the image before extracting the information (step 4803) is also illustrated.

FIGS. 49A-J illustrate one embodiment of a user interface workflow which would be displayed on the mobile device during a mobile balance transfer process application based on an image of a credit card remittance coupon captured by a mobile device. The screen shots shown in FIGS. 49A-J depict graphical user interfaces displayed for a pre-existing credit card customer that is logging into a bank's mobile application and being presented with the option to make a balance transfer to established credit card accounts.

Figure 49A:
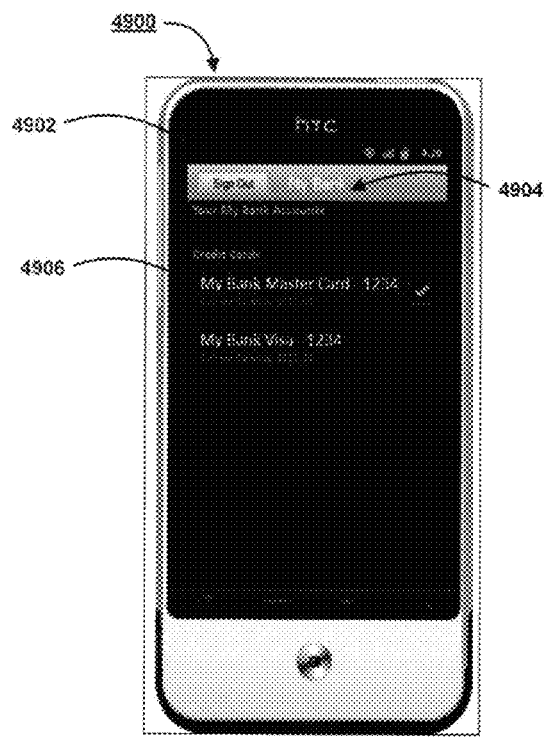

In one embodiment, a user of a mobile device will first launch a mobile banking application on a mobile device 4900 with a display screen 4902, which may be associated with a particular bank or financial institution where the user has an account. Alternatively, the application may be able to access information on all bank and credit card accounts that the user has with multiple banks and financial institutions. The application may be stored on the mobile device or be web-based and operated through a web browser application accessing the application over a network. FIG. 49A shows a main menu 4904 with a list of accounts that the user has with one or more banks. The menu shows a credit card account 4906 with credit card information that can be pulled from the Bank's middle tier server. If the credit card account 4906 is selected by the user, the user will then proceed to the Credit Card Main Menu 4908 in FIG. 49B.

Figure 49B:
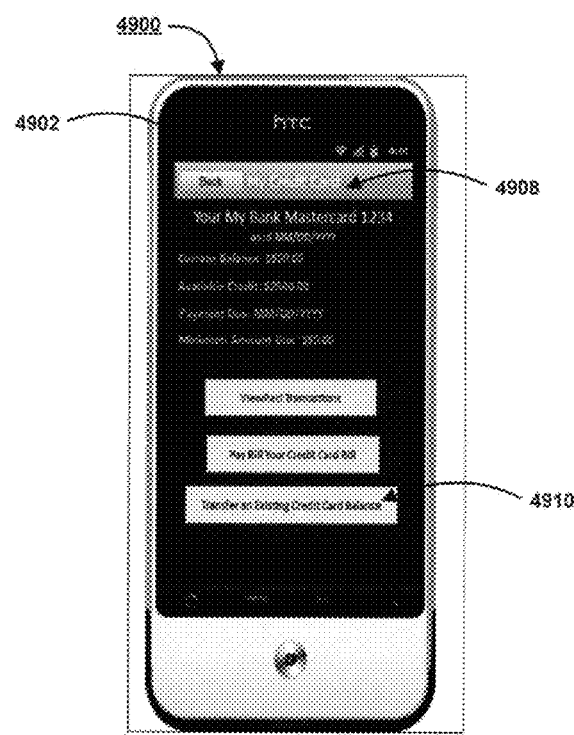

FIG. 49B shows the Credit Card Main Menu 4908. In this embodiment, the Credit Card Main Menu includes information about Current Balance, Available Credit, Payment Due, and Minimum Amount Due. This information can also be pulled from the Bank's middle tier mobile server. The information may be pulled from the Bank's middle tier mobile server when the user logs in. The user can select from one of several options represented by different graphical block icons, including a Transfer Balance button 4910. Icons for one or more of the selectable functions may be enhanced to grab the user's eye, for example, when a high-level offer is available. From the Credit Card Main Menu, as with most other menus, the user has the ability to go back to previous screens.

Figure 49C:
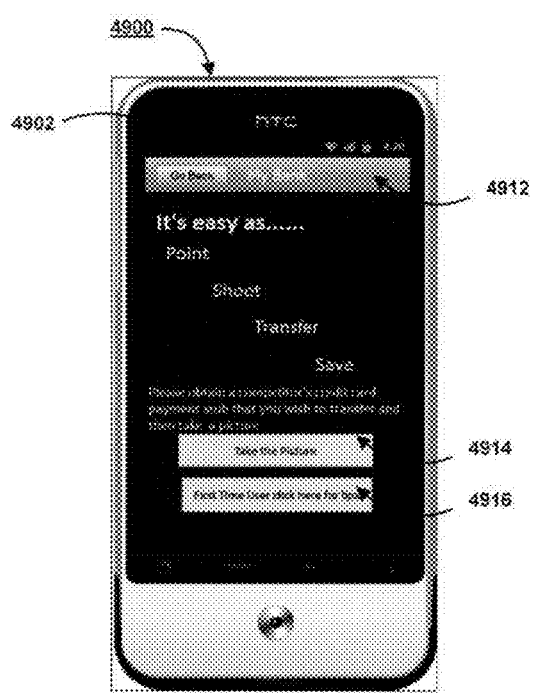
Figure 49D:
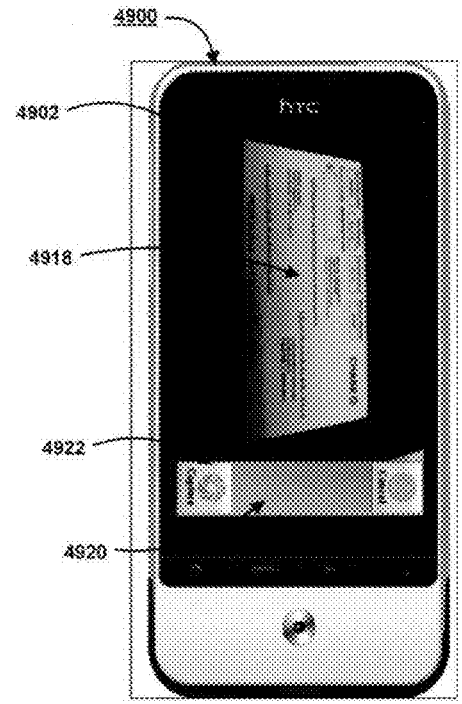

If the user selects the Transfer Balance button 4910, the Transfer Balance Main Menu 4912 appears, as illustrated in FIG. 49C. At the Transfer Balance Main Menu 4912, the user is presented with basic instructions and a picture button 4914 to initiate taking a picture of the credit card statement or a help button 4916 to view tips for how the process works. The picture button 4914 transfers the user to a photo capture function, as shown in FIG. 49D. The help button 4916 may include a list of tips for taking the picture or an audio or video tutorial of the entire balance transfer process.

FIG. 49D shows a photo capture function where an image capture device such as a camera has been activated so the user can take a picture of the credit card statement. In this embodiment, the display screen 4902 shows a live view of the viewpoint of the image capture device so the user can easily see what the image capture device will capture when a photo is taken. A credit card statement 4918 is shown, along with a camera control menu 4920 including camera controls to control the camera functions. When the user aligns the image capture device to take a good image of the entire credit card statement 4918, the user can select the "capture" button 4922 to have the camera capture an image.

Once the image has been captured, the captured image will then go through the previously-described steps of performing one or more image correction steps to clean up the image and ensure that it is machine readable by an optical character recognition (OCR) program that will be used to extract the content of the credit card bill. Once the image correction steps are complete, the content will be extracted during one or more extraction steps (described below).

The extracted content relevant to the balance transfer is then displayed to the user on an initial capture screen 4924, as illustrated in FIG. 49E. In one embodiment, a name field 4926 of the name of the credit card, an account number field 4928 with the credit card account number and a total balance field 4930 with the total balance on the credit card are displayed to the user so the user can review and confirm the information obtained from the image. The user may be given the option to edit any of the information by manually entering new text into the fields shown. The information can be changed by conventional techniques. Payee address information is returned by the server but not displayed at the current menu. The user's current balance is also shown. This balance will match the balance the user saw at the Credit Card Main Menu. The application displays the total balance due that was read off a coupon of the user. If the total amount due is greater than the available balance the application will change the amount to transfer to the user's available balance. A pop up message may also be displayed that warns the user that the Amount to Transfer exceeded the Available Balance and was modified to their available balance. If the user modifies the amount and enters an amount greater than their current available balance, the application will present another warning message, such as "Amount to transfer cannot be greater than your current available balance." The balance transfer application does not allow the user to proceed until the Amount to Transfer is less than or equal to their available balance. Additionally, all fields are required to have data in them for the user to move on.

If the correct information is displayed, the user can select the "Choose an Offer" button 4932 to see a Balance Transfer Offer Menu 4934, as shown in FIG. 49F. The illustrated screen displays a first balance transfer offer 4936 along with details of the offer and a second balance transfer offer 4938 along with corresponding details. A plurality of different offers may be shown, and the user may have the option to select an offer to view more details of the offer before deciding on a particular offer. The offers may be static or may be pulled from a server. Both offers will be live. Additional information may be displayed regarding the offers, such as an amount of money that the user will save by transferring the balance, or a comparison chart of the offers and the potential money the user will save for each offer in comparison to their current credit card balance and interest rate.

Figure 49G:
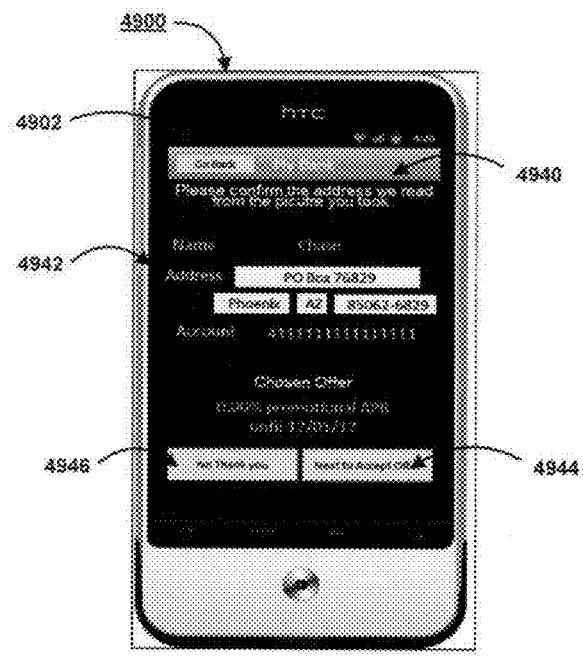
Figure 49H:
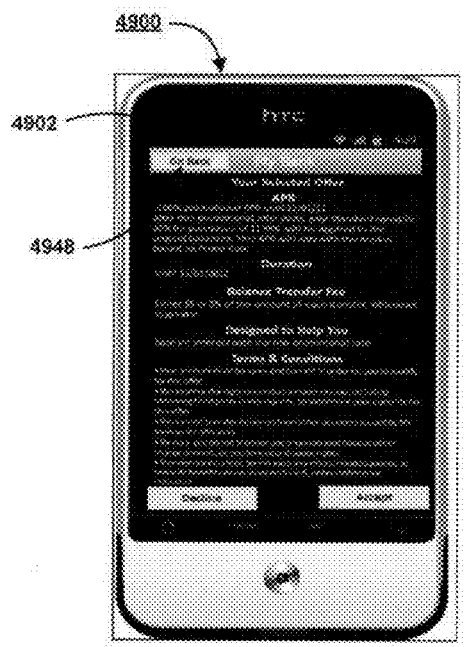

FIG. 49G shows an Offer Confirmation Menu 4940, which displays the offer the user chooses on the previous Balance Transfer Offer Screen 4934. The Offer Confirmation Menu 4940 may also include and address field 4942 with the address of the credit card company that the balance is being transferred from, as this address is needed by the bank that is receiving the balance in order to "pay" the bank that the balance is being transferred from. The user can then verify that the correct address was extracted from the credit card statement. The address field is editable in case the user wishes to change the information. All fields are required to have data in them for the user to move on in the balance transfer process. The user can then press the accept offer button 4944 to accept the balance transfer or the reject offer button 4946 to return to the offer page.

Figure 49I:
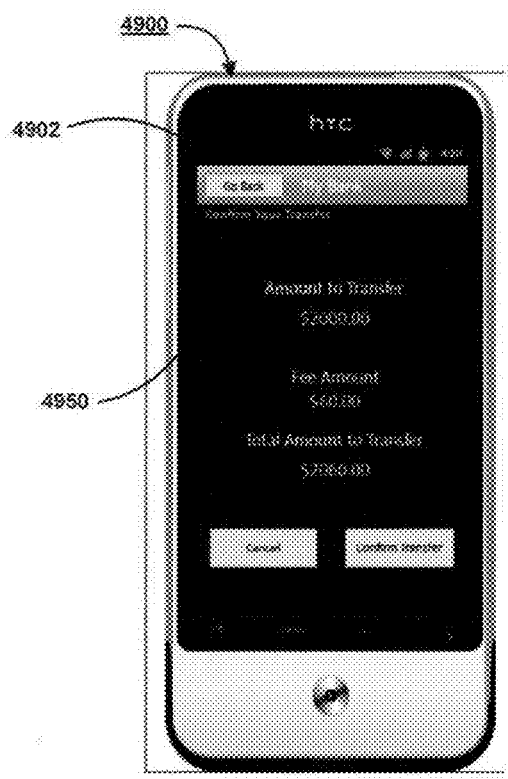
Figure 49J:
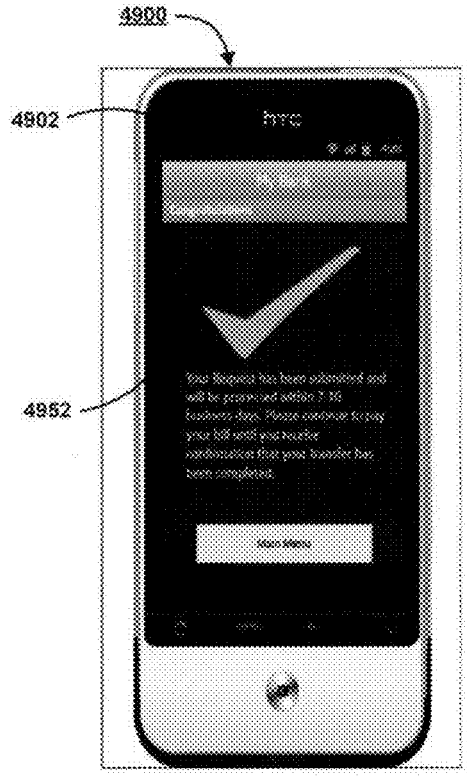

Once the user accepts the offer, they may be presented with a Disclosure Screen 4948, as illustrated in FIG. 49J, with terms and conditions associated with the offer. The balance transfer application may pull the terms and conditions from the server. The user is then presented with the option to Accept or Decline the offer with appropriate buttons on the user interface. If the user declines the offer at the offer disclosure menu, the user is returned to the offer screen.

If the user accepts the terms and conditions on the Disclosure Screen 4948, a final Balance Transfer Confirmation Screen 4950 is displayed, as illustrated in FIG. 49I. The Balance Transfer Confirmation Screen 4950 may display a summary of the offer terms, the amount being transferred, the fees, or any other relevant information. The user is then given a final option to confirm the transfer or cancel the offer. When confirm transfer is selected, the application will send back to the server information relating to the balance transfer, including payee name, payee address, transfer account number, transfer amount, and time and date of acceptance. In one embodiment, the fields on the Balance Transfer Confirmation Screen 4950 are not editable. The user may also go back to prior screens in the process. When cancel is selected, the application takes the user back to a main menu.

FIG. 49J shows a Success Screen 4952. The example Success screen shows a checkmark, but other symbols may also be used, that tells the user that the transfer was successful. A main menu button returns the user to the My Card screen.

FIGS. 49A-J illustrate the balance transfer application for a particular mobile device. The screens, menus, and controls presented to the user may vary with device used. An embodiment of the balance transfer application may include additional screens and menus. For example, there may be error screens (for invalid entries, time outs for inactivity, bad pictures, loss of communications, etc.).

Extracting Issuer Data

When extracting content from the credit card statement, there are certain fields that are important to identify which streamline further processing of the document. Specifically, the account number of the credit card, including the Bank Identification Number (BIN) or Issuer Identification Number (IIN) that makes up a part of the account number, is useful to help identify the bank or financial entity to which the credit card belongs. Many credit cards have standardized number formats for the account number which includes a BIN in the initial six digits. The numbering formats for credit cards are governed by an ISO/IEC standard from the International Organization for Standardization (ISO). If the account number can be identified on the credit card statement, the BIN number can be identified, for example through a regex operation, and the bank which issued the credit card can now be looked up in an issuer database.

By identifying the bank, a format of the credit card statement may be obtained from a database which stores information on formats of statements for different banks and financial institutions. The format of the credit card statement will provide information on the location of different fields on the statement and the format of the content of those fields, such as a total balance due or a format of a due date. Additionally, by identifying the bank, an address of the bank stored in a database can be compared with an address of the bank found on the statement, ensuring that the correct bank is identified and paid when the balance transfer is carried out.

Other fields that are important to identify on the credit card statement include a zip code, an account holder (user's) first and last name, a total balance on the credit card and a balance due in the current credit card statement. Other information, such as an interest rate on a balance, may be useful, although the total balance and the current balance due can be used to calculate an interest rate that the user is being charged without having to look specifically for the interest rates on the credit card statement. This is particularly useful if the user captures an image of just the payment slip of the credit card statement (see FIG. 1) instead of the entire credit card statement, as the payment slip may not include detailed information such as the interest rate.

Figure 50:
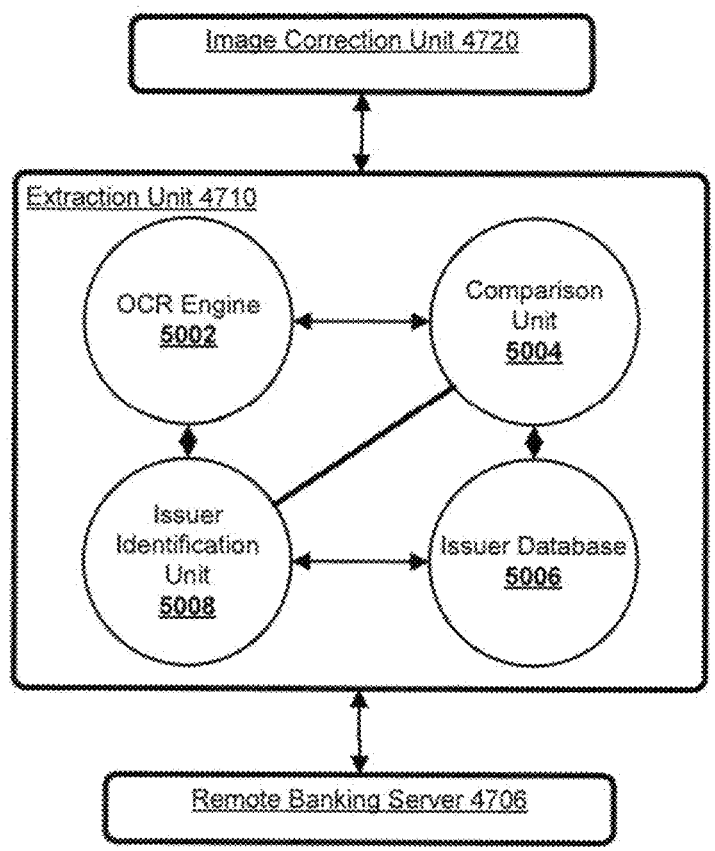
FIG. 50 is a block diagram of a system for extracting content from the credit card statement and determining a credit card issuer identity.

In one embodiment, content from the credit card statement is extracted with the extraction unit 4710, illustrated in further detail in FIG. 50. The extraction unit 4710 includes an optical character recognition (OCR) engine 5002 which converts images of text into characters. A comparison unit 5004 which compares the text from the OCR engine with content relating to a credit card issuer that is stored in an issuer database 5006. The comparison unit 5004 identifies matches between the text extracted from the image of the credit card statement and the issuer data in the issuer database 5006. Those matches may then be used by an issuer identification unit 5008 to identify an issuer of the credit card statement, which includes identifying additional information about the issuer, such as a name, address and regex mask.

Figure 51:
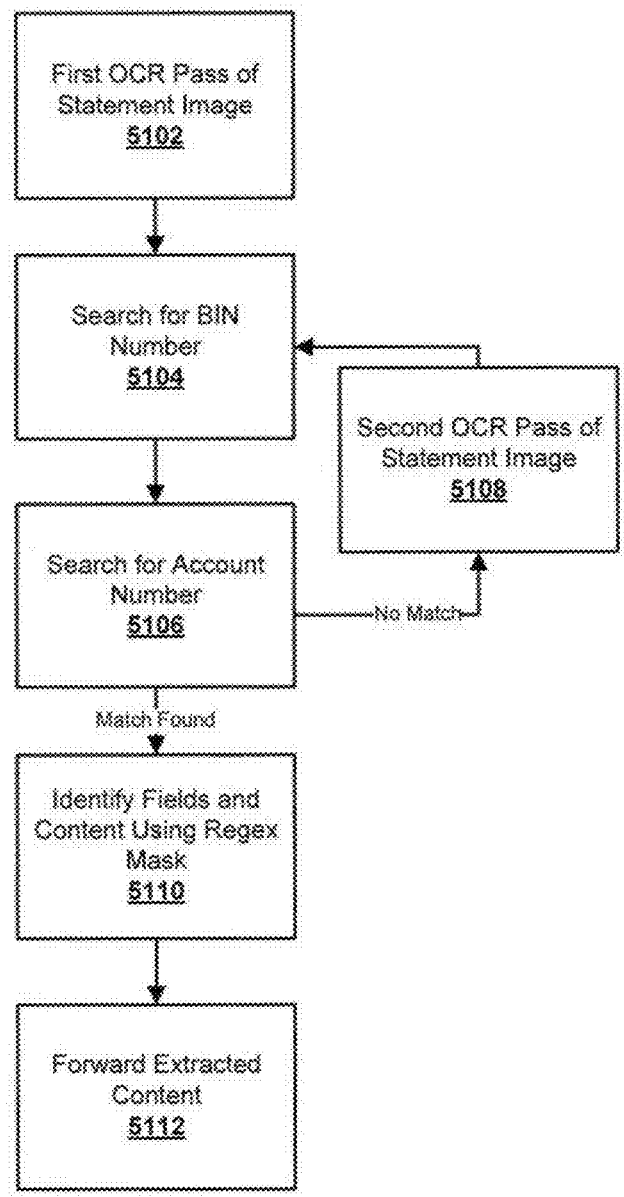
FIG. 51 is a block diagram of a method of extracting content from the credit card statement and determining a credit card issuer identity.

One embodiment of a method for extracting content from a credit card statement illustrated in FIG. 51, and begins with a first pass (5102) of the image using optical character recognition (OCR) software to extract raw text from the document. The raw text is then searched (5104) using a regex to find a six digit BIN (IIN) number that matches a BIN number in a database of credit card issuers. Based on the BIN, a search may also be performed for the account number (5106) by searching for a particular set of 15 or 16 numbers in sequence, since credit cards have a 15 or 16 digit account number. Since the BIN is part of the account number (the first six digits of the account number), additional comparisons can be made of the BIN and the identified account number to ensure that they match and that they are the proper length of characters. If a BIN match is found, the credit card statement can then be identified as belonging to the credit card issuer stored with that BIN in an issuer database. Knowing the information about the credit card issuer based on the BIN provides high confidence when processing the balance transfer, as the payment can be made to the credit card issuer's address using the account number with very little likelihood of error.

If the BIN number cannot be found, the process will proceed to a second pass (5108) described further below. In some credit cards (particularly those issued by retailers as opposed to banks), a BIN number may not exist within the account number.

The issuer database may also store details of the credit card issuer, including the name, address, phone number, and even a mask, or format, of the issuer's credit card statement. The mask may also contain information on the location of fields on that issuer's statement and the format of data in those fields. With the mask, additional comparisons can be made with the text extracted during the first pass in order to identify fields and the content of the fields (5110), so as to confidently classify the extracted text as belonging to a certain field and having a certain format. Once the content of the credit card statement is identified, the content relevant to creating a balance transfer is forwarded to a user for confirmation and also to the remote banking server 4706 (FIG. 50) for calculation of a balance transfer offer.

The raw extracted text may also be parsed to classify the other text as belonging to a certain field. While having the mask of the credit card statement eases this process, predictive methods can be used to identify what text belongs in what field based on general properties of text in certain fields, such as dates, monetary amounts, addresses, names, etc. Numbers found on the statement can also be classified based on their location with respect to certain keywords that may be found on the statement, such as "Due Date," "Total Balance," Minimum Payment Due," and so on.

If the BIN number cannot be initially identified, a second pass (5108) of the extracted text may be made. The second pass may begin with a fuzzy logic search against the issuer database using the account number as the primary search criteria. If the account number can be identified, then the BIN number can also be identified, which will provide additional information on the issuer, mask, etc. A regex expression mask may be used and compared with the extracted text and information on the format and location of the extracted text to determine if the regex expression mask matches the extracted text. If everything does match, then the account number can be assumed to be correct, and the associated issuer information associated in the issuer database will also be correct.

If the second pass using the account number is unsuccessful, an alternative regex will be used to search the extracted text, such as a zip code or post office box. Extracted text which is found in the proper format and location on the credit card statement where the issuer address usually resides is used as the secondary search criteria against the issuer database. In one embodiment, a zip code found on the credit card statement may be used a search criteria in the issuer database, which may return multiple results. These results can then be further narrowed down by comparing additional items from the regex masks of the possible matches, such as the name of the issuer (i.e. "CityCard"), with the extracted text, to see if other text in the extracted data matches the regex masks of the possible matches in the issuer database. In some cases, multiple matches will still be presented (such as when there are several types of CityCard credit cards), and this will necessitate further comparisons of extracted text with other fields on the mask, such as the complete issuer address. If necessary, a raw text comparison of the raw text (not specific to any possible field) may be made with the regex mask to find any matching text.

As with the first pass, when the second pass does yield the identity of an issuer in the issuer database, the associated mask for that issuer will provide specific information on the location and format of text in each field in the credit card statement, which can then be used to accurately capture the fields needed for the balance transfer process.

In one embodiment, the user may provide hints to the system in order to ensure that the issuer and account number can be identified. The user may be asked to select or enter the last four digits of the account number, which will then be used to extract the complete account number from the credit card statement and thereby identify the issuer. The last four digits of an account number provides high confidence when looking for the full account number, as the system can look back either 12 digits or 11 digits prior to the appearance of the last four digits on a credit card statement and then assume that this number is the account number. In one embodiment, the last four digits of the account number may also be used to calculate the checksum, which is a specific value produced by a computation of the account number. The accuracy of the account number can then be assessed based on whether the checksum is accurate.

The last four digits of the account number can also identify whether the credit card statement is actually a credit card statement or whether it belongs to a retail credit card, an insurance or medical credit card, a wireless or cable credit card, or another type, as they each have unique codes in their account numbers. Ideally, a user will select the type of credit card at the beginning of the process of capturing an image with the mobile device, as this will help to more accurately confirm the type of credit card.

In another embodiment, the user may simply select or touch (using a touch screen on a mobile device) a particular field on the image being displayed on the screen in order to aid the system in finding a particular field.

Pre-Processing of Mobile Image

The term "standard scanners" as used herein, but is not limited to, transport scanners, flat-bed scanners, and specialized check-scanners. Some manufacturers of transport scanners include UNISYS®, BancTec®, IBM®, and Canon®. With respect to specialized check-scanners, some models include the TellerScan® TS200 and the Panini® My Vision X. Generally, standard scanners have the ability to scan and produce high quality images, support resolutions from 200 dots per inch to 300 dots per inch (DPI), produce gray-scale and bi-tonal images, and crop an image of a check from a larger full-page size image. Standard scanners for other types of documents may have similar capabilities with even higher resolutions and higher color-depth.

The term "color images" as used herein, but is not limited to, images having a color depth of 24 bits per a pixel (24 bit/pixel), thereby providing each pixel with one of 16 million possible colors. Each color image is represented by pixels and the dimensions W (width in pixels) and H (height in pixels). An intensity function I maps each pixel in the [W×H] area to its RGB-value. The RGB-value is a triple (R,G,B) that determines the color the pixel represents. Within the triple, each of the R(Red), G(Green) and B(Blue) values are integers between 0 and 255 that determine each respective color's intensity for the pixel.

The term, "gray-scale images" as used herein, but is not limited to, images having a color depth of 8 bits per a pixel (8 bit/pixel), thereby providing each pixel with one of 256 shades of gray. As a person of ordinary skill in the art would appreciate, gray-scale images also include images with color depths of other various bit levels (e.g. 4 bit/pixel or 2 bit/pixel). Each gray-scale image is represented by pixels and the dimensions W (width in pixels) and H (height in pixels). An intensity function I maps each pixel in the [W×H] area onto a range of gray shades. More specifically, each pixel has a value between 0 and 255 which determines that pixel's shade of gray.

Bi-tonal images are similar to gray-scale images in that they are represented by pixels and the dimensions W (width in pixels) and H (height in pixels). However, each pixel within a bi-tonal image has one of two colors: black or white. Accordingly, a bi-tonal image has a color depth of 1 bit per a pixel (1 bit/pixel). The similarity transformation, as utilized by some embodiments of the invention, is based off the assumption that there are two images of [W×H] and [W'×H'] dimensions, respectively, and that the dimensions are proportional (i.e. W/W'=H/H'). The term "similarity transformation" may refer to a transformation ST from [W×H] area onto [W'×H'] area such that ST maps pixel p=p(x,y) on pixel p'=p'(x',y') with x'=x*W'/W and y=y*H'/H.

The systems and methods provided herein advantageously allow a user to capture an image of a remittance coupon, and in some embodiments, a form of payment, such as a check, for automated processing. Typically, a remittance processing service will scan remittance coupons and checks using standard scanners that provide a clear image of the remittance coupon and accompanying check. Often these scanners produce either gray-scale and bi-tonal images that are then used to electronically process the payment. The systems and methods disclosed herein allow an image of remittance coupons, and in some embodiments, checks to be captured using a camera or other imaging device included in or coupled to a mobile device, such as a mobile phone. The systems and methods disclosed herein can test the quality of a mobile image of a document captured using a mobile device, correct some defects in the image, and convert the image to a format that can be processed by remittance processing service.

FIG. 1 is an image illustrating an example remittance coupon 1900 that can be imaged with the systems and methods described herein. The mobile image capture and processing systems and methods described herein can be used with a variety of documents, including financial documents such as personal checks, business checks, cashier's checks, certified checks, and warrants. By using an image of the remittance coupon 100, the remittance process can be automated and performed more efficiently. As would be appreciated by those of skill in the art, remittance coupons are not the only types of documents that might be processed using the system and methods described herein. For example, in some embodiments, a user can capture an image of a remittance coupon and an image of a check associated with a checking account from which the remittance payment will be funded.

Figure 2:
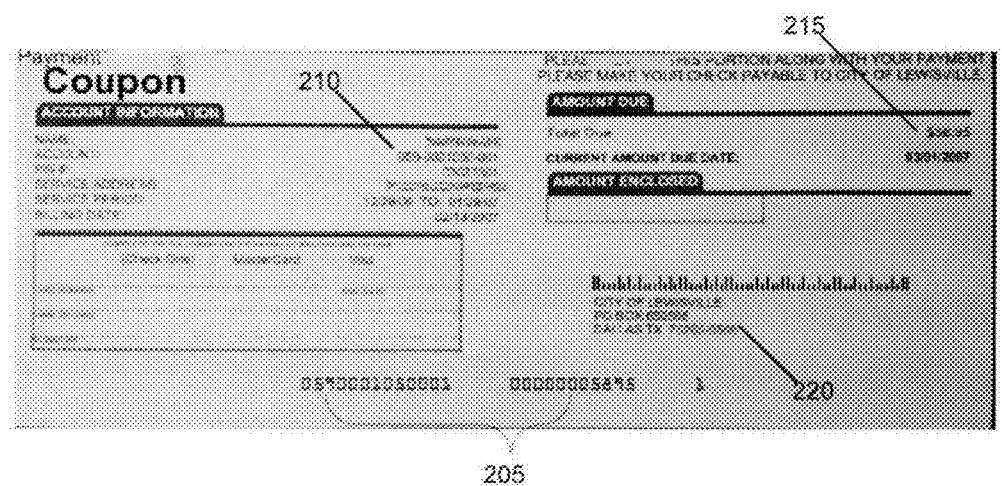
FIG. 2 is a geometrically corrected image created using image processing techniques disclosed herein using the mobile image of the remittance coupon 100 illustrated in FIG. 1.

FIG. 2 is a geometrically corrected image created using image processing techniques disclosed herein and using the mobile image of the remittance coupon 100 illustrated in FIG. 1. A remittance coupon may include various fields, and some fields in the documents might be considered "primary" fields. For example, some remittance coupons also include computer-readable bar codes or code lines 205 that include text or other computer-readable symbols that can be used to encode account-related information. The account-related information can be used to reconcile a payment received with the account for which the payment is being made. Code line 205 can be detected and decoded by a computer system to extract the information encoded therein. The remittance coupon can also include an account number field 210 and an amount due field 215. Remittance coupons can also include other fields, such as the billing company name and address 220, a total outstanding balance, a minimum payment amount, a billing date, and payment due date. The examples are merely illustrative of the types of information that may be included on a remittance coupon and it will be understood that other types of information can be included on other types of remittance coupons.

Figure 3:
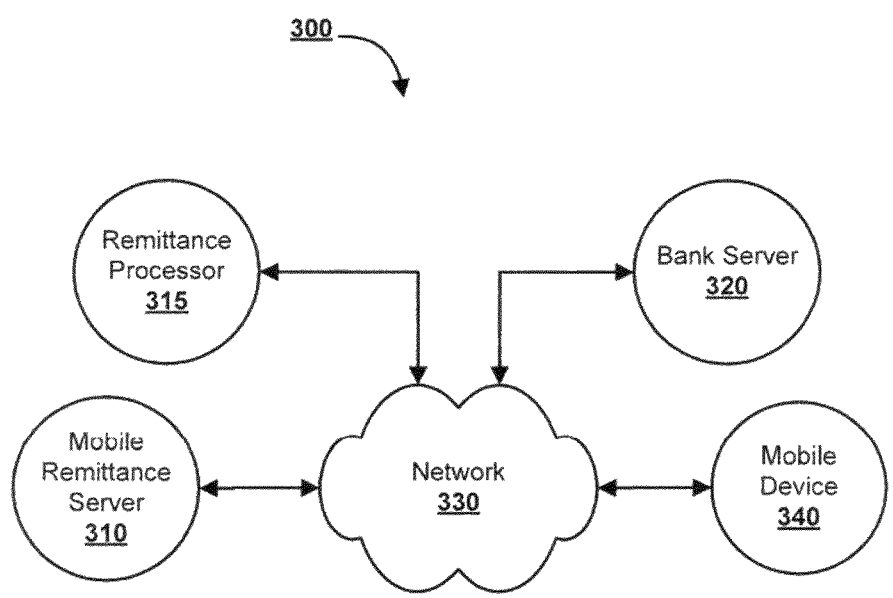
FIG. 3 is high level block diagram of a system that can be used to implement the systems and methods described herein.

FIG. 3 is high level block diagram of a system 300 that can be used to implement the systems and methods described herein. System 300 include a mobile device 340. The mobile device can comprise a mobile telephone handset, Personal Digital Assistant, or other mobile communication device. The mobile device can include a camera or other imaging device, such as a scanner, or might include functionality that allows it to connect to a camera or other imaging device. The connection to an external camera or other imaging device can comprise a wired or wireless connection. In this way the mobile device can connect to an external camera or other imaging device and receive images from the camera or other imaging device.

Images of the documents taken using the mobile device or downloaded to the mobile device can be transmitted to mobile remittance server 310 via network 330. Network 330 can comprise one or more wireless and/or wired network connections. For example, in some cases, the images can be transmitted over a mobile communication device network, such as a code division multiple access ("CDMA") telephone network, or other mobile telephone network. Network 330 can also comprise one or more connections across the Internet. Images taken using, for example, a mobile device's camera, can be 24 bit per pixel (24 bit/pixel) JPG images. It will be understood, however, that many other types of images might also be taken using different cameras, mobile devices, etc.

Mobile remittance server 310 can be configured to perform various image processing techniques on images of remittance coupons, checks, or other financial documents captured by the mobile device 340. Mobile remittance server 310 can also be configured to perform various image quality assurance tests on images of remittance coupons or financial documents captured by the mobile device 340 to ensure that the quality of the captured images is sufficient to enable remittance processing to be performed using the images. Examples of various processing techniques and testing techniques that can be implemented on mobile remit server 210 are described in detail below.

Figure 45:
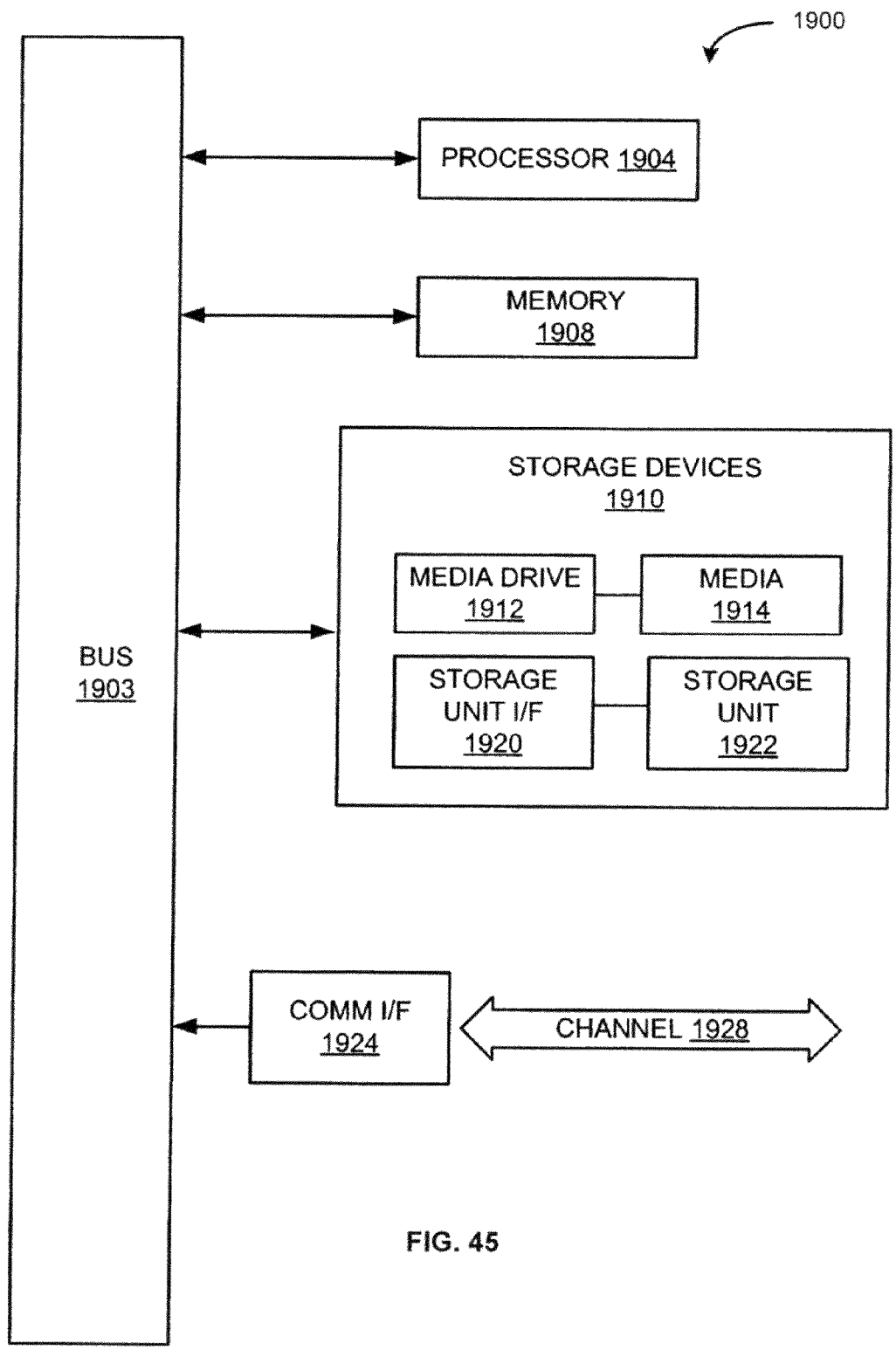
FIG. 45 is a block diagram of functional elements of a computer system that can be used to implement the mobile device and/or the servers described in the systems and methods disclosed herein.

Mobile remittance server 310 can also be configured to communicate with one or more remittance processor servers 315. According to an embodiment, the mobile remittance server 310 can perform processing and testing on images captured by mobile device 340 to prepare the images for processing by a third-party remittance processor and to ensure that the images are of a sufficient quality for the third-party remittance processor to process. The mobile remittance server 310 can send the processed images to the remittance processor 315 via the network 330. In some embodiments, the mobile remittance server 310 can send additional processing parameters and data to the remittance processor 315 with the processed mobile image. This information can include information collected from a user by the mobile device 340. According to an embodiment, the mobile remittance server 310 can be implemented using hardware or a combination of software and hardware. FIG. 45, describe below, illustrates a computer system that can be used to implement mobile remittance server 310 according to an embodiment.

According to an embodiment, the mobile remittance server 310 can be configured to communicate to one or more bank server 320 via the network 330. Bank server 320 can be configured to process payments in some embodiments. For example, in some embodiments, mobile device 340 can be used to capture an image of a remittance coupon and an image of a check that can be used to make an electronic payment of the remittance payment. For example, the remittance processor server 315 can be configured to receive an image of a remittance coupon and an image of a check from the mobile remittance server 310. The remittance processor 315 can electronically deposit the check into a bank account associated with the entity for which the electronic remittance is being performed. According to some embodiments, the bank server 320 and the remittance processor 315 can be implemented on the same server or same set of servers.

In other embodiments, the remittance processor 315 can handle payment. For example, the remittance processor can be operate by or on behalf of an entity associated with the coupon of FIG. 1, such as a utility or business. The user's account can then be linked with a bank, Paypal, or other account, such that when remittance processor 315 receives the remittance information, it can charge the appropriate amount to the user's account. FIGS. 46A-F illustrates example screens of an application that can run on a mobile device 340 and can be used for mobile remittance as described herein.

Figure 46A:
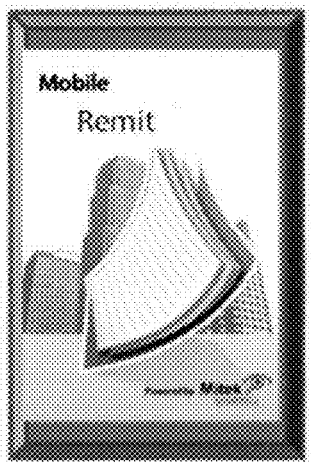
FIG. 46A-46F are images representing application that can reside on mobile device and be using in according with the systems and method disclosed herein according to an embodiment.
Figure 46B:
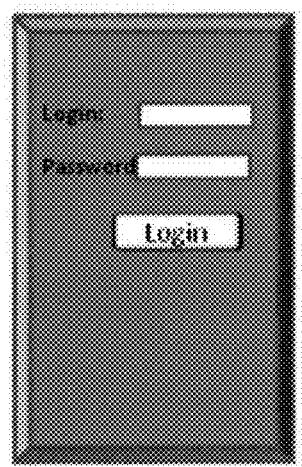
Figure 46C:
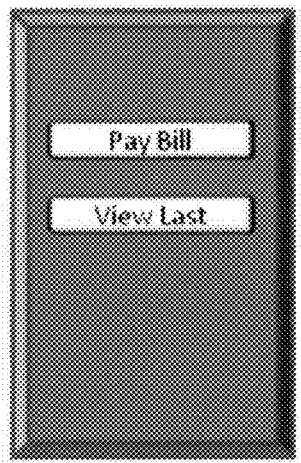

FIG. 46A is an image of an icon representing application that can reside on mobile device 340. When the application is activated, a login screen as illustrated in FIG. 46B can be displayed into which the user can input certain credentials such as a login or username and password. Once these credentials are validated, the user can be presented a screen as illustrated in FIG. 46C allowing them to pay certain bills using the application. In certain embodiments, the user can also view other information such as previous or last payments.

Figure 46D:
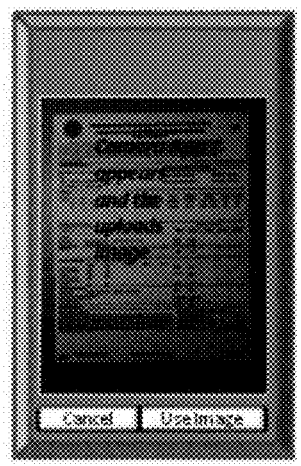
Figure 46E:
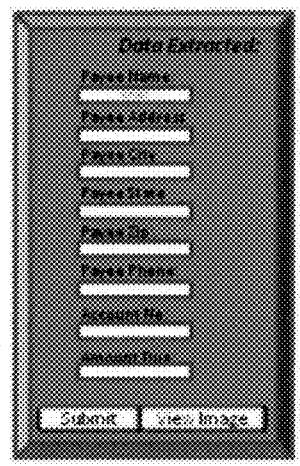
Figure 46F:
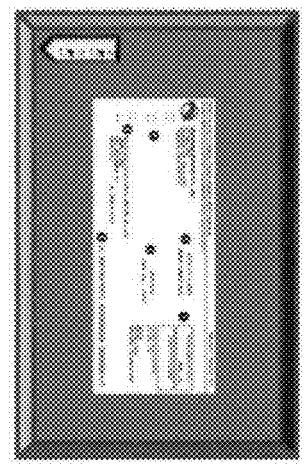

When the user elects to pay a bill, the camera application can be launched as illustrated in FIG. 46D, which can enable the user to obtain an image of the coupon. As illustrated, control buttons can be presented to allow the user to accept the image or cancel and possibly obtain a new image. Data can then be extracted from the image, as discussed in detail below, and as illustrated in FIG. 46E. The data can be presented as various fields and can enable the user to correct or alter the information as appropriate. In certain embodiments, the user can even access a grayscale image of the coupon illustrated in FIG. 46F.

Once the image is captured and corrected, and the data is extracted and adjusted, then the image, data, and any required credential information, such as username, password, and phone or device identifier, can be transmitted to the mobile remittance server 310 for further processing. This further processing is described in detail with respect to the remaining figure sin the description below.

Figure 4:
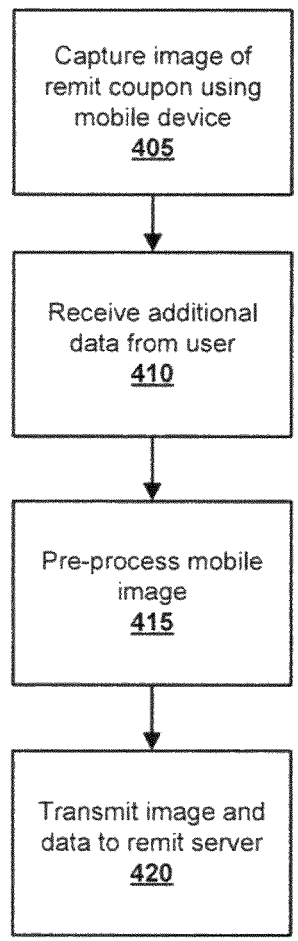
FIG. 4 is a flow diagram of an example method for capturing an image of a remittance coupon using a mobile device according to an embodiment.

First, FIG. 4 is a flow diagram of an example method for capturing an image of a remittance coupon using a mobile device according to an embodiment. According to an embodiment, the method illustrated in FIG. 4 can be implemented in mobile device 340.

An image of a remittance coupon is captured using a camera or other optical device of the mobile device 340 (step 405). For example, a user of the mobile device 340 can click a button or otherwise activate a camera or other optical device of mobile device 340 to cause the camera or other optical device to capture an image of a remittance coupon. FIG. 1 illustrates an example of a mobile image of a remittance coupon that has been captured using a camera associated with a mobile device 340.

According to an embodiment, the mobile device 340 can also be configured to optionally receive additional information from the user (step 410). For example, in some embodiments, the mobile device can be configured to prompt the user to enter data, such as a payment amount that represents an amount of the payment that the user wishes to make. The payment amount can differ from the account balance or minimum payment amount shown on the remittance coupon. For example, the remittance coupon might show an account balance of $1000 and a minimum payment amount of $100, but the user might enter a payment amount of $400.

According to an embodiment, the mobile device 340 can be configured to perform some preprocessing on the mobile image (step 415). For example, the mobile device 340 can be configured to convert the mobile image from a color image to a grayscale image or to bitonal image. Other preprocessing steps can also be performed on the mobile device. For example, the mobile device can be configured to identify the corners of the remittance coupon and to perform geometric corrections and/or warping corrections to correct defects in the mobile image. Examples of various types of preprocessing that can be performed on the mobile device 340 are described in detail below.

Mobile device 340 can then transmit the mobile image of the remittance coupon and any additional data provided by user to mobile remittance server 310.

Figure 5:
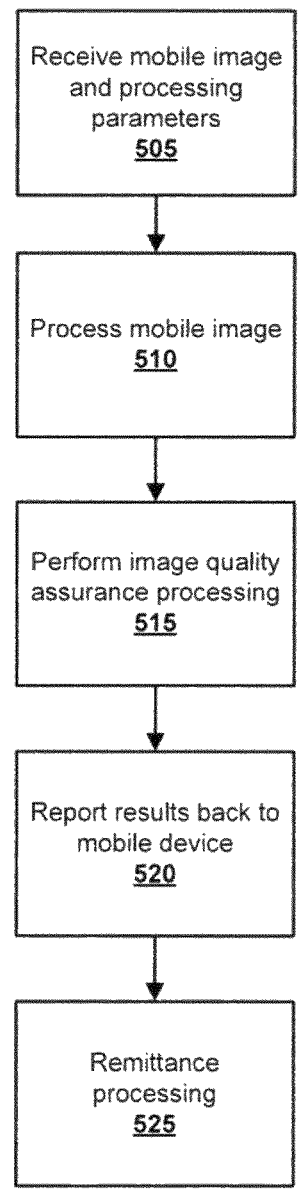
FIG. 5 is a flow diagram of an example method for processing an image of a remittance coupon captured using a mobile device according to an embodiment.

FIG. 5 is a flow diagram of an example method for processing an image of a remittance coupon captured using a mobile device according to an embodiment. According to an embodiment, the method illustrated in FIG. 4 can be implemented in mobile remittance server 310.

Mobile remittance server 310 can receive the mobile image and any data provided by the user from the mobile device 340 via the network 330 (step 505). The mobile remittance server 310 can then perform various processing on the image to prepare the image for image quality assurance testing and for submission to a remittance processor 315 (step 510). Various processing steps can be performed by the mobile remittance server 310. Examples of the types of processing that can be performed by mobile remittance server 310 are described in detail below.

Mobile remittance server 310 can perform image quality assurance testing on the mobile image to determine whether there are any issues with the quality of the mobile image that might prevent the remittance provider from being able to process the image of the remittance coupon (step 515). Various mobile quality assurance testing techniques that can be performed by mobile remittance server 310 are described in detail below.

According to an embodiment, mobile remittance server 310 can be configured to report the results of the image quality assurance testing to the mobile device 340 (step 520). This can be useful for informing a user of mobile device 340 that an image that the user captured of a remittance coupon passed quality assurance testing, and thus, should be of sufficient quality that the mobile image can be processed by a remittance processor server 315. According to an embodiment, the mobile remittance server 310 can be configured to provide detailed feedback messages to the mobile device 340 if a mobile image fails quality assurance testing. Mobile device 340 can be configured to display this feedback information to a user of the device to inform the user what problems were found with the mobile image of the remittance coupon and to provide the user with the opportunity to retake the image in an attempt to correct the problems identified.

If the mobile image passes the image quality assurance testing, the mobile remittance server 310 can submit the mobile image plus any processing parameters received from the mobile device 340 to the remittance processor server 315 for processing (step 525). According to an embodiment, mobile remittance server 310 can include a remittance processing server configured to perform the steps 525 including the methods illustrated in FIGS. 42 and 43. According to an embodiment, the remittance processing step 525 can include identifying a type of remittance coupon found in a mobile image. According to some embodiments, coupon templates can be used to improve data capture accuracy. According to an embodiment, if form identification fails and a coupon template that matches the format of a coupon, a dynamic data capture method can be applied to extract information from the remittance coupon.

Image Processing

Mobile device 340 and mobile remittance server 310 can be configured to perform various processing on a mobile image to correct various defects in the image quality that could prevent the remittance processor 215 from being able to process the remittance due to poor image quality.

For example, an out of focus image of a remittance coupon or check, in embodiments where the mobile device can also be used to capture check images for payment processing, can be impossible to read an electronically process. For example, optical character recognition of the contents of the imaged document based on a blurry mobile image could result in incorrect payment information being extracted from the document. As a result, the wrong account could be credited for the payment or an incorrect payment amount could be credited. This may be especially true if a check and a payment coupon are both difficult to read or the scan quality is poor.

Many different factors may affect the quality of an image and the ability of a mobile device based image capture and processing system. Optical defects, such as out-of-focus images (as discussed above), unequal contrast or brightness, or other optical defects, can make it difficult to process an image of a document, e.g., a check, payment coupon, deposit slip, etc. The quality of an image can also be affected by the document position on a surface when photographed or the angle at which the document was photographed. This affects the image quality by causing the document to appear, for example, right side up, upside down, skewed, etc. Further, if a document is imaged while upside-down it might be impossible or nearly impossible to for the system to determine the information contained on the document.

In some cases, the type of surface might affect the final image. For example, if a document is sitting on a rough surface when an image is taken, that rough surface might show through. In some cases the surface of the document might be rough because of the surface below it. Additionally, the rough surface may cause shadows or other problems that might be picked up by the camera. These problems might make it difficult or impossible to read the information contained on the document.

Lighting may also affect the quality of an image, for example, the location of a light source and light source distortions. Using a light source above a document can light the document in a way that improves the image quality, while a light source to the side of the document might produce an image that is more difficult to process. Lighting from the side can, for example, cause shadows or other lighting distortions. The type of light might also be a factor, for example, sun, electric bulb, florescent lighting, etc. If the lighting is too bright, the document can be washed out in the image. On the other hand, if the lighting is too dark, it might be difficult to read the image.

The quality of the image can also be affected by document features, such as, the type of document, the fonts used, the colors selected, etc. For example, an image of a white document with black lettering may be easier to process than a dark colored document with black letters. Image quality may also be affected by the mobile device used. Some mobile camera phones, for example, might have cameras that save an image using a greater number of mega pixels. Other mobile cameras phones might have an auto-focus feature, automatic flash, etc. Generally, these features may improve an image when compared to mobile devices that do not include such features.

A document image taken using a mobile device might have one or more of the defects discussed above. These defects or others may cause low accuracy when processing the image, for example, when processing one or more of the fields on a document. Accordingly, in some embodiments, systems and methods using a mobile device to create images of documents can include the ability to identify poor quality images. If the quality of an image is determined to be poor, a user may be prompted to take another image.

Detecting an Out of Focus Image

Mobile device 340 and mobile remittance server 310 can be configured to detect an out of focus image. A variety of metrics might be used to detect an out-of-focus image. For example, a focus measure can be employed. The focus measure can be the ratio of the maximum video gradient between adjacent pixels measured over the entire image and normalized with respect to an image's gray level dynamic range and "pixel pitch". The pixel pitch may be the distance between dots on the image. In some embodiments a focus score might be used to determine if an image is adequately focused. If an image is not adequately focused, a user might be prompted to take another image.

According to an embodiment, the mobile device 340 can be configured to detect whether an image is out of focus using the techniques disclosed herein. In an embodiment, the mobile remittance server 310 can be configured to detect out of focus images. In some embodiments, the mobile remittance server 310 can be configured to detect out of focus images and reject these images before performing mobile image quality assurance testing on the image. In other embodiments, detecting and out of focus image can be part of the mobile image quality assurance testing.

According to an embodiment, an image focus score can be calculated as a function of maximum video gradient, gray level dynamic range and pixel pitch. For example, in one embodiment:

$$\text{Image Focus Score} = (\text{Maximum Video Gradient}) * (\text{Gray Level Dynamic Range}) * (\text{Pixel Pitch}) \quad (\text{eq. 1})$$

The video gradient may be the absolute value of the gray level for a first pixel "i" minus the gray level for a second pixel "i+1". For example:

$$\text{Video Gradient} = ABS[(\text{Grey level for pixel "}i\text{"}) - (\text{Gray level for pixel "}i+1\text{"})] \quad (\text{eq. 2})$$

The gray level dynamic range may be the average of the "n" lightest pixels minus the average of the "n" darkest pixels. For example:

$$\text{Gray Level Dynamic Range} = [\text{AVE}(\text{"}N\text{" lightest pixels}) - \text{AVE}(\text{"}N\text{" darkest pixels})] \quad (\text{eq. 3})$$

In equation 3 above, N can be defined as the number of pixels used to determine the average darkest and lightest pixel gray levels in the image. In some embodiments, N can be chosen to be 64. Accordingly, in some embodiments, the 64 darkest pixels are averaged together and the 64 lightest pixels are averaged together to compute the gray level dynamic range value.

The pixel pitch can be the reciprocal of the image resolution, for example, in dots per inch.

$$\text{Pixel Pitch} = [1/\text{Image Resolution}] \quad (\text{eq. 4})$$

In other words, as defined above, the pixel pitch is the distance between dots on the image because the Image Resolution is the reciprocal of the distance between dots on an image.

Detecting and Correcting Perspective Distortion

Figure 7:
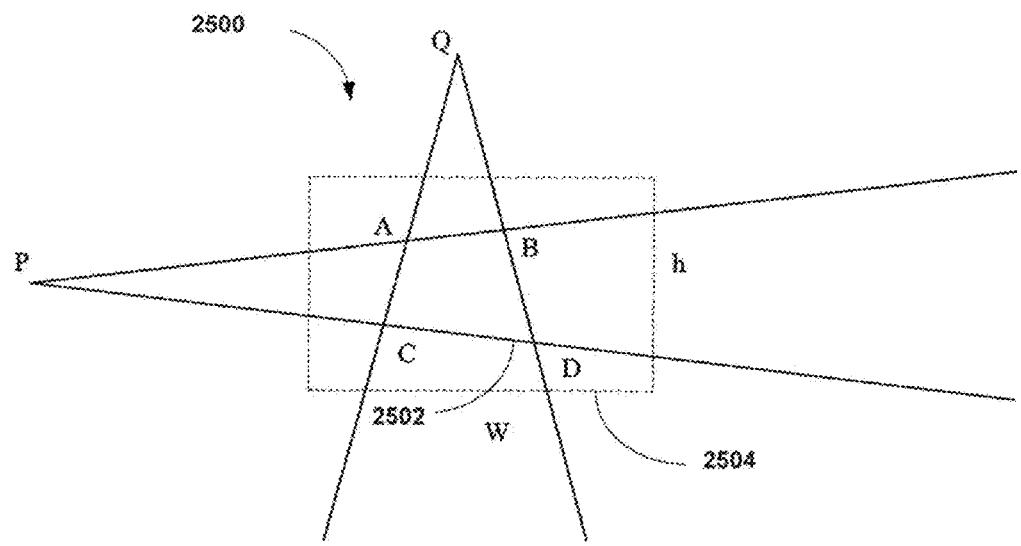
FIG. 7 and its related description above provide some examples of how a perspective transformation can be constructed for a quadrangle defined by the corners A, B, C, and D according to an embodiment.

FIG. 7 is a diagram illustrating an example of perspective distortion in an image of a rectangular shaped document. An image can contain perspective transformation distortions 2500 such that a rectangle can become a quadrangle ABCD 2502, as illustrated in the figure. The perspective distortion can occur because an image is taken using a camera that is placed at an angle to a document rather than directly above the document. When directly above a rectangular document it will generally appear to be rectangular. As the imaging device moves from directly above the surface, the document distorts until it can no longer be seen and only the edge of the page can be seen.

The dotted frame 2504 comprises the image frame obtained by the camera. The image frame is be sized h×w, as illustrated in the figure. Generally, it can be preferable to contain an entire document within the h×w frame of a single image. It will be understood, however, that some documents are too large or include too many pages for this to be preferable or even feasible.

In some embodiments, an image can be processed, or preprocessed, to automatically find and "lift" the quadrangle 2502. In other words, the document that forms quadrangle 502 can be separated from the rest of the image so that the document alone can be processed. By separating quadrangle 2502 from any background in an image, it can then be further processed.

The quadrangle 2502 can be mapped onto a rectangular bitmap in order to remove or decrease the perspective distortion. Additionally, image sharpening can be used to improve the out-of-focus score of the image. The resolution of the image can then be increased and the image converted to a black-and-white image. In some cases, a black-and-white image can have a higher recognition rate when processed using an automated document processing system in accordance with the systems and methods described herein.

An image that is bi-tonal, e.g., black-and-white, can be used in some systems. Such systems can require an image that is at least 200 dots per inch resolution. Accordingly, a color image taken using a mobile device can need to be high enough quality so that the image can successfully be converted from, for example, a 24 bit per pixel (24 bit/pixel) RGB image to a bi-tonal image. The image can be sized as if the document, e.g., check, payment coupon, etc., was scanned at 200 dots per inch.

Figure 8:
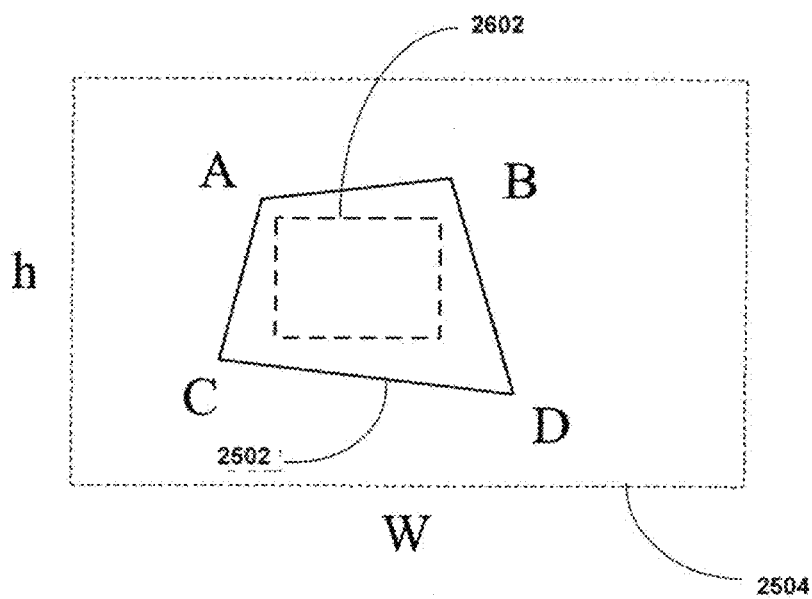
FIG. 8 is a diagram illustrating an example original image, focus rectangle and document quadrangle ABCD in accordance with the example of FIG. 7.

FIG. 8 is a diagram illustrating an example original image, focus rectangle and document quadrangle ABCD in accordance with the example of FIG. 7. In some embodiments it can be necessary to place a document for processing at or near the center of an input image close to the camera. All points A, B, C and D are located in the image, and the focus rectangle 2602 is located inside quadrangle ABCD 2502. The document can also have a low out-of-focus score and the background surrounding the document can be selected to be darker than the document. In this way, the lighter document will stand out from the darker background.

Image Correction Module

Figure 6:
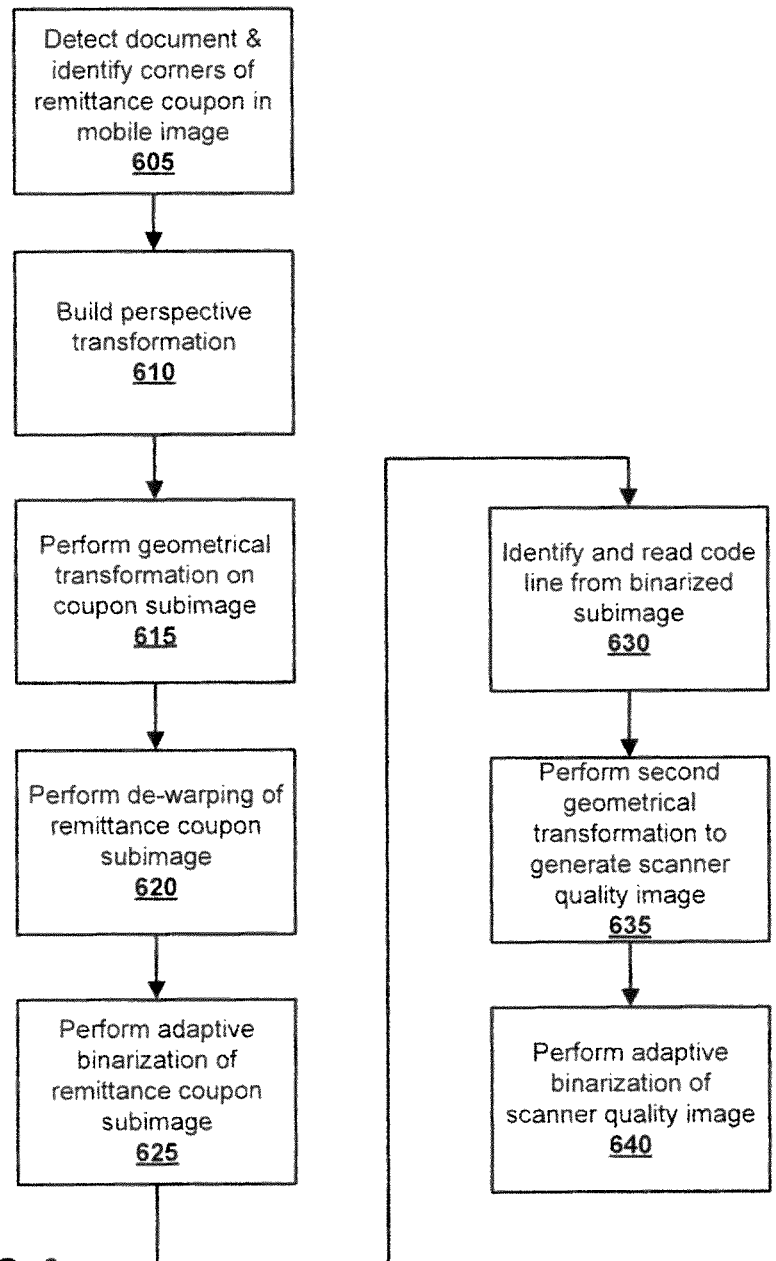
FIG. 6 is a flow diagram illustrating a method for correcting defects to mobile image according to an embodiment.

FIG. 6 is a flow diagram illustrating a method for correcting defects to mobile image according to an embodiment. According to an embodiment, the method illustrated in FIG. 6 can be performed by an image correction module implemented on the mobile remittance server 310. The method illustrated in FIG. 6 can be implemented as part of step 510 of the method illustrated in FIG. 5. The image correction module can also receive a mobile image an processing parameters from a mobile device (step 505 of FIG. 5). According to some embodiments, some or all of the image correction functionality of the image correction module can be implemented on the mobile device 340, and the mobile device 340 can be configured to send a corrected mobile image to the mobile remittance server 310 for further processing.

According to an embodiment, the image correction module can also be configured to detect an out of focus image using the technique described above and to reject the mobile image if the image focus score for the image falls below a predetermined threshold without attempting to perform other image correction techniques on the image. According to an embodiment, the image correction module can send a message to the mobile device 340 indicating that the mobile image was too out of focus to be used and requesting that the user retake the image.

Figure 9:
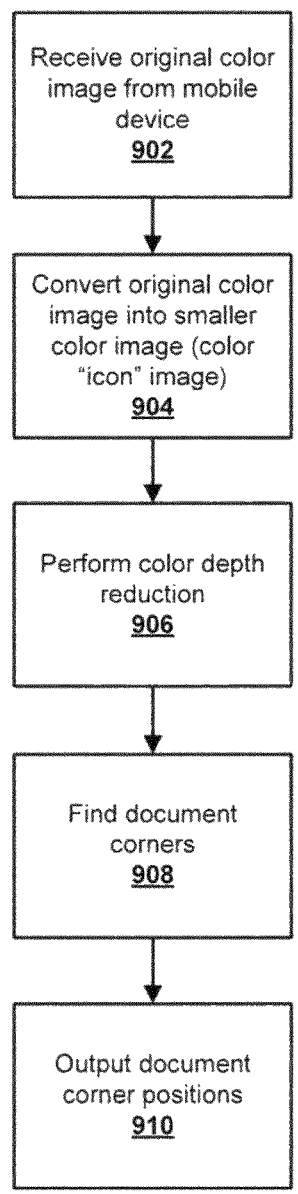
FIG. 9 is a flow chart for a method that can be used to identify the corners of the remittance coupon in a color image according to an embodiment.

The image correction module can be configured to first identify the corners of a coupon or other document within a mobile image (step 605). One technique that can be used to identify the corners of the remittance coupon in a color image is illustrated in FIG. 9 and is described in detail below. The corners of the document can be defined by a set of points A, B, C, and D that represent the corners of the document and define a quadrangle.

The image correction module can be configured to then build a perspective transformation for the remittance coupon (step 610). As can be seen in FIG. 1, the angle at which an image of a document is taken can cause the rectangular shape of the remittance coupon to appear distorted. FIG. 7 and its related description above provide some examples of how a perspective transformation can be constructed for a quadrangle defined by the corners A, B, C, and D according to an embodiment. For example, the quadrangle identified in step 605 can be mapped onto a same-sized rectangle in order to build a perspective transformation that can be applied to the document subimage, i.e. the portion of the mobile image that corresponds to the remittance coupon, in order to correct perspective distortion present in the image.

A geometrical transformation of the document subimage can be performed using the perspective transformation built in step 610 (step 615). The geometrical transformation corrects the perspective distortion present in the document subimage. An example of results of geometrical transformation can be seen in FIG. 2 where a document subimage of the remittance coupon pictured in FIG. 1 has been geometrically corrected to remove perspective distortion.

Figure 35:
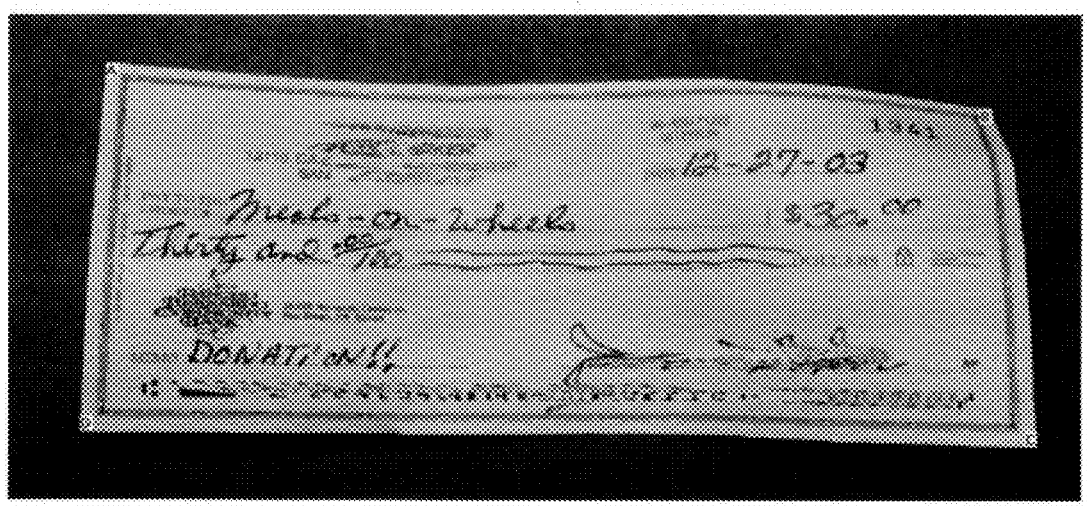
FIG. 35 illustrates an example of a mobile document image where the document is warped according to an embodiment.
Figure 36:
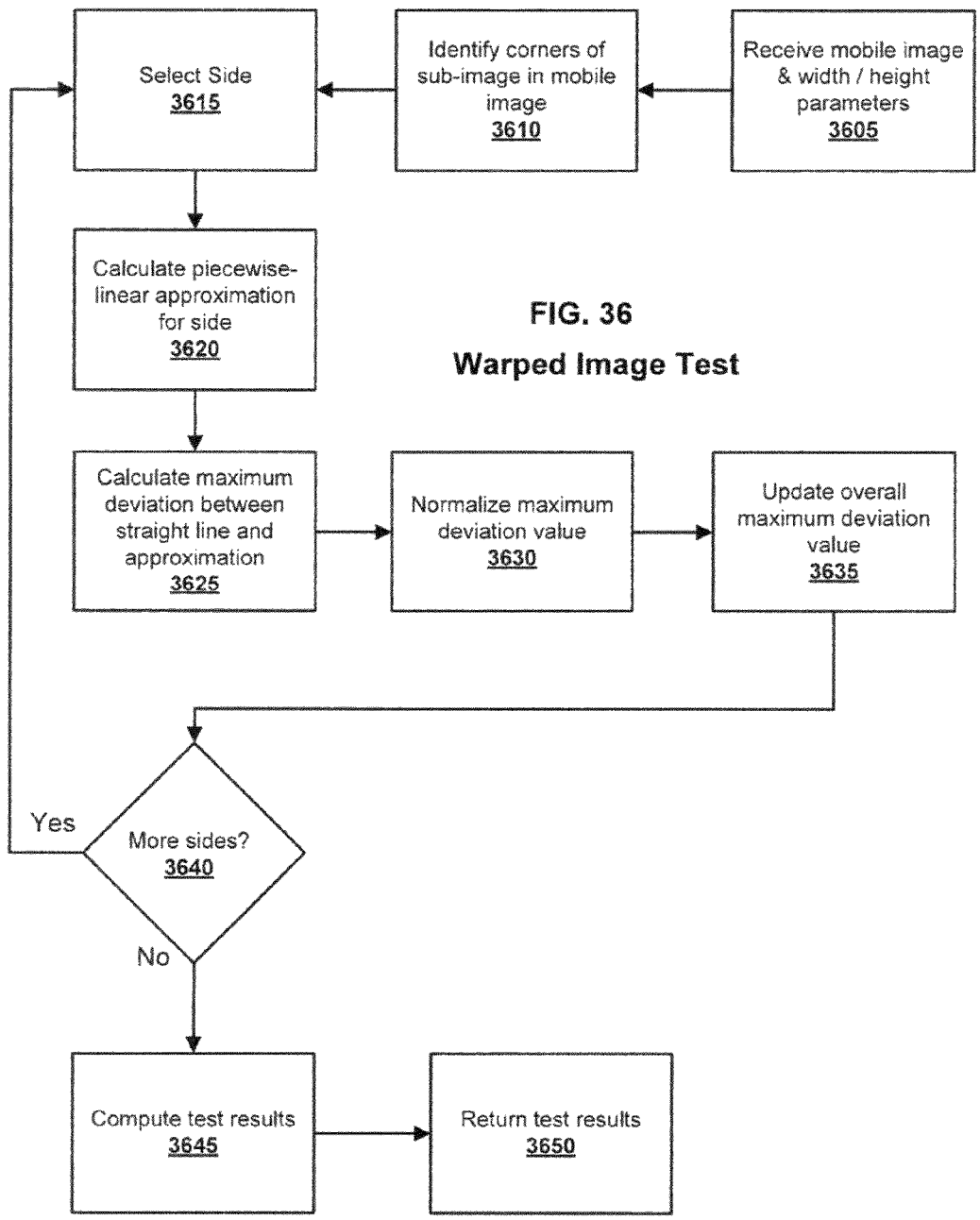
FIG. 36 is a flow diagram of a method for identifying a warped image and for scoring the image based on how badly the document subimage is warped according to an embodiment.

A "dewarping" operation can also be performed on the document subimage (step 620). An example of a warping of a document in a mobile image is provided in FIG. 35. Warping can occur when a document to be imaged is not perfectly flat or is placed on a surface that is not perfectly flat, causing distortions in the document subimage. A technique for identifying warping in a document subimage is illustrated in FIG. 36.

According to an embodiment, the document subimage can also binarized (step 625). A binarization operation can generate a bi-tonal image with color depth of 1 bit per a pixel (1 bit/pixel). Some automated processing systems, such as some Remote Deposit systems require bi-tonal images as inputs. A technique for generating a bi-tonal image is described below with respect to FIG. 10. FIG. 11 illustrates a binarized version of the geometrically corrected mobile document image of the remittance coupon illustrated in FIG. 2. As illustrated, in the bi-tonal image of FIG. 11, the necessary information, such as payees, amounts, account number, etc., has been preserved, while extra information has been removed. For example, background patterns that might be printed on the coupon are not present in the bi-tonal image of the remittance coupon. Binarization of the subimage also can be used to remove shadows and other defects caused by unequal brightness of the subimage.

Once the image has been binarized, the code line of the remittance coupon can be identified and read (step 630). As described above, many remittance coupons include a code line that comprises computer-readable text that can be used to encode account-related information that can be used to reconcile a payment received with the account for which the payment is being made. Code line 205 of FIG. 2 illustrates an example of code line on a remittance coupon.

Figure 20:
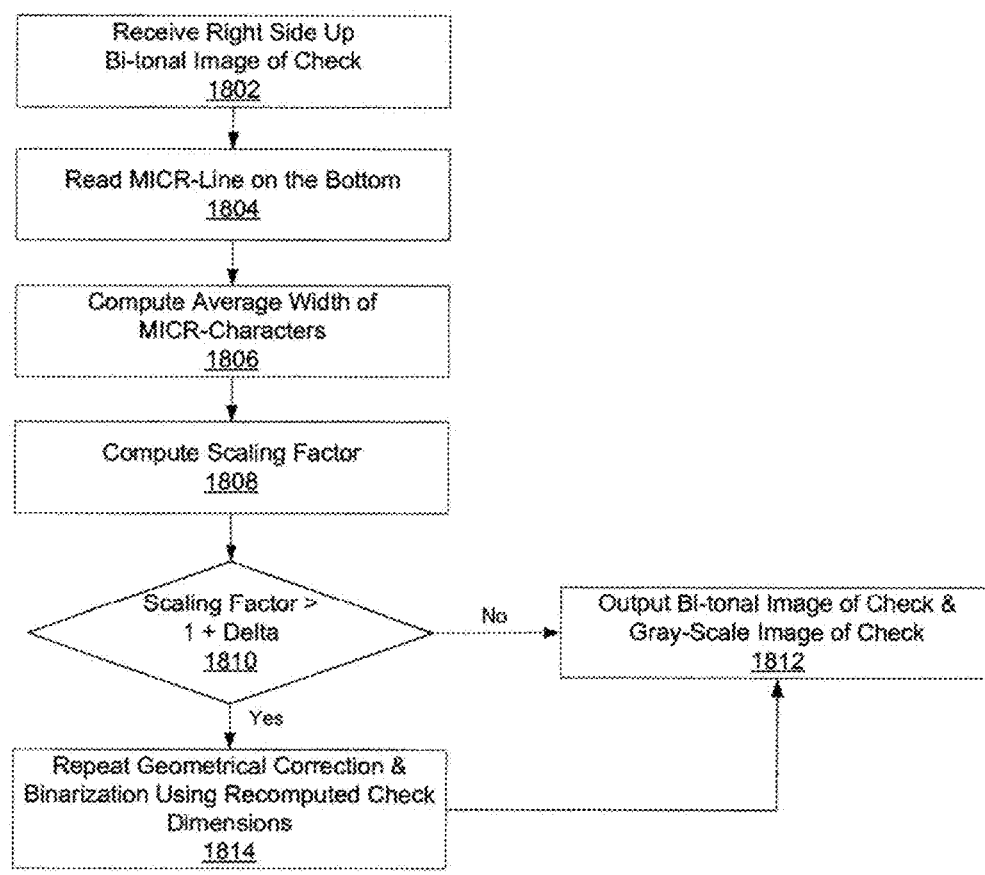
FIG. 20 provides a flowchart illustrating an example method for size correction of an image according to an embodiment.

Often, a standard optical character recognition font, the OCR-A font, is used for printing the characters comprising the code line. The OCR-A font is a fixed-width font where the characters are typically spaced 0.10 inches apart. Because the OCR-A font is a standardized fixed-width font, the image correction module can use this information to determining a scaling factor for the image of the remittance coupon. The scaling factor to be used can vary from image to image, because the scaling is dependent upon the position of the camera or other image capture device relative to the document being imaged and can also be dependent upon optical characteristics of the device used to capture the image of the document. FIG. 20 illustrates a scaling method that can be used to determine a scaling factor to be applied according to an embodiment. The method illustrated in FIG. 20 is related to scaling performed on a MICR-line of a check, but can be used to determined a scaling factor for an image of a remittance coupon based on the size of the text in the code line of the image of the remittance coupon.

Once the scaling factor for the image has been determined, a final geometrical transformation of the document image can be performed using the scaling factor (step 635). This step is similar to that in step 615, except the scaling factor is used to create a geometrically altered subimage that represents the actual size of the coupon at a given resolution. According to an embodiment, the dimensions of the geometrically corrected image produced by set 635 are identical to the dimensions of an image produced by a flat bed scanner at the same resolution.

During step 635, other geometrical corrections can also be made, such as correcting orientation of the coupon subimage. The orientation of the coupon subimage can be determined based on the orientation of the text of the code line.

Once the final geometrical transformation has been applied, a final adaptive binarization can be performed on the grayscale image generated in step 635 (step 640). The bi-tonal image output by the this step will have the correct dimensions for the remittance coupon because the bi-tonal image is generated using the geometrically corrected image generated in step 635.

According to an embodiment, the image correction module can be configured to use several different binarization parameters to generate two or more bi-tonal images of the remittance coupon. The use of multiple images can improve data capture results. The use of multiple bi-tonal images to improve data captures results is described in greater detail below.

Detecting Document within Color Mobile Image

Referring now to FIG. 9, a flowchart is provided illustrating an example method for automatic document detection within a color image from a mobile device. According to an embodiment, the method illustrated in FIG. 9 can be used to implement step 605 of the method illustrated in FIG. 6. Typically, the operations described within method of FIG. 9 are performed within an automatic document detection module of the mobile remittance server 310; however, embodiments exist where the operations reside in multiple modules. In addition, generally the automatic document detection module takes a variety of factors into consideration when detecting the document in the mobile image. The automatic document detection module can take into consideration arbitrary location of the document within the mobile image, the 3-D distortions within the mobile image, the unknown size of the document, the unknown color of the document, the unknown color(s) of the background, and various other characteristics of the mobile engine, e.g. resolution, dimensions, etc.

The method of FIG. 9 begins at step 902 by receiving the original color image from the mobile device. Upon receipt, this original color image is converted into a smaller color image, also referred to as a color "icon" image, at operation 904. This color "icon" image preserves the color contrasts between the document and the background, while suppressing contrasts inside the document. A detailed description of an example conversion process is provided with respect to FIG. 12.

A color reduction operation is then applied to the color "icon" image at step 906. During the operation, the overall color of the image can be reduced, while the contrast between the document and its background can be preserved within the image. Specifically, the color "icon" image of operation 904 can be converted into a gray "icon" image (also known as a gray-scale "icon" image) having the same size. An example, color depth reduction process is described with further detail with respect to FIG. 14.

The corners of the document are then identified within the gray "icon" image (step 910). As previously noted above with respect to FIG. 7, these corners A, B, C, and D make up the quadrangle ABCD (e.g. quadrangle ABCD 2502). Quadrangle ABCD, in turn, makes up the perimeter of the document. Upon detection of the corners, the location of the corners is outputted (step 910).

Binarization

Figure 10:
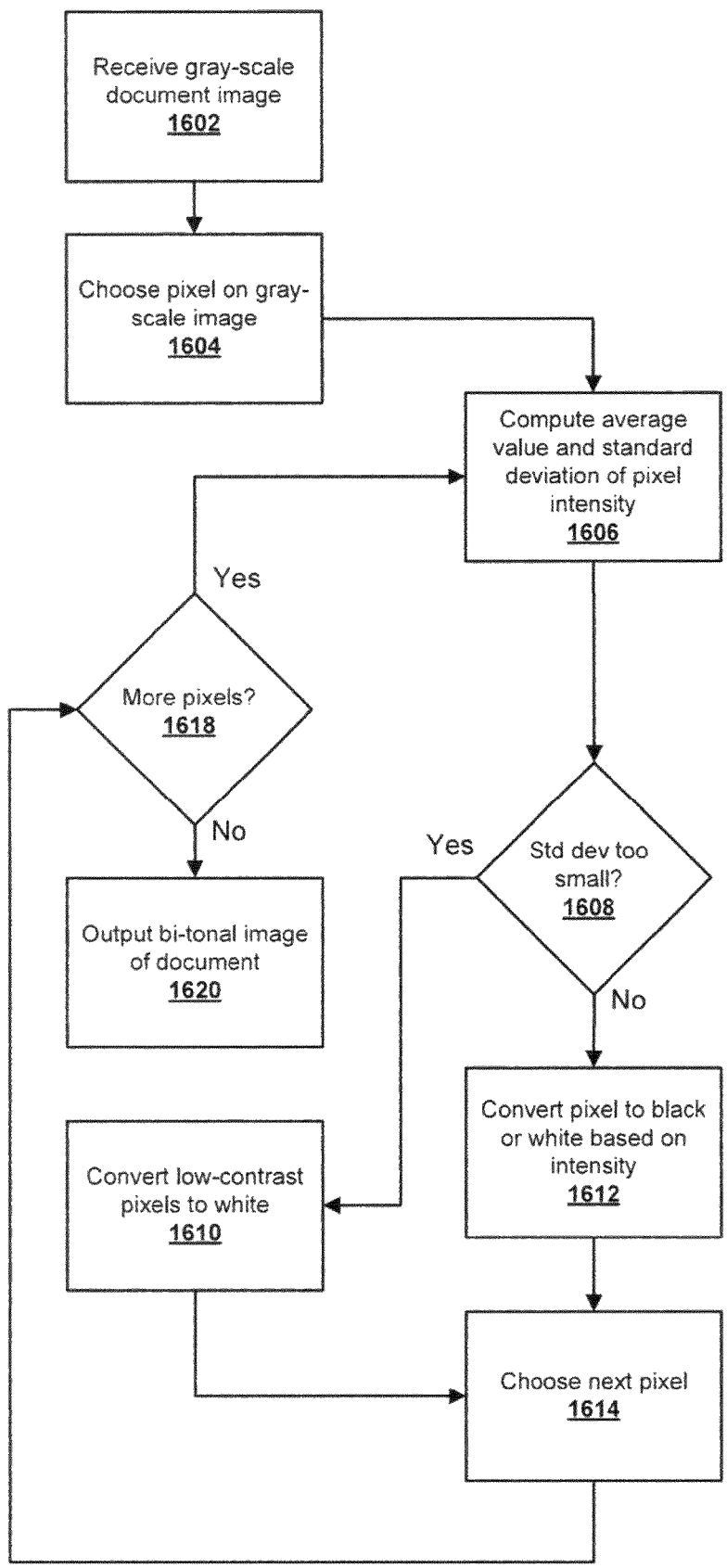
FIG. 10 is a flow diagram of a method for generating a bi-tonal image according to an embodiment.
Figure 11:
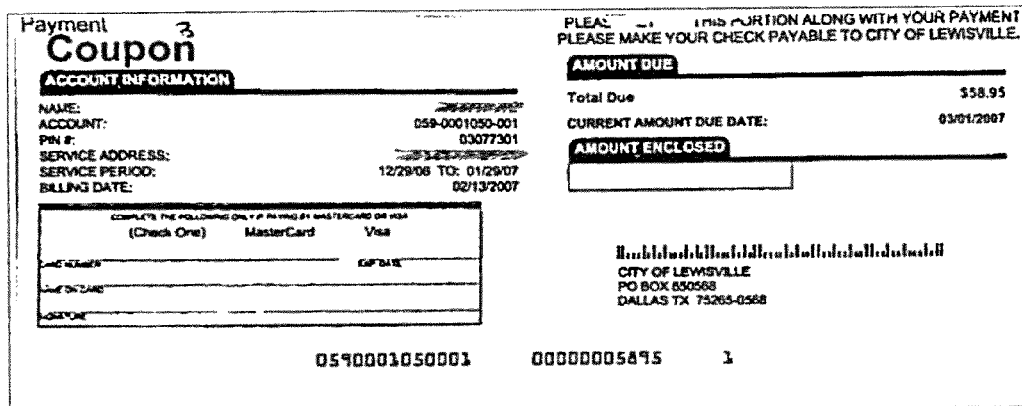
FIG. 11 illustrates an example image binarized image of a remittance coupon generated from the remittance geometrically corrected remittance coupon image illustrated in FIG. 2.

FIG. 10 illustrates a binarization method that can be used to generate a bi-tonal image from a document image according to an embodiment. The method illustrated in FIG. 10 can be used to implement the binarization step 625 of the method illustrated in FIG. 6. In an embodiment, the steps of the method illustrated in FIG. 10 can be performed within module of the mobile remittance server 310.

A binarization operation generates a bi-tonal image with color depth of 1 bit per a pixel (1 bit/pixel). In the case of documents, such as checks and deposit coupons, a bi-tonal image is required for processing by automated systems, such as Remote Deposit systems. In addition, many image processing engines require such an image as input. The method of FIG. 10 illustrates binarization of a gray-scale image of a document as produced by geometrical operation 1004. This particular embodiment uses a novel variation of well-known Niblack's method of binarization. As such, there is an assumption that the gray-scale image received has a the dimensions W pixel×H pixels and an intensity function $I(x,y)$ gives the intensity of a pixel at location $(x,y)$ in terms one of 256 possible gray-shade values (8 bit/pixel). The binarization operation will convert the 256 gray-shade value to a 2 shade value (1 bit/pixel), using an intensity function $B(x,y)$. In addition, to apply the method, a sliding window with dimensions w pixels×h pixels is defined and a threshold T for local (in-window) standard deviation of gray image intensity $I(x,y)$ is defined. The values of w, h, and T are all experimentally determined.

A gray-scale image of the document is received at step 1602, the method 1600 chooses a pixel $p(x,y)$ within the image at step 1604. In FIG. 10, the average (mean) value ave and standard deviation $\sigma$ of the chosen pixel's intensity $I(x,y)$ within the w×h current window location (neighborhood) of pixel $p(x,y)$ are computed (step 1606). If the standard deviation $\sigma$ is determined to be too small at operation 1608 (i.e. $\sigma<T$), pixel $p(x,y)$ is considered to low-contrast and, thus, part of the background. Accordingly, at step 1610, low-contrast pixels are converted to white, i.e. set $B(x,y)$ set to 1, which is white; however, if the deviation σ is determined to be larger or equal to the threshold T, i.e. σ≧T, the pixel p(x,y) is considered to be part of the foreground. In step 1612, if I(p)<ave−k*σ, pixel p is considered to be a foreground pixel and therefore B(x,y) is set to 0 (black). Otherwise, the pixel is treated as background and therefore B(x,y) is set to 1. In the formula above, k is an experimentally established coefficient.

Subsequent to the conversion of the pixel at either step 1610 or operation 1612, the next pixel is chosen at step 1614, and operation 1606 is repeated until all the gray-scale pixels (8 bit/pixel) are converted to a bi-tonal pixel (1 bit/pixel). However, if no more pixels remain to be converted 1618, the bi-tonal image of the document is then outputted at step 1620.

Conversion of Color Image to Icon Image

Figure 12:
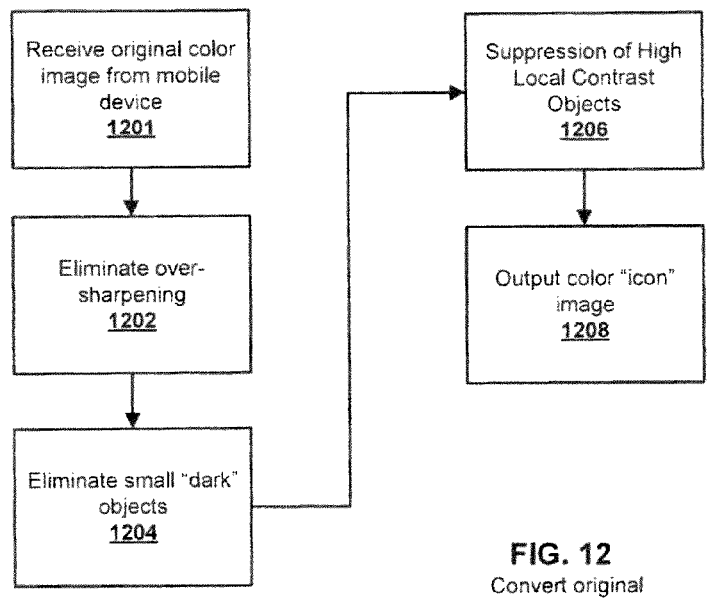
FIG. 12 is a flow diagram of a method for converting a document image into a smaller color icon image according to an embodiment.

Referring now to FIG. 12, a flowchart is provided describing an example method for conversion of a color image to a smaller "icon" image according to an embodiment. This method can be used to implement step 904 of the method illustrated FIG. 9. The smaller "icon" image preserves the color contrasts between the document depicted therein and its background, while suppressing contrasts inside the document. Upon receipt of the original color image from the mobile device (step 1201), over-sharpening is eliminated within the image (step 1202). Accordingly, assuming the color input image I has the dimensions of W×H pixels, operation 1202 averages the intensity of image I and downscales image I to image I', such that image I' has dimensions that are half that of image I (i.e. W'=W/2 and H'=H/2). Under certain embodiments, the color transformation formula can be described as the following:

$$C(p')=\text{ave}\{C(q): q \text{ in } S \times S\text{-window of } p\} \quad \text{(eq. 5)}$$

where

C is any of red, green or blue components of color intensity;
p' is any arbitrary pixel on image I' with coordinates (x',y');
p is a corresponding pixel on image I:p=p(x,y), where x=2*x' and y=2*y';
q is any pixel included into S×S-window centered in p;
S is established experimentally; and
ave is averaging over all q in the S×S-window.

Small "dark" objects within the image can then be eliminated (step 1204). Examples of such small "dark" objects include, but are not limited to, machine-printed characters and hand-printed characters inside the document. Hence, assuming operation 1204 receives image I' from step 1202, step 1204 creates a new color image I" referred to as an "icon" with width W" set to a fixed small value and height H" set to W"*(H/W), thereby preserving the original aspect ratio of image I. In some embodiments, the transformation formula can be described as the following:

$$C(p'')=\max\{C(q'): \text{ in } S'\times S'\text{-window of } p''\} \quad \text{(eq. 6)}$$

where

C is any of red, green or blue components of color intensity;
p" is an arbitrary pixel on image I";
p' is a pixel on image I' which corresponds to p" under similarity transformation, as previously defined;
q' is any pixel on image I' included into S'×S'-window centered in p';
max is maximum over all q' in the S'×S'-window;
W" is established experimentally;
S' is established experimentally for computing the intensity I"; and
I"(p") is the intensity value defined by maximizing the intensity function I' (p') within the window of corresponding pixel p' on image I', separately for each color plane.

The reason for using the "maximum" rather than "average" is to make the "icon" whiter (white pixels have a RGB-value of (255,255,255)).

Figure 13A:
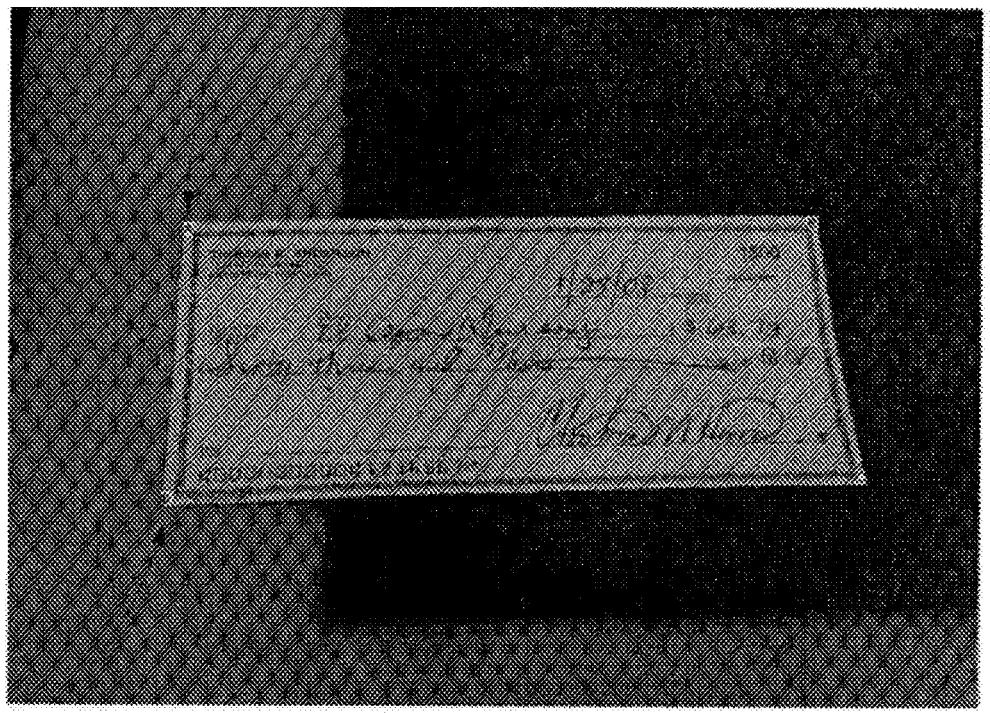
FIG. 13A is a mobile image of a check according to an embodiment.
Figure 13B:
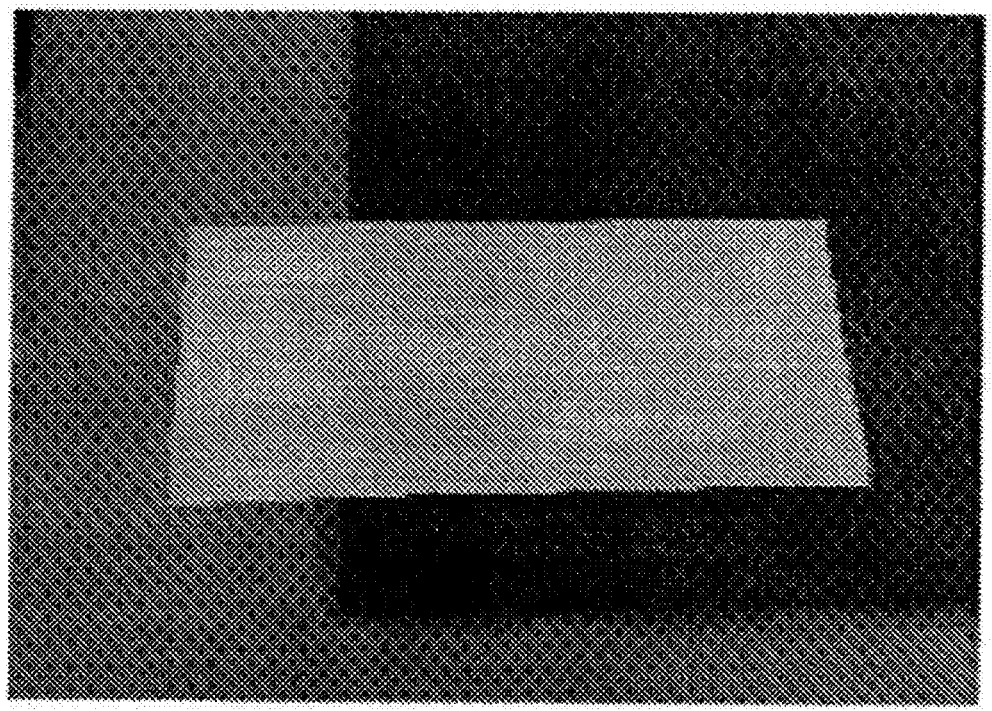
FIG. 13B is an example of a color icon image generated using the method of FIG. 12 on the example mobile image of a check illustrated in FIG. 13A according to an embodiment.

In the next operation 1206, the high local contrast of "small" objects, such as lines, text, and handwriting on a document, is suppressed, while the other object edges within the "icon" are preserved. Often, these other object edges are bold. In various embodiments of the invention, multiple dilation and erosion operations, also known as morphological image transformations, are utilized in the suppression of the high local contrast of "small" objects. Such morphological image transformations are commonly known and used by those of ordinary skill in the art. The sequence and amount of dilation and erosion operations used is determined experimentally. Subsequent to the suppression operation 1206, a color "icon" image is outputted at operation 1208. FIG. 13B depicts an example of the mobile image of a check illustrated in FIG. 13A after being converted into a color "icon" image according to an embodiment.

Color Depth Reduction

Figure 14:
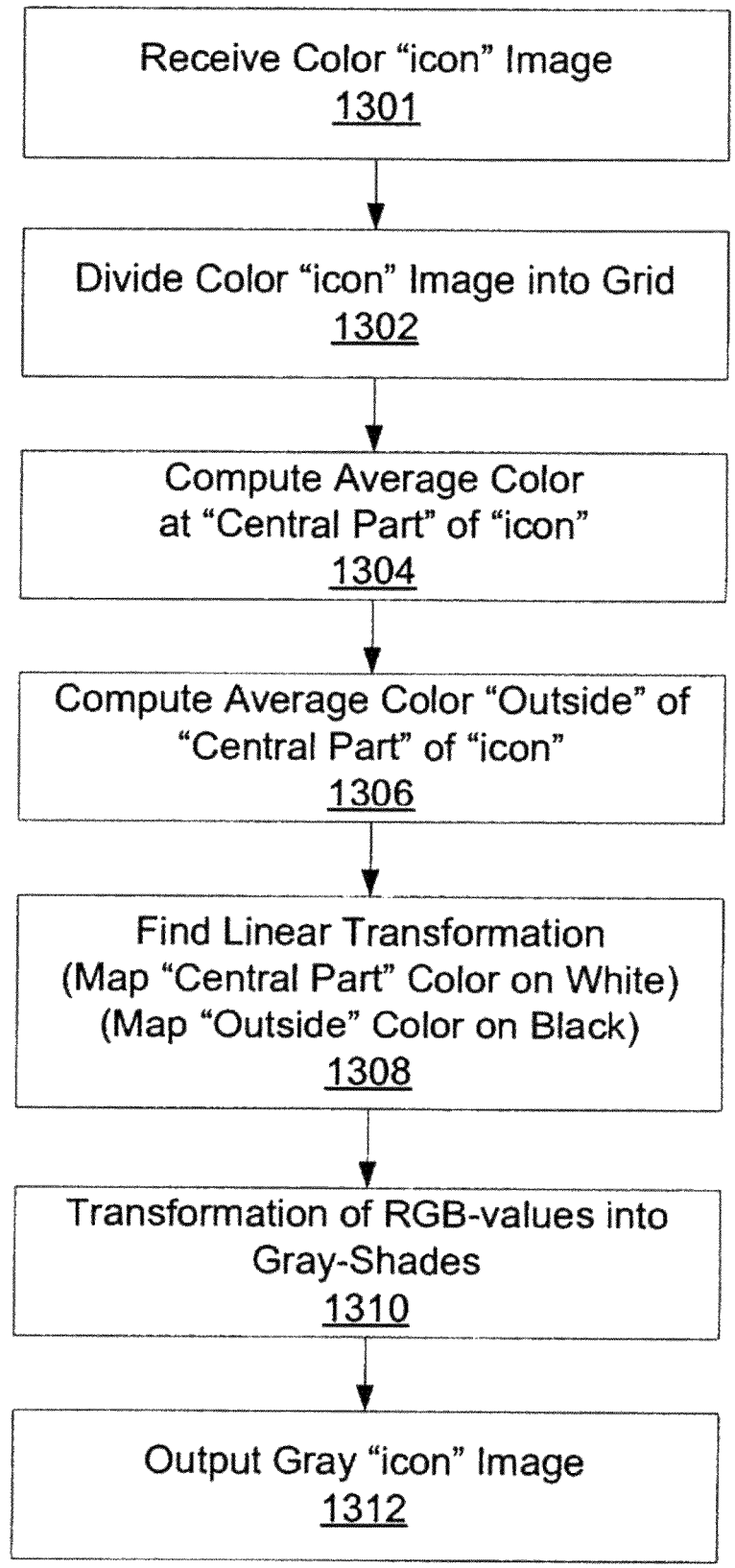
FIG. 14 is a flow diagram of a method for reducing the color depth of an image according to an embodiment.
Figure 15A:
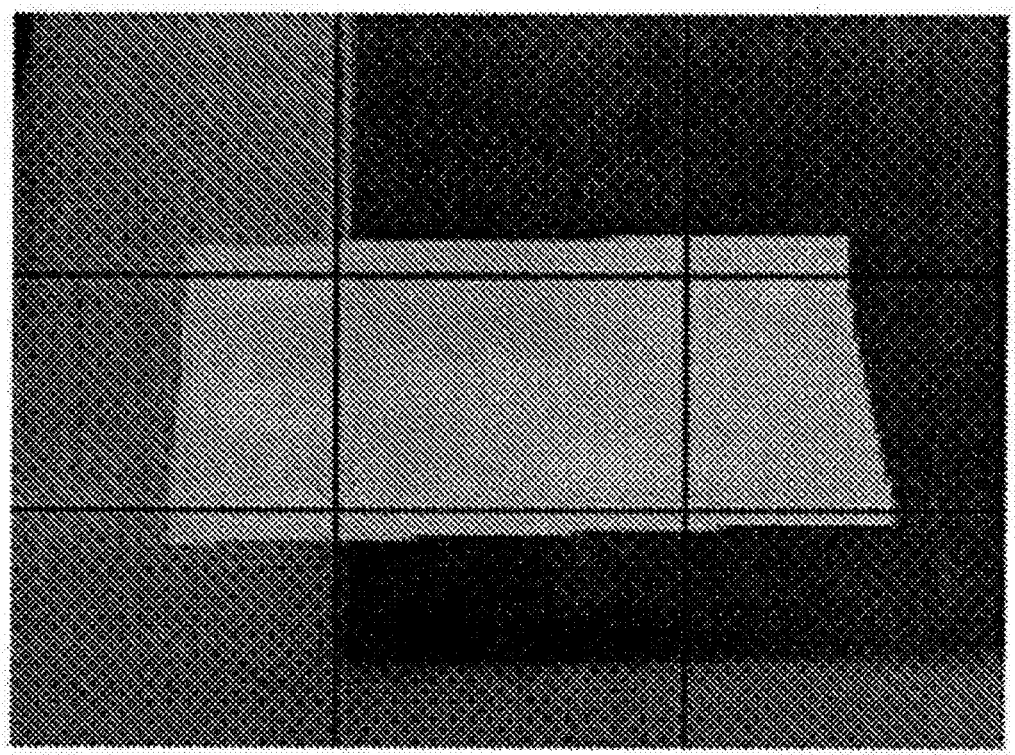
FIG. 15A depicts an example of the color "icon" image of FIG. 13B after operation 1302 has divided it into a 3×3 grid in accordance with one embodiment of the invention.

Referring now to FIG. 14, a flowchart is provided illustrating an example method that provides further details with respect to the color depth reduction operation 906 as illustrated in FIG. 9. At step 1301, a color "icon" image for color reduction is received. The color "icon" image is divided into a grid (or matrix) of fixed length and width with equal size grid elements at operation 1302. In some embodiments, the preferred grid size is such that there is a center grid element. For example, a grid size of 3×3 may be employed. FIG. 15A depicts an example of the color "icon" image of FIG. 13B after operation 1302 has divided it into a 3×3 grid in accordance with one embodiment of the invention.

Then, at step 1304, the "central part" of the icon, which is usually the center most grid element, has its color averaged. Next, the average color of the remaining parts of the icon is computed at step 1306. More specifically, the grid elements "outside" the "central part" of the "icon" have their colors averaged. Usually, in instances where there is a central grid element, e.g. 3×3 grid, the "outside" of the "central part" comprises all the grid elements other than the central grid element.

Figure 15B:
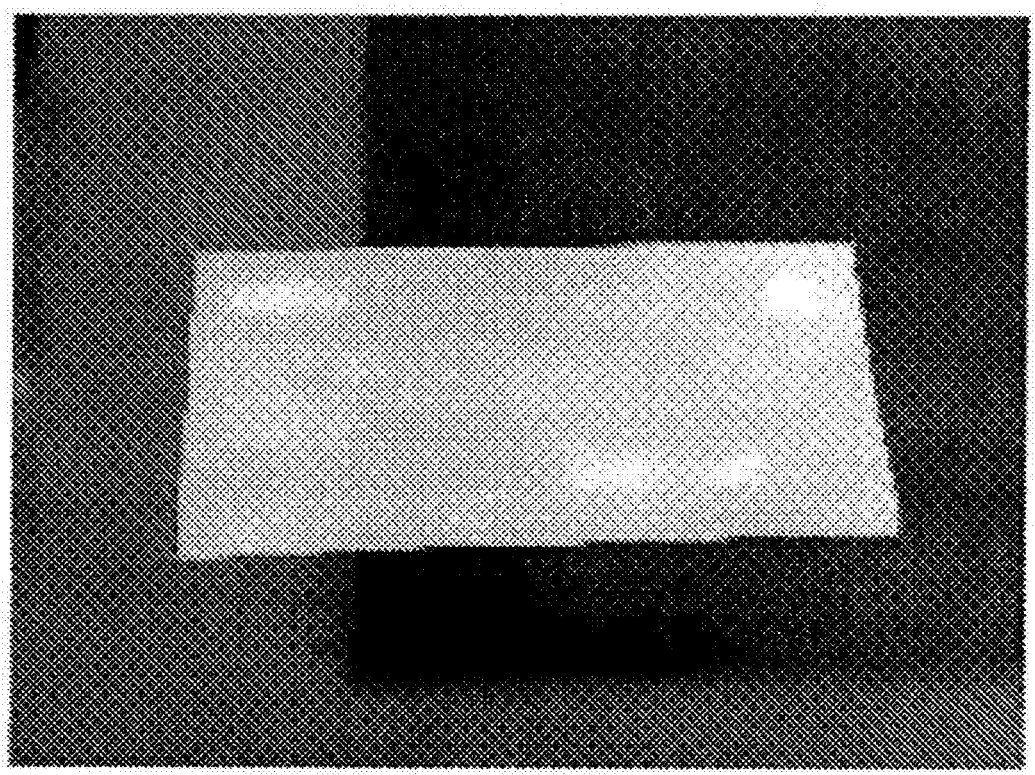
FIG. 15B depicts an example of the color "icon" image of FIG. 13B converted to a gray "icon" image using the method illustrated in FIG. 14 according to an embodiment.

Subsequently, a linear transformation for the RGB-space is determined at step 1308. The linear transformation is defined such that it maps the average color of the "central part" computed during operation 1304 to white, i.e. 255, while the average color of the "outside" computed during operation 1306 maps to black, i.e. 0. All remaining colors are linearly mapped to a shade of gray. This linear transformation, once determined, is used at operation 1310 to transform all RGB-values from the color "icon" to a gray-scale "icon" image, which is then outputted at operation 1312. Within particular embodiments, the resulting gray "icon" image, also referred to as a gray-scale "icon" image, maximizes the contrast between the document background, assuming that the document is located close to the center of the image and the background. FIG. 15B depicts an example of the color "icon" image of FIG. 13B once it has been converted to a gray "icon" image in accordance with one embodiment.

Figure 16:
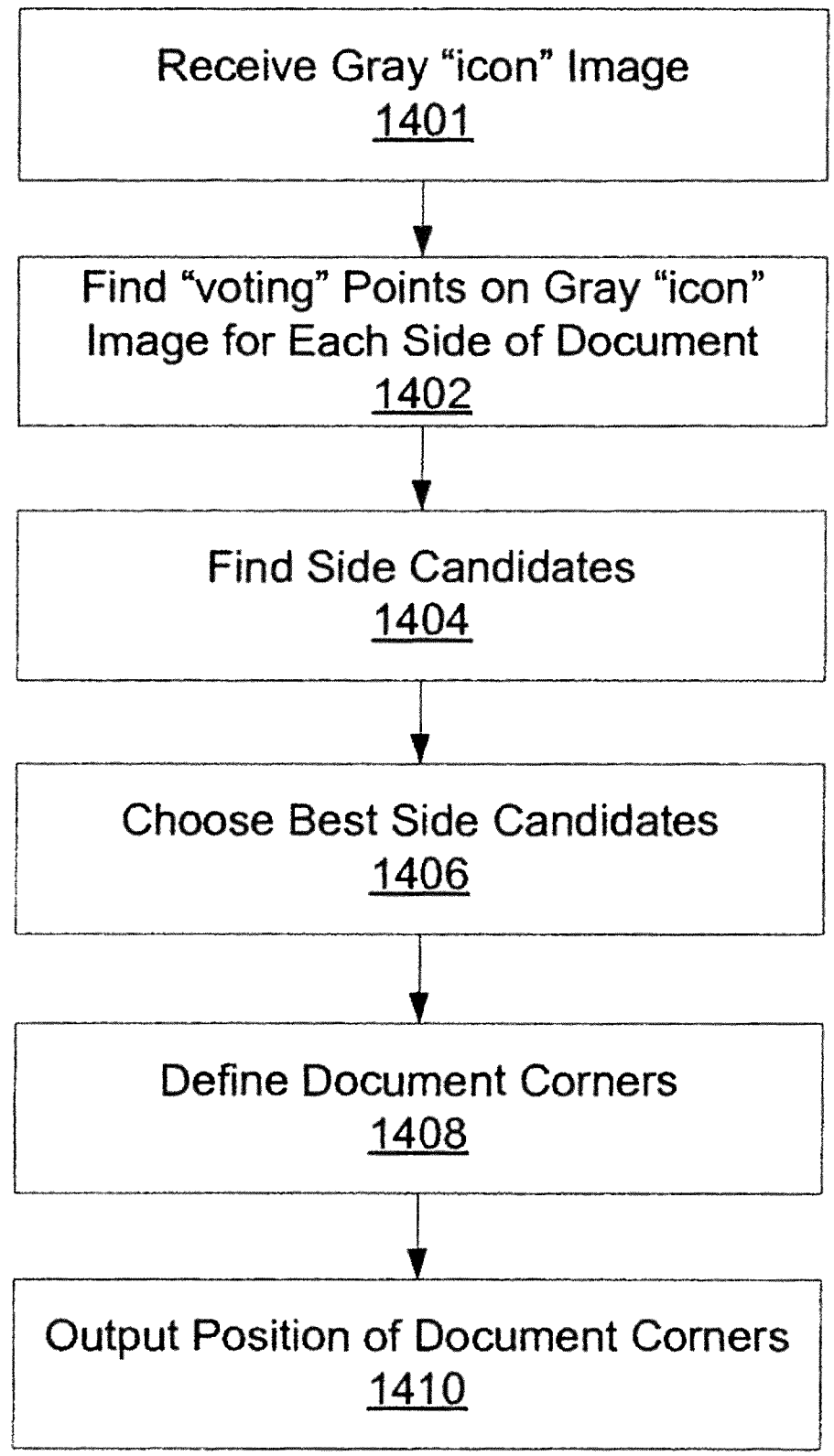
FIG. 16 is a flowchart illustrating an example method for finding document corners from a gray "icon" image containing a document according to an embodiment.

Referring now to FIG. 16, a flowchart is provided illustrating an example method for finding document corners from a gray "icon" image containing a document. The method illustrated in FIG. 16 can be used to implement step 908 of the method illustrated in FIG. 9. Upon receiving a gray "icon" image at operation 1401, the "voting" points on the gray "icon" image are found in step 1402 for each side of the document depicted in the image. Consequently, all positions on the gray "icon" image that could be approximated with straight line segments to represent left, top, right, and bottom sides of the document are found.

In accordance with one embodiment, this goal is achieved by first looking for the "voting" points in the half of the "icon" that corresponds with the current side of interest. For instance, if the current side of interest is the document's top side, the upper part of the "icon" (Y<H/2) is examined while the bottom part of the "icon" (Y≧H/2) is ignored.

Within the selected half of the "icon," the intensity gradient (contrast) in the correct direction of each pixel is computed. This is accomplished in some embodiments by considering a small window centered in the pixel and, then, breaking the window into an expected "background" half where the gray intensity is smaller, i.e. where it is supposed to be darker, and into an expected "doc" half where the gray intensity is higher, i.e. where it is supposed to be whiter. There is a break line between the two halves, either horizontal or vertical depending on side of the document sought to be found. Next the average gray intensity in each half-window is computed, resulting in an average image intensity for the "background" and an average image intensity of the "doc." The intensity gradient of the pixel is calculated by subtracting the average image intensity for the "background" from the average image intensity for the "doc."

Eventually, those pixels with sufficient gray intensity gradient in the correct direction are marked as "voting" points for the selected side. The sufficiency of the actual gray intensity gradient threshold for determining is established experimentally.

Continuing with method 1400, candidate sides, i.e. line segments that potentially represent the sides of the document, i.e. left, top, right, and bottom sides, are found. In order to do so, some embodiments find all subsets within the "voting" points determined in step 1402 that could be approximated by a straight line segment (linear approximation). In many embodiments, the threshold for linear approximation is established experimentally. This subset of lines is defined as the side "candidates." As an assurance that the set of side candidates is never empty, the gray "icon" image's corresponding top, bottom, left, and right sides are also added to the set.

Next, in step 1406 chooses the best candidate for each side of the document from the set of candidates selected in operation 1404, thereby defining the position of the document within the gray "icon" image. In accordance with some embodiments, the following process is used in choosing the best candidate for each side of the document:

The process starts with selecting a quadruple of line segments {L, T, R, B}, where L is one of the candidates for the left side of the document, T is one of the candidates for the top side of the document, R is one of the candidates for the right side of the document, and B is one of the candidates for the bottom side of the document. The process then measures the following characteristics for the quadruple currently selected.

The amount of "voting" points is approximated and measured for all line segments for all four sides. This amount value is based on the assumption that the document's sides are linear and there is a significant color contrast along them. The larger values of this characteristic increase the overall quadruple rank.

The sum of all intensity gradients over all voting points of all line segments is measured. This sum value is also based on the assumption that the document's sides are linear and there is a significant color contrast along them. Again, the larger values of this characteristic increase the overall quadruple rank.

The total length of the segments is measured. This length value is based on the assumption that the document occupies a large portion of the image. Again, the larger values of this characteristic increase the overall quadruple rank.

The maximum of gaps in each corner is measured. For example, the gap in the left/top corner is defined by the distance between the uppermost point in the L-segment and the leftmost point in the T-segment. This maximum value is based on how well the side-candidates suit the assumption that the document's shape is quadrangle. The smaller values of this characteristic increase the overall quadruple rank.

The maximum of two angles between opposite segments, i.e. between L and R, and between T and R, is measured. This maximum value is based on how well the side-candidates suit the assumption that the document's shape is close to parallelogram. The smaller values of this characteristic increase the overall quadruple rank.

The deviation of the quadruple's aspect ratio from the "ideal" document aspect ratio is measured. This characteristic is applicable to documents with a known aspect ratio, e.g. checks. If the aspect ratio is unknown, this characteristic should be excluded from computing the quadruple's rank. The quadruple's aspect ratio is computed as follows:
   a) Find the quadrangle by intersecting the quadruple's elements;
   b) Find middle-point of each of the four quadrangle's sides;
   c) Compute distances between middle-points of opposite sides, say D1 and D2;
   d) Find the larger of the two ratios: R=max(D1/D2, D2/D1);
   e) Assuming that the "ideal" document's aspect ratio is known and Min/MaxAspectRatio represent minimum and maximum of the aspect ratio respectively, define the deviation in question as:
      0, if MinAspectRatio<=R<=MaxAspectRatio
      MinAspectRatio−R, if R<MinAspectRatio
      R−MaxAspectRatio, if R>MaxAspectRatio.
   f) For checks, MinAspectRatio can be set to 2.0 and MaxAspectRatio can be set to 3.0.

This aspect ratio value is based on the assumption that the document's shape is somewhat preserved during the perspective transformation. The smaller values of this characteristic increase the overall quadruple rank.

Following the measurement of the characteristics of the quadruple noted above, the quadruple characteristics are combined into a single value, called the quadruple rank, using weighted linear combination. Positive weights are assigned for the amount of "voting" points, the sum all of intensity gradients, and the total length of the segments. Negatives weights are assigned for maximum gaps in each corner, maximum two angles between opposite segments, and the deviation of the quadruple's aspect ratio. The exact values of each of the weights are established experimentally.

The operations set forth above are repeated for all possible combinations of side candidates, eventually leading to the "best" quadruple, which is the quadruple with the highest rank. The document's corners are defined as intersections of the "best" quadruple's sides, i.e. the best side candidates.

In, step 1408 the corners of the document are defined using the intersections of the best side candidates. A person of ordinary skill in the art would appreciate that these corners can then be located on the original mobile image by transforming the corner locations found on the "icon" using the similarity transformation previously mentioned. Method 1400 concludes at step 1410 where the locations of the corners defined in step 1408 are output.

Geometric Correction

Figure 17:
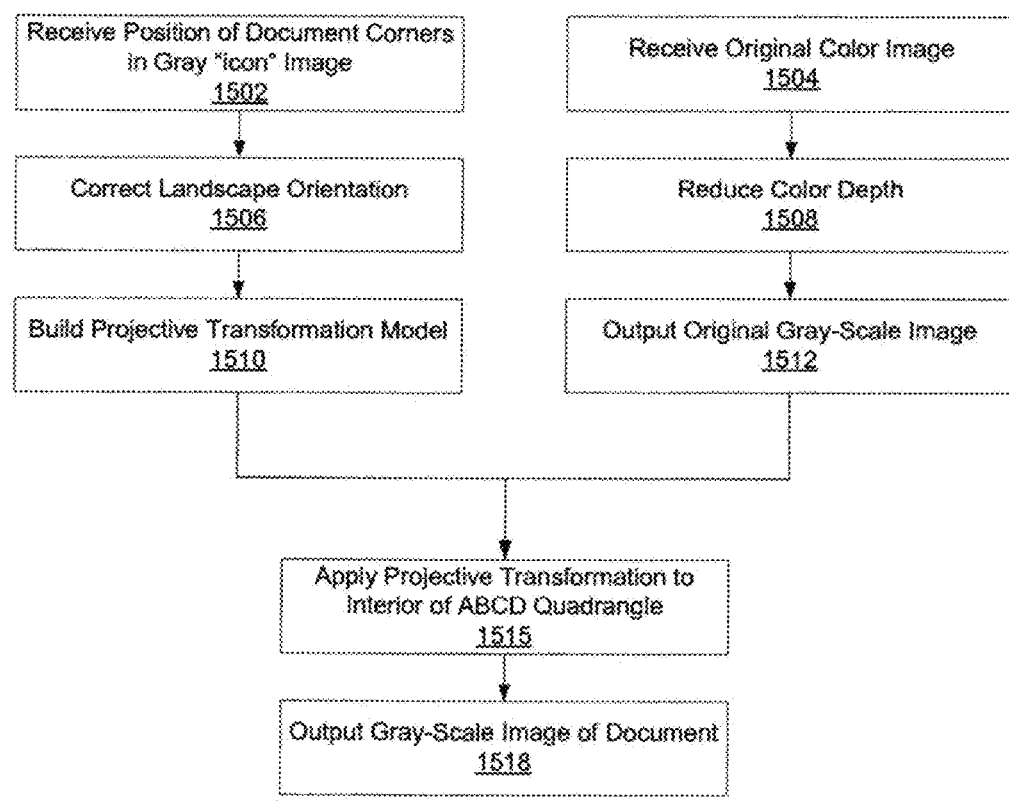
FIG. 17 is a flowchart that illustrates an example method for geometric correction according to an embodiment.

FIG. 17 provides a flowchart that illustrates an example method for geometric correction in accordance with the invention according to an embodiment. According to an embodiment, the method illustrated in FIG. 17 can be used to implement steps 610, 615, and 635 of the method illustrated in FIG. 6. As previously mentioned, geometric correction is needed to correct any possibly perspective distortions that exist in the original mobile image. Additionally, geometric correction can correct the orientation of the documentation within the original mobile image, e.g. document is orientated at 90, 180, or 270 degrees where the right-side-up orientation is 0 degrees. It should be noted that in some embodiments, the orientation of the document depends on the type of document depicted in the mobile image, as well as the fields of relevance on the document.

Figure 18A:
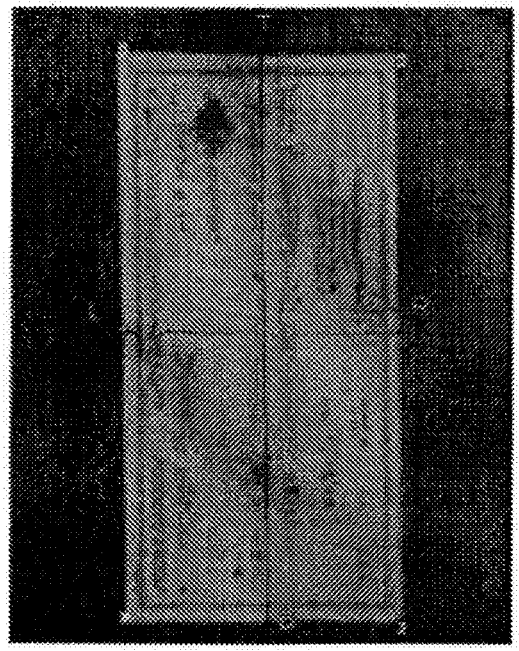
FIG. 18A is an image illustrating a mobile image of a check that is oriented in landscape orientation according to an embodiment.

In instances where the document is in landscape orientation (90 or 270 degrees), as illustrated by the check in FIG. 18A, geometric correction is suitable for correcting the orientation of the document. Where the document is at 180 degree orientation, detection of the 180 degree orientation and its subsequent correction are suitable when attempting to locate an object of relevance on the document. A codeline for a remittance coupon can be located in various locations on the remittance coupon, and might not be located along the bottom of the coupon. The ability to detect a codeline in an image of the remittance coupon changes significantly after the document has been rotated 180-degrees. In contrast, the MICR-line of check is generally known to be at a specific location along the bottom of the document, and the MICR-line can be used to determine the current orientation of the check within the mobile image. In some embodiments, the object of relevance on a document depends on the document's type. For example, where the document is a contract, the object of relevance may be a notary seal, signature, or watermark positioned at a known position on the contract. Greater detail regarding correction of a document (specifically, a check) having upside-down orientation (180 degree orientation) is provided with respect to FIG. 19.

According to some embodiments, a mathematical model of projective transformations is built and converts the distorted image into a rectangle-shaped image of predefined size. According to an embodiment, this step corresponds to step 610 of FIG. 6. In an example, where the document depicted in mobile image is a check, the predefined size is established as 1200×560 pixels, which is roughly equivalent to the dimensions of a personal check scanned at 200 DPI. In other embodiments, where the document depicted is a remittance coupon, the size of the remittance coupons may not be standardized. However, the size and spacing of the characters comprising the code line can be used to determine a scaling factor to be applied to the image to correct the size of the image of the remittance coupon relative to a specific resolution.

Continuing with reference to the method of FIG. 17, there are two separate paths of operations that are either performed sequentially or concurrently, the outputs of which are eventually utilized in the final output. One path of operations begins at step 1504 where the original mobile image in color is received. In step 1508, the color depth of the original mobile image is reduced from a color image with 24 bit per a pixel (24 bit/pixel) to a gray-scale image with 8 bit per a pixel (8 bit/pixel). This image is subsequently outputted to step 1516 as a result of step 1512.

The other path of operations begins at step 1502, where the positions of the document's corners within the gray "icon" image are received. Based off the location of the corners, the orientation of the document is determined and the orientation is corrected (step 1506). In some embodiments, this operation uses the corner locations to measure the aspect ratio of the document within the original image. Subsequently, a middle-point between each set of corners can be found, wherein each set of corners corresponds to one of the four sides of the depicted document, resulting in the left (L), top (T), right (R), and bottom (B) middle-points (step 1506). The distance between the L to R middle-points and the T to B middle points are then compared to determine which of the two pairs has the larger distance. This provides step 1506 with the orientation of the document.

In some instances, the correct orientation of the document depends on the type of document that is detected. For example, as illustrated in FIG. 18A, where the document of interest is a check, the document is determined to be in landscape orientation when the distance between the top middle-point and bottom middle-point is larger than the distance between the left middle-point and the right middle-point. The opposite might be true for other types of documents.

If it is determined in step 1506 that an orientation correction is necessary, then the corners of the document are shifted in a loop, clock-wise in some embodiments and counter-clockwise in other embodiments.

At step 1510, the projective transformation is built to map the image of the document to a predefined target image size of width of W pixels and height of H pixels. In some embodiments, the projective transformation maps the corners A, B, C, and D of the document as follows: corner A to (0,0), corner B to (W,0), corner C to (W,H), and corner D to (0,H). Algorithms for building projective transformation are commonly known and used amongst those of ordinary skill in the art.

Figure 18B:
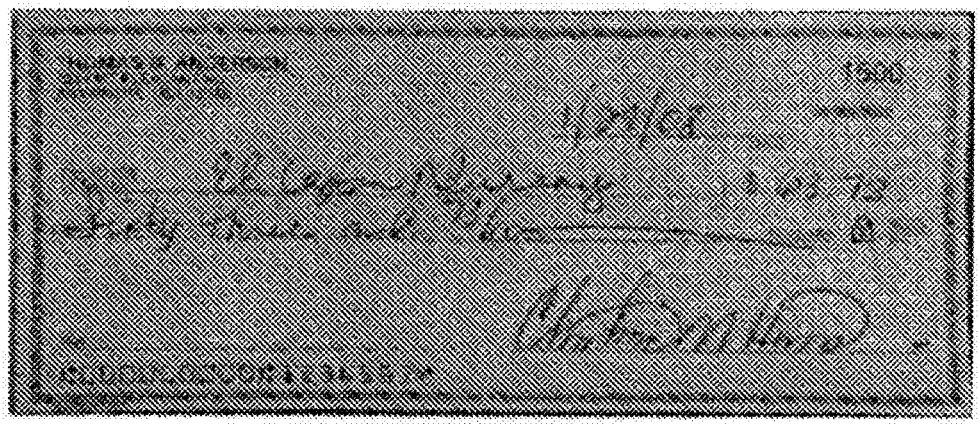
FIG. 18B example gray-scale image of the document depicted in FIG. 13A once a geometrical correction operation has been applied to the image according to an embodiment.

At step 1516, the projective transformation created during step 1514 is applied to the mobile image in gray-scale as outputted as a result of step 1512. The projective transformation as applied to the gray-scale image of step 1512 results in all the pixels within the quadrangle ABCD depicted in the gray-scale image mapping to a geometrically corrected, gray-scale image of the document alone. FIG. 18B is an example gray-scale image of the document depicted in FIG. 13A once a geometrical correction operation in accordance with the invention is applied thereto. The process concludes at operation 1518 where the gray-scale image of the document is outputted to the next operation.

Correcting Landscape Orientation

Figure 19:
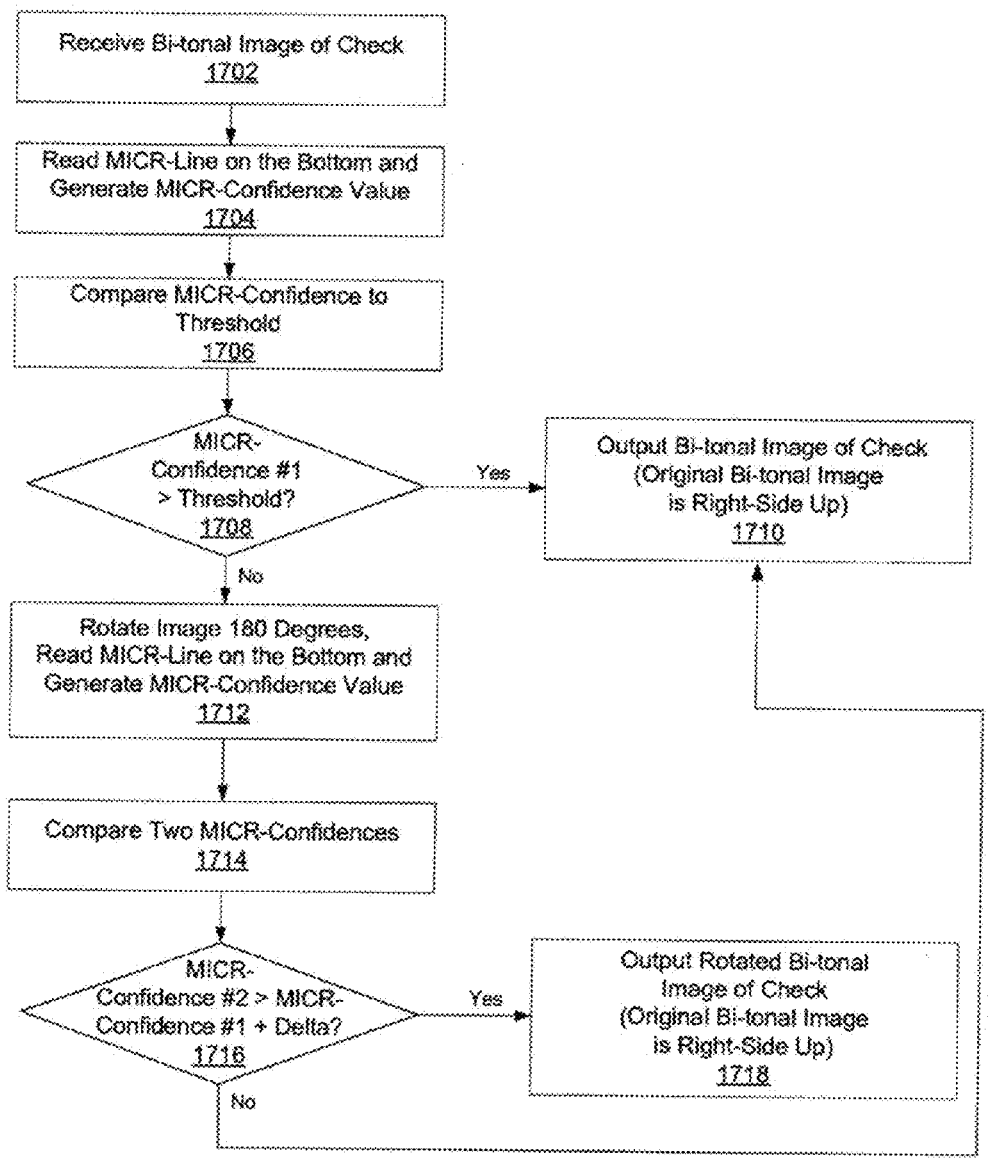
FIG. 19 is a flow chart illustrating a method for correcting landscape orientation of a document image according to an embodiment.

FIG. 19 is a flow chart illustrating a method for correcting landscape orientation of a document image according to an embodiment. As previously noted, the geometric correction operation as described in FIG. 17 is one method in accordance with the invention for correcting a document having landscape orientation within the mobile image. However, even after the landscape orientation correction, the document still may remain in upside-down orientation. In order to the correct upside-down orientation for certain documents, some embodiments of the invention require the image containing the document be binarized beforehand. Hence, the orientation correction operation included in step 635 usually follows the binarization operation of 625. While the embodiment described herein uses the MICR-line of a check or determine the orientation of an image, the code line of a remittance coupon can be used to determine the orientation of a remittance coupon using the technique described herein.

Upon receiving the bi-tonal image of the check at operation 1702, the MICR-line at the bottom of the bi-tonal check image is read at operation 1704 and an MICR-confidence value is generated. This MICR-confidence value (MC1) is compared to a threshold value T at operation 1706 to determine whether the check is right-side-up. If MC1>T at operation 1708, then the bi-tonal image of the check is right side up and is outputted at operation 1710.

However, if MC1≦T at operation 1708, then the image is rotated 180 degrees at operation 1712, the MICR-line at the bottom read again, and a new MICR-confidence value generated (MC2). The rotation of the image by 180 degree is done by methods commonly-known in the art. The MICR-confidence value after rotation (MC2) is compared to the previous MICR-confidence value (MC1) plus a Delta at operation 1714 to determine if the check is now right-side-up. If MC2>MC2+Delta at operation 1716, the rotated bi-tonal image has the check right-side-up and, thus, the rotated image is outputted at operation 1718. Otherwise, if MC2≦MC2+Delta at operation 1716, the original bi-tonal image of the check is right-side-up and outputted at operation 1710. Delta is a positive value selected experimentally that reflects a higher apriori probability of the document initially being right-side-up than upside-down.

Size Correction

FIG. 20 provides a flowchart illustrating an example method for size correction of an image according to an embodiment. The method of FIG. 20 can be used to implement the size correction step described in relation to step 630 of FIG. 6. Specifically, FIG. 20 illustrates an example method, in accordance with one embodiment, for correcting the size of a check within a bi-tonal image, where the check is oriented right-side-up. A person of ordinary skill in the art would understand and appreciate that this method can operate differently for other types of documents, e.g. deposit coupons, remittance coupons.

Since many image processing engines are sensitive to image size, it is crucial that the size of the document image be corrected before it can be properly processed. For example, a form identification engine may rely on the document size as an important characteristic for identifying the type of document that is being processed. Generally, for financial documents such as checks, the image size should be equivalent to the image size produced by a standard scanner running at 200 DPI.

In addition, where the document is a check, during the geometric correction operation of some embodiments of the invention, the geometrically corrected predefined image size is at 1200×560 pixels (See, for e.g., FIG. 15 description), which is roughly equivalent to the size of a personal check scanned at 200 DPI; however, the size of business checks tend to vary significantly, with most business checks having a width greater than 1200 pixels when scanned at 200 DPI. Some business checks are known to be as wide as 8.75", which translates to be 1750 pixels in width when scanned at 200 DPI. Hence, in order to restore the size of business checks that have been geometrically corrected in accordance with the invention at a predefined image size of 1200×560 pixels, the size correction operation is performed.

Referring now to FIG. 20, after receiving a bi-tonal image containing a check that is orientated right-side-up at operation 1802, the MICR-line at the bottom of the check is read at operation 1804. This allows the average width of the MICR-characters to be computed at operation 1806. In doing so, the computer average width gets compared to the average size of an MICR-character at 200 DPI at operation 1808, and a scaling factor is computed accordingly. In some embodiments of the invention, the scaling factor SF is computer as follows:

$$SF = AW_{200}/AW \quad \text{(eq. 7)}$$

where

AW is the average width of the MICR-character found; and $AW_{200}$ is the corresponding "theoretical" value based on the ANSI x9.37 standard (Specifications for Electronic Exchange of Check and Image Data) at 200 DPI.

The scaling factor is used at operation 1810 to determine whether the bi-tonal image of the check requires size correction. If the scaling SF is determined to be less than or equal to 1.0+Delta, then the most recent versions of the check's bi-tonal image and the check's the gray-scale image are output at operation 1812. Delta defines the system's tolerance to wrong image size.

If, however, the scaling factor SF is determined to be higher than 1.0+Delta, then at operation 1814 the new dimensions of the check are computed as follows:

$$AR = H_S/W_S \quad \text{(eq. 8)}$$

$$W' = W*SF \quad \text{(eq. 9)}$$

$$H' = AR*W' \quad \text{(eq. 10)}$$

where $H_S$ and $W_S$ are the height and width of the check snippet found on the original image;

AR is the check aspect ratio which we want to maintain while changing the size;

W is the width of geometrically corrected image before it's size is adjusted;

W' is the adjusted check's width in pixels; and

H' is the adjusted check's height in pixels.

Subsequent to re-computing the new dimensions, operation 1814 repeats geometrical correction and binarization using the newly dimensioned check image. Following the repeated operations, operation 1812 outputs the resulting bi-tonal image of the check and gray-scale image of the check.

Image Quality Assurance

Once the mobile remittance server 310 has processed a mobile image (see step 510 of the method illustrated in FIG. 5), the mobile remittance server 310 can be configured to perform image quality assurance processing on the mobile image to determine whether the quality of the image is sufficient to submit to a remittance processor 215.

Figure 21:
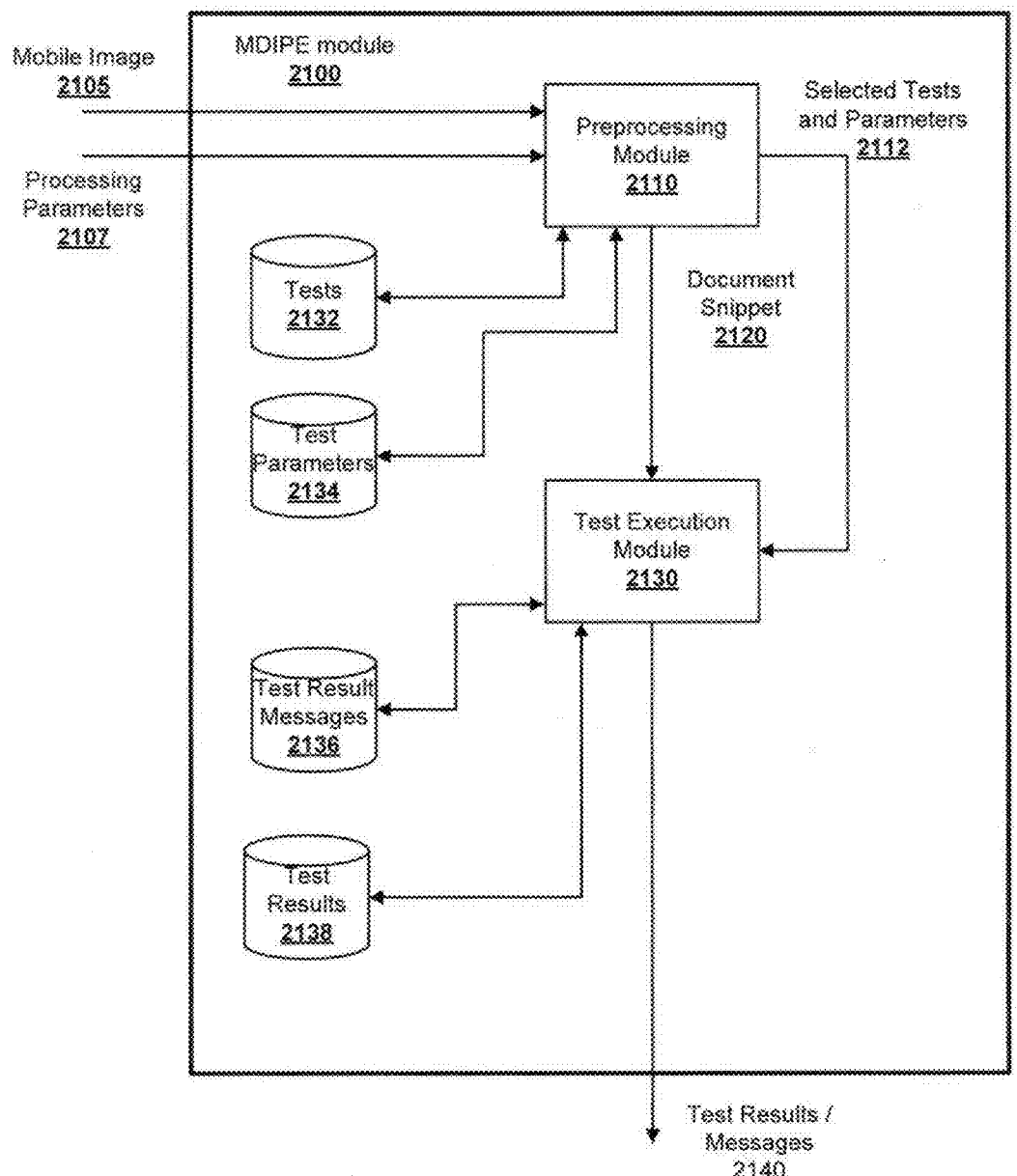
FIG. 21 illustrates a mobile document image processing engine (MDIPE) module 2100 for performing quality assurance testing on mobile document images according to an embodiment.

FIG. 21 illustrates a mobile document image processing engine (MDIPE) module 2100 for performing quality assurance testing on mobile document images according to an embodiment. The MDIPE module 2100 can receive a mobile document image captured by a mobile device, or multiple mobile images for some tests; perform preprocessing on the mobile document image; select tests to be performed on the mobile document image; and execute the selected tests to determine whether the quality of the image of a high enough quality for a particular mobile application. The MDIPE module 2100 includes a preprocessing module 2110 and test execution module 2130. The preprocessing module 2110 can be configured to receive a mobile image 2105 captured using a camera of a mobile device as well as processing parameters 2107. According to an embodiment, the mobile image 2105 and the processing parameters 2107 can be passed to MDIPE 2100 by a mobile application on the mobile device where the mobile application provides the mobile image 2105 to the MDIPE 2100 to have the quality of the mobile image 2105 assessed.

The processing parameters 2107 can include various information that the MDIPE 2100 can use to determine which tests to run on the mobile image 2105. For example, the processing parameters 2107 can identify the type of device used to capture the mobile image 2105, the type of mobile application that will be used to process the mobile image if the mobile image passes the IQA testing, or both. The MDIPE 2100 can use this information to determine which tests to select from test data store 2132 and which test parameters to select from test parameter data store 2134. For example, if a mobile image is being tested for a mobile deposit application that expects an image of a check, a specific set of tests related to assessing the image quality for a mobile image of a check can be selected, such as an MICR-line test, or a test for whether an image is blurry, etc. The MDIPE 2100 can also select test parameters from test parameters data store 2134 that are appropriate for the type of image to be processed, or for the type of mobile device that was used to capture the image, or both. In an embodiment, different parameters can be selected for different mobile phones that are appropriate for the type of phone used to capture the mobile image. For example, some mobile phones might not include an autofocus feature.

The preprocessing module 2110 can process the mobile document image to extract a document snippet that includes the portion of the mobile document that actually contains the document to be processed. This portion of the mobile document image is also referred to herein as the document subimage. The preprocessing module 2110 can also perform other processing on the document snippet, such as converting the image to a grayscale or bi-tonal document snippet, geometric correction of the document subimage to remove view distortion, etc. Different tests can require different types of preprocessing to be performed, and the preprocessing module 2110 can produce mobile document snippets from a mobile document image depending on the types of mobile IQA tests to be executed on the mobile document image.

The test execution module 2130 receives the selected tests and test parameters 2112 and the preprocessed document snippet (or snippets) 120 from the preprocessing mobile 110. The test execution module 2130 executes the selected tests on the document snippet generated by the preprocessing module 2110. The test execution module 2130 also uses the test parameters provided by the preprocessing module 2110 when executing the test on the document snippet. The selected tests can be a series of one or more tests to be executed on the document snippets to determine whether the mobile document image exhibits geometrical or other defects.

The test execution module 2130 executes each selected test to obtain a test result value for that test. The test execution module 2130 then compares that test result value to a threshold value associated with the test. If the test result value is equal to or exceeds the threshold, then the mobile image has passed the test. Otherwise, if the test result value is less than the threshold, the mobile document image has failed the test. According to some embodiments, the test execution module 2130 can store the test result values for the tests performed in test results data store 2138.

According an embodiment, the test threshold for a test can be stored in the test parameters data store 2134 and can be fetched by the preprocessing module 2110 and included with the test parameters 2112 provided to the test execution module 2130. According to an embodiment, different thresholds can be associated with a test based on the processing parameters 2107 received by the preprocessing module 2110. For example, a lower threshold might be used for an image focus IQA test for image capture by camera phones that do not include an autofocus feature, while a higher threshold might be used for the image focus IQA test for image capture by camera phones that do include an autofocus feature.

According to an embodiment, a test can be flagged as "affects overall status." These tests are also referred to here as "critical" tests. If a mobile image fails a critical test, the MDIPE 2100 rejects the image and can provide detailed information to the mobile device user explaining why the image was not of a high enough quality for the mobile application and that provides guidance for retaking the image to correct the defects that caused the mobile document image to fail the test, in the event that the defect can be corrected by retaking the image.

According to an embodiment, the test result messages provided by the MDIPE 2100 can be provided to the mobile application that requested the MDIPE 2100 perform the quality assurance testing on the mobile document image, and the mobile application can display the test results to the user of the mobile device. In certain embodiments, the mobile application can display this information on the mobile device shortly after the user takes the mobile document image to allow the user to retake the image if the image is found to have defects that affect the overall status of the image. In some embodiments, where the MDIPE 2100 is implemented at least in part on the mobile device, the MDIPE 2100 can include a user interface module that is configured to display the test results message on a screen of the mobile device.

FIG. 21 merely provides a description of the logical components of the MDIPE 2100. In some embodiments, the MDIPE 2100 can be implemented on the mobile device 340, in software, hardware, or a combination thereof. In other embodiments, the MDIPE 2100 can be implemented on the mobile remittance server 310, and the mobile device can send the mobile image 2105 and the processing parameters 2107, e.g., via a wireless interface, to the mobile remittance server 310 for processing, and the mobile remittance server 310 can send the test results and test messages 2140 to the mobile device to indicate whether the mobile image passed testing. In some embodiments, part of the functionality of the MDIPE 2100 can be implemented on the mobile device while other parts of the MDIPE 2100 are implemented on the remote server. The MDIPE 2100 can be implemented in software, hardware, or a combination thereof. In still other embodiments, the MDIPE 2100 can be implemented entirely on the remote server, and can be implemented using appropriate software, hardware, or a combination there.

Figure 22:
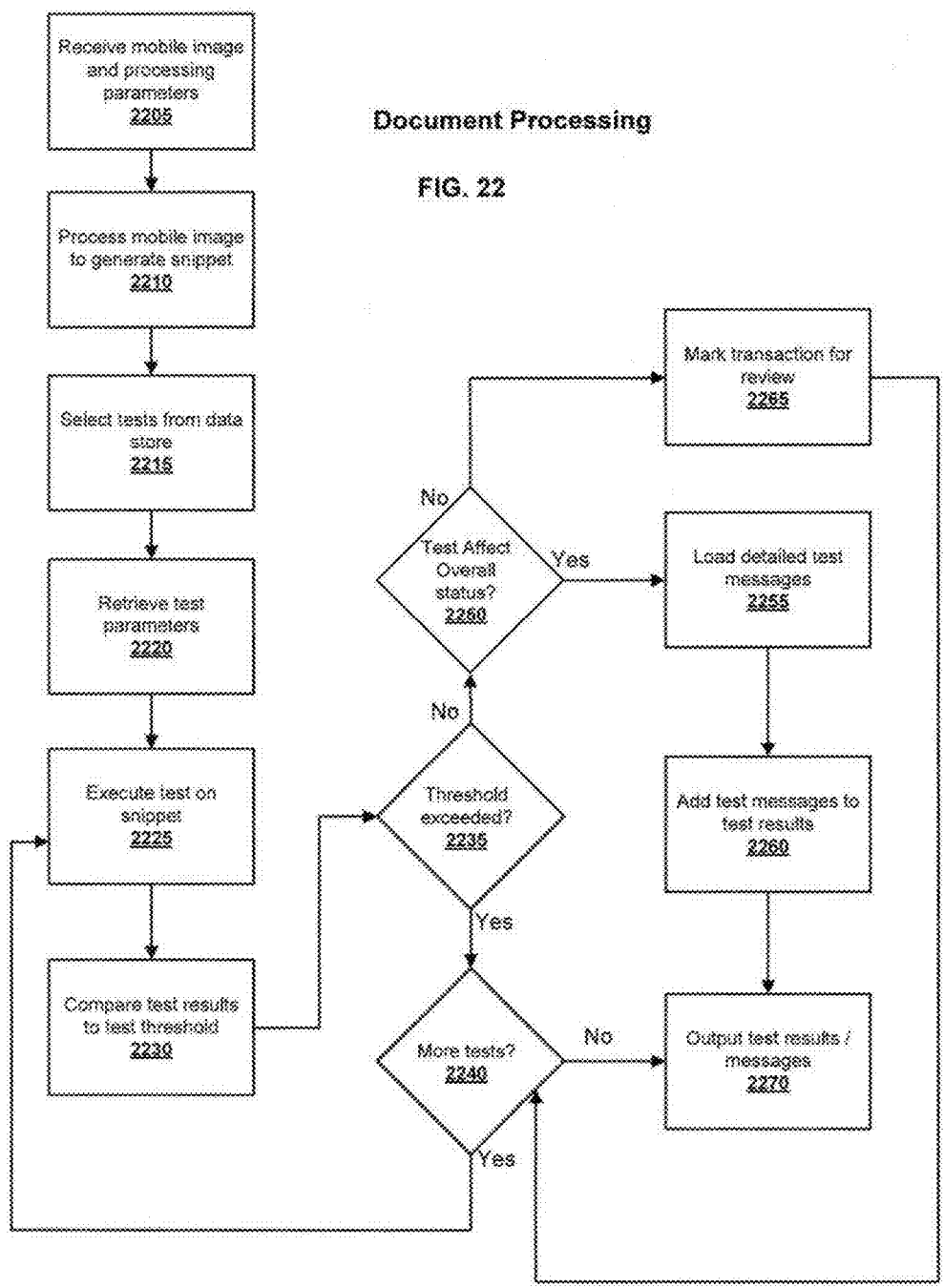
FIG. 22 is a flow diagram of a process for performing mobile image quality assurance on an image captured by a mobile device according to an embodiment.

FIG. 22 is a flow diagram of a process for performing mobile image quality assurance on an image captured by a mobile device according to an embodiment. The process illustrated in FIG. 22 can be performed using the MDIPE 2100 illustrated in FIG. 21.

The mobile image 2105 captured by a mobile device is received (step 2205). The mobile image 2105 can also be accompanied by one or more processing parameters 2107.

As described above, the MDIPE 2100 can be implemented on the mobile device, and the mobile image can be provided by a camera that is part of or coupled to the mobile device. In some embodiments, the MDIPE 2100 can also be implemented at least in part on a remote server, and the mobile image 2105 and the processing parameters 2107 can be transmitted to the remove server, e.g., via a wireless interface included in the mobile device.

Once the mobile image 2105 and the processing parameters 2107 have been received, the mobile image is processed to generate a document snippet or snippets (step 2210). For example, preprocessing module 2110 of MDIPE 2100 can be used to perform various preprocessing on the mobile image. One part of this preprocessing includes identifying a document subimage in the mobile image. The subimage is the portion of the mobile document image that includes the document. The preprocessing module 2110 can also perform various preprocessing on the document subimage to produce what is referred to herein as a "snippet." For example, some tests can require that a grayscale image of the subimage be created. The preprocessing module 2110 can create a grayscale snippet that represents a grayscale version of the document subimage. In another example, some tests can require that a bitonal image of the subimage be created. The preprocessing module 2110 can create a bitonal snippet that represents a bitonal version of the document subimage. In some embodiments, the MDIPE 2100 can generate multiple different snippets based on the types of tests to be performed on the mobile document image.

After processing the mobile document image to generate a snippet, the MDIPE 2100 then selects one or more tests to be performed on the snippet or snippets (step 2215). In an embodiment, the tests to be performed can be selected from test data store 2132. In an embodiment, the MDIPE 2100 selects the one or more tests based on the processing parameters 2107 that were received with the mobile image 2105.

After selecting the tests from the test data store 2132, test parameters for each of the tests can be selected from the test parameters data store 2134 (step 2220). According to an embodiment, the test parameters can be used to configure or customize the tests to be performed. For example, different test parameters can be used to configure the tests to be more or less sensitive to certain attributes of the mobile image. In an embodiment, the test parameters can be selected based on the processing parameters 2107 received with the mobile image 2105. As described above, these processing parameters can include information, such as the type of mobile device used to capture the mobile image as well as the type of mobile application that is going to be used to process the mobile image if the mobile image passes scrutiny of the mobile image IQA system.

Once the tests and the test parameters have been retrieved and provided to the test execution module 2130, a test is selected from tests to be executed, and the test is executed on the document snippet to produce a test result value (step 2225). In some embodiments, more than one document snippet may be used by a test. For example, a test can be performed that tests whether images of a front and back of a check are actually images of the same document can be performed. The test engine can receive both an image of the front of the check and an image of the back of the check from the preprocessing module 2110 and use both of these images when executing the test.

The test result value obtained by executing the test on the snippet or snippets of the mobile document is then compared to test threshold to determine whether the mobile image passes or fails the test (step 2230) and a determination is made whether the test results exceed the threshold (step 2235). According to an embodiment, the test threshold can be configured or customized based on the processing parameters 2107 received with the mobile image. For example, the test for image blurriness can be configured to use a higher threshold for passing if the image is to be used to for a mobile deposit application where the MICR-line information needs to be recognized and read from the document image. In contrast, the test for blurriness can be configured use a lower threshold for passing the mobile image for some mobile applications. For example, the threshold for image quality may be lowered for if a business card is being imaged rather than a check. The test parameters can be adjusted to minimize the number of false rejects and false accept rate, the number of images marked for reviewing, or both.

The "affects overall status" flag of a test can also be configured based on the processing parameters 2107. For example, a test can be marked as not affecting the overall status for some types of mobile applications or for documents being processed, or both. Alternatively, a test can also be marked as affecting overall status for other types of mobile applications or documents being processed, or both. For example, a test that identifies the MICR-line of a check can be marked as "affecting overall status" so that if the MICR-line on the check cannot be identified in the image, the image will fail the test and the image will be rejected. In another example, if the mobile application is merely configured to receive different types of mobile document image, the mobile application can perform a MICR-line test on the mobile document image in an attempt to determine whether the document that was imaged was a check. In this example, the MICR-line may not be present, because a document other than a check may have been imaged. Therefore, the MICR-line test may be marked as not "affecting overall status," and if a document fails the test, the transaction might be flagged for review but not marked as failed.

Since different camera phones can have cameras with very different optical characteristics, image quality may vary significantly between them. As a result, some image quality defects may be avoidable on some camera phones and unavoidable on the others and therefore require different configurations. To mitigate the configuration problem, Mobile IQA test can be automatically configured for different camera phones to use different tests, or different thresholds for the tests, or both. For example, as described above, a lower threshold can be used for an image focus IQA test on mobile document images that are captured using a camera phone that does not include an autofocus feature than would be used for camera phones that do include an autofocus feature, because it can be more difficult for a user to obtain as clear an image on using a device that doesn't an autofocus feature.

In certain embodiments, if the test result exceeded or equaled the threshold, the image passed the test and a determination is made whether there are more tests to be executed (step 2240). If there are more tests to be executed, the next test can be selected and executed on the document snippet (step 2225). Otherwise, if there were not more tests to be executed, the test results, or test messages, or both are output by MDIPE 2100 (step 2270). There can be one or more test messages included with the results if the mobile image failed one more of the tests that were executed on the image.

In such embodiments, if the test result was less than the threshold, then the mobile image has failed the test. A determination is made whether the test affects the overall status (step 250). If the test affects the overall status of the image, detailed test result messages that explain why the image failed the test can be loaded from the test message data store 134 (step 2255) and the test result messages can be added to the test results (step 2260). The test results and test messages can then be output by the MDIPE 2100 (step 2270).

Alternatively, if the test did not affect the overall status, the test results can be loaded noted and the transaction can be flagged for review (step 2265). By flagging the transaction for review, a user of a mobile device can be presented with information indicating that a mobile image has failed at least some of the test that were performed on the image, but the image still may be of sufficient quality for use with the mobile application. The user can then be presented with the option to retake the image or to send the mobile image to the mobile application for processing. According to some embodiments, detailed test messages can be loaded from the test message data store 134 for all tests that fail and can be included with the test results, even if the test is not one that affects the overall status of the mobile image.

According to some embodiments, the mobile IQA test can also be configured to eliminate repeated rejections of a mobile document. For example, if an image of a check is rejected as have too low a contrast by a contrast test, the image is rejected, and the user can retake and resubmit the image via the mobile application, the processing parameters 2107 received with the mobile image can include a flag indicating that the image is being resubmitted. In some embodiments, the thresholds associated with the tests that the image failed can be lowered to see if the image can pass the test with a lower threshold. In some embodiments, the thresholds are only lowered for non-critical tests. According to an embodiment, the processing parameters 2107 can also include a count of the number of times that an image has been resubmitted and the thresholds for a test are only lowered after a predetermined number of times that the image is resubmitted.

Figure 23:
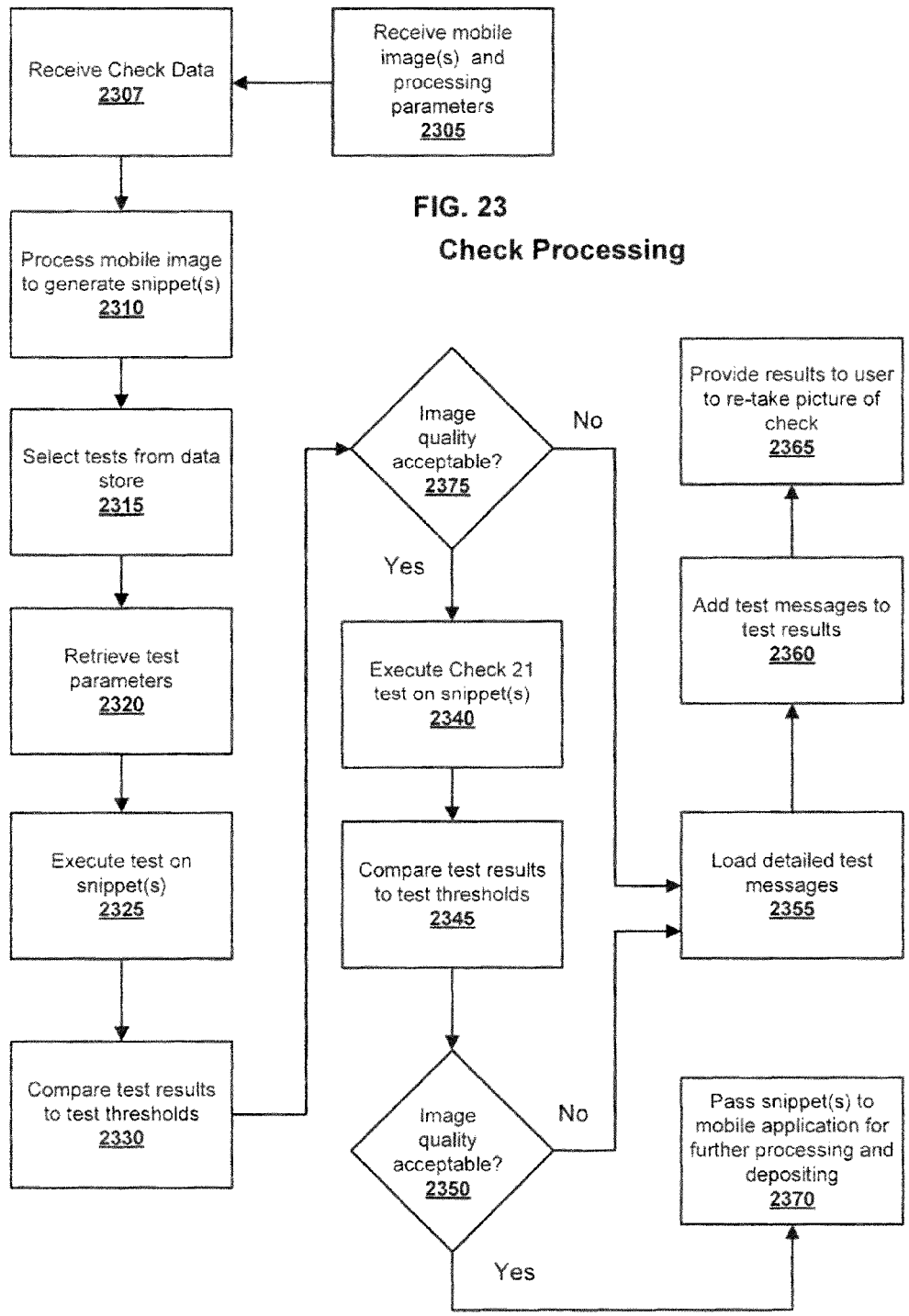
FIG. 23 is a flow diagram of a process for performing mobile image quality assurance on an image of a check captured by a mobile device according to an embodiment.

FIG. 23 is a flow diagram of a process for performing mobile image quality assurance on an image of a check captured by a mobile device according to an embodiment. Like the process illustrated in FIG. 22, the process illustrated in FIG. 23 can be performed using the MDIPE 2100 illustrated in FIG. 21. The method illustrated in FIG. 23 can be used where an image of a check is captured in conjunction with a remittance payment. The method illustrated in FIG. 23 can be used to assess the quality of the image of the check.

The method illustrated in FIG. 23 illustrates how the mobile IQA and MDIPE 2100 can be used with the electronic check processing provided under the Check Clearing for the 21st Century Act. The Check Clearing for the 21st Century Act (also referred to as the "Check 21 Act") is a United States federal law (Pub.L. 108-100) that was enacted on Oct. 28, 2003. The law allows the recipient of a paper check to create a digital version of the original check called a "substitute check," which can be processed, eliminating the need to process the original physical document. The substitute check includes an image of the front and back sides of the original physical document. The mobile IQA tests can be used check the quality of the images captured by a mobile device. The snippets generated by the MDIPE 2100 can then be further tested by one or more Check 21 mobile IQA tests that perform image quality assurance on the snippets to determine whether the images meet the requirements of the Check 21 Act as well.

The mobile image 2105 captured by a mobile device is received (step 2305). In an embodiment, image of the front and back sides of the check can be provided. The mobile image 2105 can also be accompanied by one or more processing parameters 2107. Check data can also be optionally received (step 2307). The check data can be optionally provided by the user at the time that the check is captured. This check data can include various information from the check, such as the check amount, check number, routing information from the face of the check, or other information, or a combination thereof. In some embodiments, a mobile deposition application requests this information from a user of the mobile device, allows the user to capture an image of a check or to select an image of a check that has already been captured, or both, and the mobile deposit information provides the check image, the check data, and other processing parameters to the MDIPE 2100.

Once the mobile image 2105, the processing parameters 2107, and the check data have been received, the mobile image is processed to generate a document snippet or snippets (step 2310). As described above, the preprocessing can produce one or more document snippets that include the portion of the mobile image in which the document was located. The document snippets can also have additional processing performed on them, such as conversion to a bitonal image or to grayscale, depending on the types of testing to be performed.

After processing the mobile document image to generate a snippet, the MDIPE 2100 then selects one or more tests to be performed on the snippet or snippets (step 2315). In an embodiment, the tests to be performed can be selected from test data store 2132. In an embodiment, the MDIPE 2100 selects the one or more tests based on the processing parameters 2107 that were received with the mobile image 2105.

After selecting the tests from the test data store 2132, test parameters for each of the tests can be selected from the test parameters data store 2134 (step 2320). As described above, the test parameters can be used to configure or customize the tests to be performed.

Once the tests and the test parameters have been retrieved and provided to the test execution module 2130, a test is selected from tests to be executed, and the test is executed on the document snippet to produce a test result value (step 2325). In some embodiments, more than one document snippet can be used by a test. For example, a test can be performed that tests whether images of a front and back of a check are actually images of the same document can be performed. The test engine can receive both an image of the front of the check and an image of the back of the check from the preprocessing module 2110 and use both of these images when executing the test. Step 2325 can be repeated until each of the tests to be executed is performed.

The test result values obtained by executing each test on the snippet or snippets of the mobile document are then compared to test threshold with that test to determine whether the mobile image passes or fails the test (step 2330) and a determination can be made whether the mobile image of the check passed the test indicating that image quality of mobile image is acceptable (step 2335). If the mobile document image of the check passed, the MDIPE 2100 passes then executes one or more Check 21 tests on the snippets (step 2340).

The test result values obtained by executing the Check 21 test or tests on the snippet or snippets of the mobile document are then compared to test threshold with that test to determine whether the mobile image passes or fails the test (step 2345) and a determination can be made whether the mobile image of the check passed the test indicating that image quality of mobile image is acceptable under the requirements imposed by the Check 21 Act (step 2350). Step 345 can be repeated until each of the Check 21 tests is performed. If the mobile document image of the check passed, the MDIPE 2100 passes the snippet or snippets to the mobile application for further processing (step 2370).

If the mobile document image of the check failed one or more mobile IQA or Check 21 tests, detailed test result messages that explain why the image failed the test can be loaded from the test message data store 134 (step 2355) and the test result messages can be added to the test results (step 2360). The test results and test messages are then output to the mobile application where they can be displayed to the user (step 2365). The user can use this information to retake the image of the check in an attempt to remedy some or all of the factors that caused the image of the check to be rejected.

Mobile IQA Tests

FIGS. 24A-41 illustrate various sample mobile document images and various testing methods that can be performed when assessing the image quality of a mobile document image. As described above, the preprocessing module 2110 can be configured to extract the document subimage, also referred to herein as the subimage, from the mobile document image. The subimage generally will be non-rectangular because of perspective distortion; however, the shape of the subimage can generally be assumed to be quadrangular, unless the subimage is warped. Therefore, the document can be identified by its four corners.

In some embodiments, a mobile IQA test generates a score for the subimage on a scale that ranges from 0-1000, where "0" indicates a subimage having very poor quality while a score of "1000" indicates that the image is perfect according to the test criteria.

Figure 24A:
FIG. 24A illustrates a mobile image where the document captured in the mobile document image exhibits view distortion.
Figure 24B:
FIG. 24B illustrates an example of a grayscale geometrically corrected subimage generated from the distorted image in FIG. 24A according to an embodiment.

Some tests use a geometrically corrected snippet of the subimage to correct view distortion. The preprocessing module 2110 can generate the geometrically corrected snippet. FIG. 24A illustrates a mobile image where the document captured in the mobile document image exhibits view distortion. FIG. 24B illustrates an example of a grayscale geometrically corrected subimage generated from the distorted image in FIG. 24A.

Image Focus IQA Test

According to some embodiments, an Image Focus IQA Test can be executed on a mobile image to determine whether the image is too blurry to be used by a mobile application. Blurry images are often unusable, and this test can help to identify such out-of-focus images and reject them. The user can be provided detailed information to assist the user in taking a better quality image of the document. For example, the blurriness may have been the result of motion blur caused by the user moving the camera while taking the image. The test result messages can suggest that the user hold the camera steadier when retaking the image.

Mobile devices can include cameras that have significantly different optical characteristics. For example, a mobile device that includes a camera that has an auto-focus feature can generally produce much sharper images than a camera that does not include such a feature. Therefore, the average image focus score for different cameras can vary widely. As a result, the test threshold can be set differently for different types of mobile devices. As described above, the processing parameters 2107 received by MDIPE 2100 can include information that identifies the type of mobile device and/or the camera characteristics of the camera used with the device in order to determine what the threshold should be set to for the Image Focus IQA Test.

Figure 25A:
FIG. 25A illustrates an example of an in-focus mobile document image.
Figure 25B:
FIG. 25B illustrates an example of an out of focus document.

An in-focus mobile document image, such as that illustrated in FIG. 25A will receive a score of 1000, while an out of focus document, such as that illustrated in FIG. 25B will receive a much lower score, such as in the 50-100 range. Most of the time, images are not completely out of focus. Therefore, a score of 0 is uncommon.

According to an embodiment, the focus of the image can be tested using various techniques, and the results can then be normalized to the 0-1000 scale used by the MDIPE 2100.

In an embodiment, the Image Focus Score can be computed using the following technique: The focus measure is a ratio of maximum video gradient between adjacent pixels, measured over the entire image and normalized with respect to image's gray level dynamic range and "pixel pitch." According to an embodiment, the image focus score can be calculated using the following equation described in "The Financial Services Technology Consortium," Image Defect Metrics, IMAGE QUALITY & USABILITY ASSURANCE: Phase 1 Project, Draft Version 1.0.4. May 2, 2005, which is hereby incorporated by reference:

Image Focus Score=(Maximum Video Gradient)/[(Gray Level Dynamic Range)*(Pixel Pitch)]

where

Video Gradient=$ABS$[(Gray level for pixel "$i$")−(Gray level for pixel "$i+1$")]

Gray Level Dynamic Range=[(Average of the "$N$" Lightest Pixels)−(Average of the "$N$" Darkest Pixels)]

Pixel Pitch=[1/Image Resolution (in dpi)]

The variable N is equal to the number of pixels used to determine the average darkest and lightest pixel gray levels in the image. According to one embodiment, the value of N is set to 64. Therefore, the 64 lightest pixels in the image are averaged together and the 64 darkest pixels in the image are averaged together, to compute the "Gray Level Dynamic" range value. The resulting image focus score value is the multiplied by 10 in order to bring the value into the 0-1000 range used for the test results in the mobile IQA system.

The Image Focus Score determined using these techniques can be compared to an image focus threshold to determine whether the image is sufficiently in focus. As described above, the threshold used for each test may be determined at least in part by the processing parameters 2107 provided to MDIPE 2100. The Image Focus score can be normalized to the 0-1000 range used by the mobile IQA tests and compared to a threshold value associated with the test. If the Image Focus Score meets or exceeds this threshold, then the mobile document image is sufficiently focused for use with the mobile application.

Shadow Test

According to some embodiments, a Shadow Test can be executed on a mobile image to determine whether a portion of the image is covered by a shadow. A shadow can render parts of a mobile image unreadable. This test helps to identify whether a shadow coverage a least a portion of a subimage in a mobile document image, and to reject images if the shadow has too much of an effect on the image quality, so that the user can attempt to take a better quality image of the document where the shadow is not present.

Figure 26:
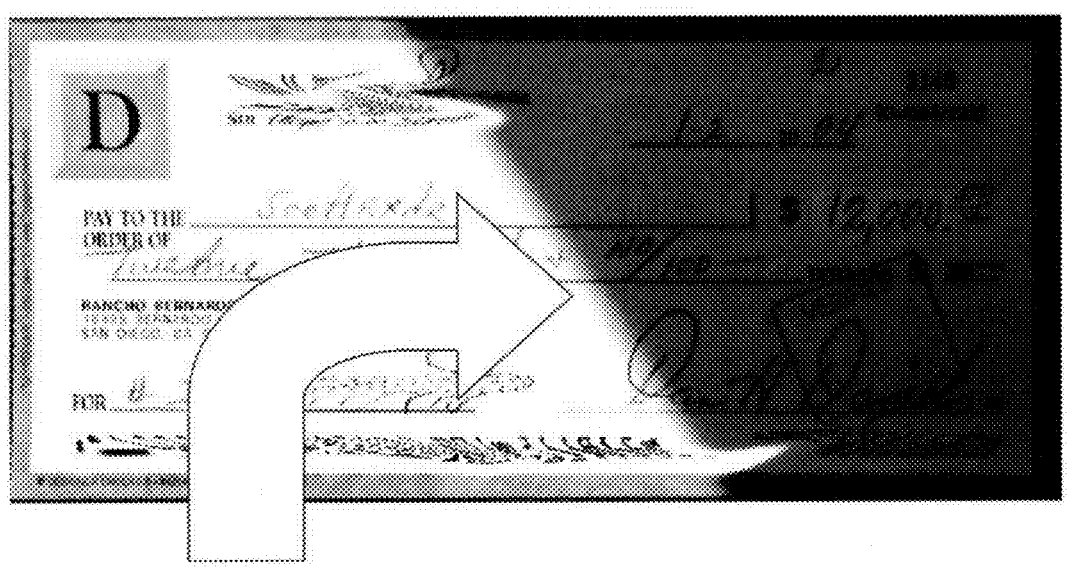
FIG. 26 illustrates an example of a shadowed document.

According to an embodiment, the presence of a shadow is measured by examining boundaries in the mobile image that intersect two or more sides of the document subimage. FIG. 26 illustrates an example of a shadowed document. The document subimage has been extracted from the mobile document image and converted to a grayscale snippet in this example. The shadow boundary clearly intersects the top and the bottom of the check pictured in the snippet.

The presence of shadows can be measured using the area and contrast. If a shadow covers the entire image, the result is merely an image that is darker overall. Such shadows generally do not worsen image quality significantly. Furthermore, shadows having a very small surface area also do not generally worsen image quality very much.

According to an embodiment, the Image Shadowed Score can be calculated using the following formula to determine the score for a grayscale snippet:

Image Shadowed score=1000 if no shadows were found, otherwise

Image Shadowed score=1000−min (Score($S[i]$)), where Score($S[i]$) is computed for every shadow SN detected on the grayscale snippet In an embodiment, the Score for each shadow can be computed using the following formula:

Given shadow $S[i]$ in the grayscale image, the score can be calculated Score($S[i]$) as Score($S[i]$) =2000*min($A[i]/A$, 1−$A[i]/A$)*(Contrast/256), where A[i] is the area covered by shadow S[i] (in pixels), A is the entire grayscale snippet area (in pixels), and Contrast is the difference of brightness inside and outside of the shadow (the maximum value is 256).

Due to the normalization factor 2000, Score(S[i]) fits into 0-1000 range. It tends to assume larger values for shadows that occupy about ½ of the snippet area and have high contrast. Score(S[i]) is typically within 100-200 range. In an embodiment, the Image Shadowed score calculated by this test falls within a range of 0-1000 as do the test results from other tests. According to an embodiment, a typical mobile document image with few shadows will have a test result value in a range form 800-900. If no shadows are on are found the document subimage, then the score will equal 1000. The Image Shadowed score can then be compared to a threshold associated with the test to determine whether the image is of sufficiently high quality for use with the mobile application requesting the assessment of the quality of the mobile document image.

Contrast Test

According to some embodiments, a Contrast Test can be executed on a mobile image to determine whether the contrast of the image is sufficient for processing. One cause of poor contrast is images taken with insufficient light. A resulting grayscale snippet generated from the mobile document image can have low contrast, and if the grayscale snippet is converted to a binary image, the binarization module can erroneously white-out part of the foreground, such as the MICR-line of a check, the code line of a remittance coupon, an amount, or black-out part of the background. The Contrast Test measures the contrast and rejects poor quality images, and instructs the user to retake the picture under brighter light to improve the contrast of the resulting snippets.

Figure 27:
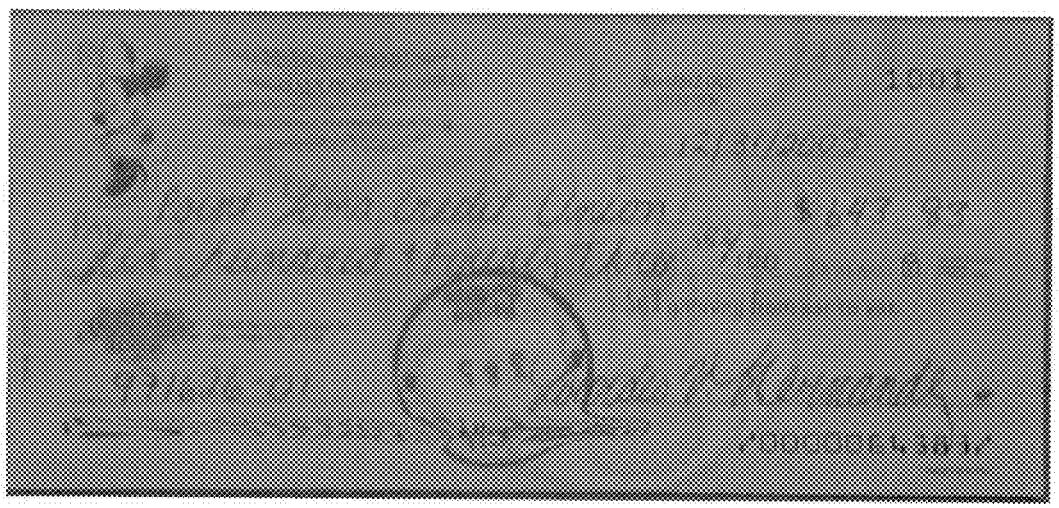
FIG. 27 illustrates an example of a grayscale snippet generated from a mobile document image of a check where the contrast of the image is very low according to an embodiment.
Figure 28:
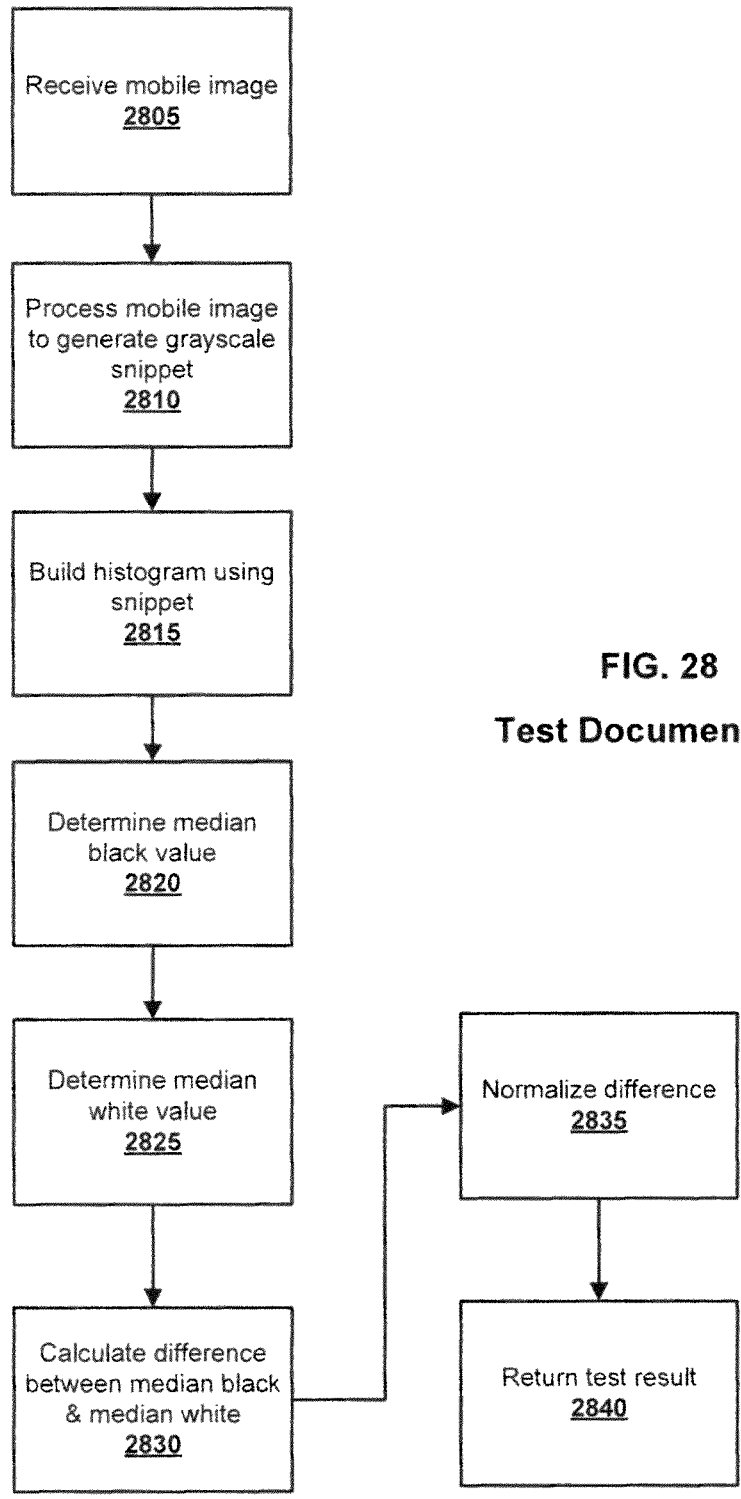
FIG. 28 illustrates a method for executing a Contrast IQA Test according to an embodiment.

FIG. 28 illustrates a method for executing a Contrast IQA Test according to an embodiment. The Contrast IQA Test illustrated in FIG. 28 is performed on a grayscale snippet generated from a mobile document image. The MDIPE 2100 receives the mobile image (step 2805) and generates a grayscale snippet that comprises a grayscale version of the document subimage (step 2810). FIG. 27 is an example of a grayscale snippet generated from a mobile document image of a check. As can be seen from FIG. 27, the contrast of the image is very low.

A histogram of the grayscale values in the grayscale snippet can then be built (step 2815). In an embodiment, the x-axis of the histogram is divided into bins that each represents a "color" value for the pixel in the grayscale image and the y-axis of the histogram represents the frequency of that color value in the grayscale image. According to an embodiment, the grayscale image has pixel in a range from 0-255, and the histogram is built by iterating through each value in this range and counting the number of pixels in the grayscale image having this value. For example, frequency of the "200" bin would include pixels having a gray value of 200.

A median black value can then be determined for the grayscale snippet (step 2820) and a median white value is also determined for the grayscale snippet (step 2825). The median black and white values can be determined using the histogram that was built from the grayscale snippet. According to an embodiment, the median black value can be determined by iterating through each bin, starting with the "0" bin that represents pure black and moving progressively toward the "250" bin which represents pure white. Once a bin is found that includes at least 20% of the pixels included in the image, the median black value is set to be the color value associated with that bin. According to an embodiment, the median white value can be determined by iterating through each bin, starting with the "255" bin which represents pure white and moving progressively toward the "0" bin which represents pure black. Once a bin is found that includes at least 20% of the pixels included in the image, the median white value is set to be the color value associated with that bin.

Once the median black and white values have been determined, the difference between the median black and white values can then be calculated (step 2830). The difference can then be normalized to fall within the 0-1000 test range used in the mobile IQA tests executed by the MDIPE 2100 (step 2835). The test result value can then be returned (step 2840). As described above, the test result value is provided to the test execution module 2130 where the test result value can be compared to a threshold value associated with the test. See for example, FIG. 22, step 2230, described above. If the mobile image fails the Contrast IQA Test, the MDIPE 2100 can reject the image, and load detailed test messages from the test message data store 134 that include detailed instructions that how the user might retake the image.

Planar Skew Test

According to some embodiments, a Planar Skew Test can be executed on a mobile image to determine whether the document subimage is skewed within the mobile image. See FIG. 29A for an example of a mobile document image that includes a remittance coupon or check that exhibits significant planar skew. Planar skew does not result in distortion of the document subimage; however, in an embodiment, the subimage detection module included in the preprocessing module assumes that the document subimage is nearly horizontal in the mobile document image. If the skew becomes too extreme, for example approaching 45 degrees from horizontal, cropping errors could occur when the document subimage is extracted from the mobile document image.

According to an embodiment, document skew can be measured by first identifying the corners of the document subimage using one of the techniques described above. The corners of the documents subimage can be identified by the preprocessing module 130 when performing projective transformations on the subimage, such as that described above with respect to FIGS. 24A and 24B. Various techniques for detecting the skew of the subimage can be used. For example, techniques for detecting skew disclosed in the related '071 and '091 Applications, can be used to detect the skew of the subimage. The results from the skew test can then be to fall within the 0-1000 test range used in the mobile IQA tests executed by the MDIPE 2100. The higher the skew of the document subimage, the lower the normalized test value. If the normalized test value falls below the threshold value associated with the test, the mobile document image can be rejected and the user can be provided detailed information from the test result messages data store 136 for how to retake the image and reduce the skew.

View Skew Test

Figure 29A:
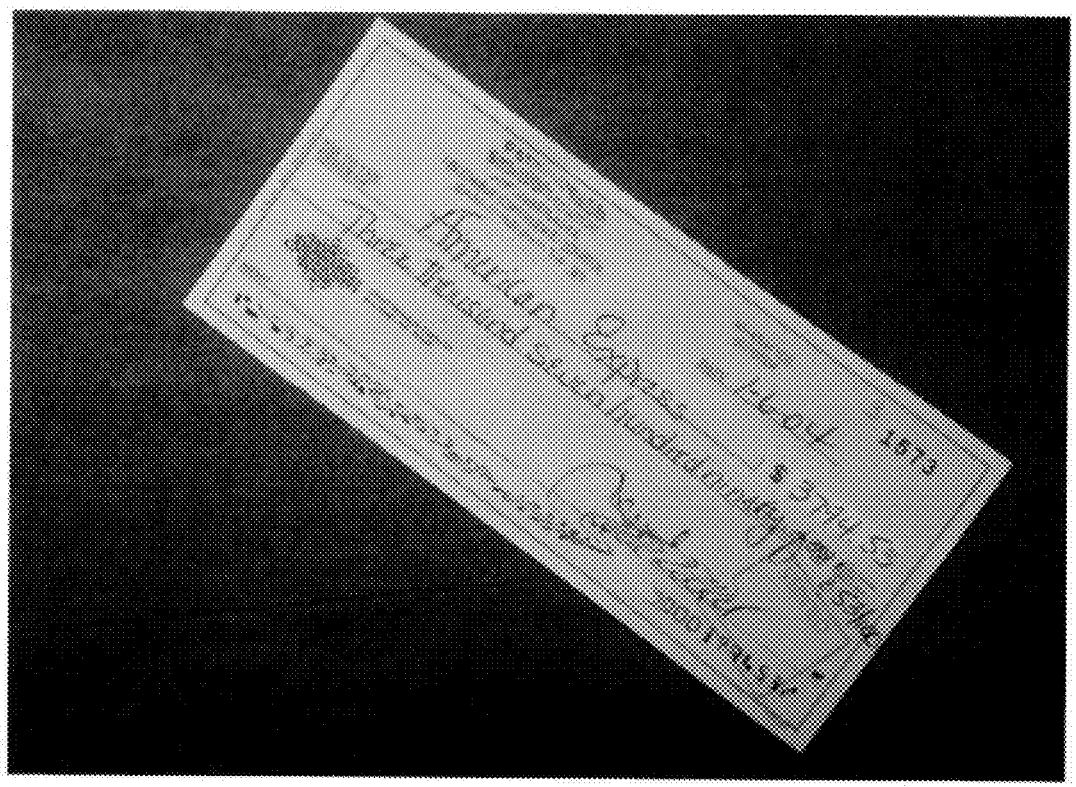
FIG. 29A is an example of a mobile document image that includes a check that exhibits significant planar skew according to an embodiment.
Figure 29B:
FIG. 29B illustrates an example of a document subimage that exhibits view skew according to an embodiment.

"View skew" denotes a deviation from direction perpendicular to the document in mobile document image. Unlike planar skew, the view skew can result in the document subimage having perspective distortion. FIG. 29B illustrates an example of a document subimage that exhibits view skew. View skew can cause problems in processing the subimage if the view skew becomes too great, because view skew changes the width-to-height ratio of the subimage. This can present a problem, since the true dimensions of the document pictured in the subimage are often unknown. For example, remittance coupons and business checks can be various sizes and can have different width-to-height ratios. View skew can result in content recognition errors, such as errors in recognition of the MICR-line data on a check or CAR/LAR recognition (which stands for Courtesy Amount Recognition and Legal Amount Recognition) or errors in recognition of the code line of a remittance coupon. By measuring the view skew, the view skew test can be used to reject images that have too much view skew, which can help reduce false rejects and false accepts rates by addressing an issue that can be easily corrected by a user retaking the mobile document image.

Figure 30:
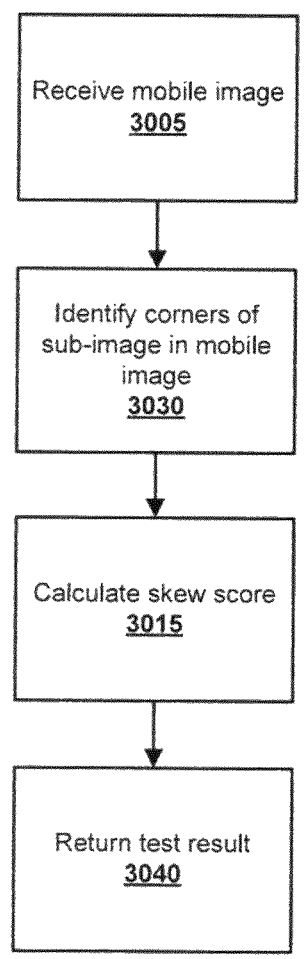
FIG. 30 is a flow chart illustrating a method for testing for view skew according to an embodiment.

FIG. 30 is a flow chart illustrating a method for testing for view skew according to an embodiment. The MDIPE 2100 receives the mobile image (step 3005) and identifies the corners of the document within the subimage (step 3010). A skew test score can then be determined for the document subimage (step 3015) and skew test score can then be returned (3040). As described above, the test result value can then be provided to the test execution module 2130 where the test result value can be compared to a threshold value associated with the test.

According to an embodiment, the view skew of a mobile document can be determined using the following formula:

View Skew score=$1000-F(A, B, C, D)$, where $F(A, B, C, D)=500*\max(abs(|AB|-|CD|)/(|DA|+|BC|), abs(|BC|-|DA|)/(|AB|+|CD|))$, where |PQ| denotes the distance from point P to point Q, and the corners of the subimage are denoted as follows: A represents the top-left corner, B represents the top-right corner of the subimage, C represents the bottom-right corner of the subimage, and D represents the bottom-left corner of the subimage.

One can see that View Skew score can be configured to fit into [0, 1000] range used in the other mobile IQA tests described herein. In this example, the View Skew score is equal to 1000 when |AB|=|CD| and |BC|=|DA|, which is the case when there is no perspective distortion in the mobile document image and camera-to-document direction was exactly perpendicular. The View Skew score can then be compared to a threshold value associated with the test to determine whether the image quality is sufficiently high for use with the mobile application.

Cut Corner Test

Figure 31:
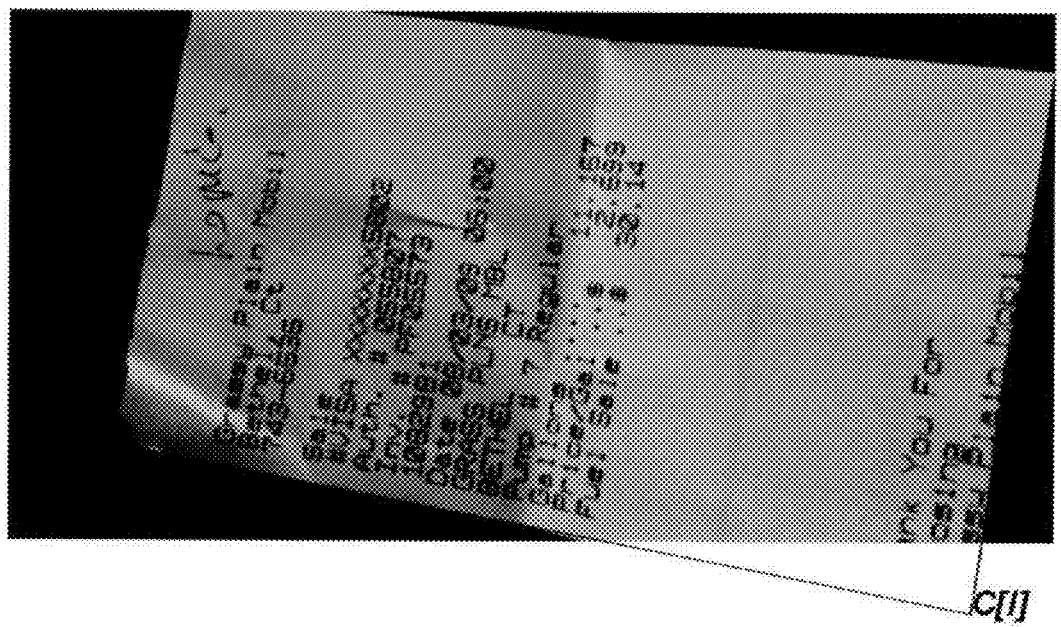
FIG. 31 illustrates an example of a mobile document image that features an image of a document where one of the corners of the document has been cut off in the picture.

Depending upon how carefully the user framed a document when capturing a mobile image, it is possible that one or more corners of the document can be cut off in the mobile document image. As a result, important information can be lost from the document. For example, if the lower left-hand corner of a check is cut off in the mobile image, a portion of the MICR-line of a check or the code line of a remittance coupon might be cut off, resulting in incomplete data recognition. FIG. 31 illustrates an example of a mobile document image that features a receipt where one of the corners has been cut off.

Figure 32:
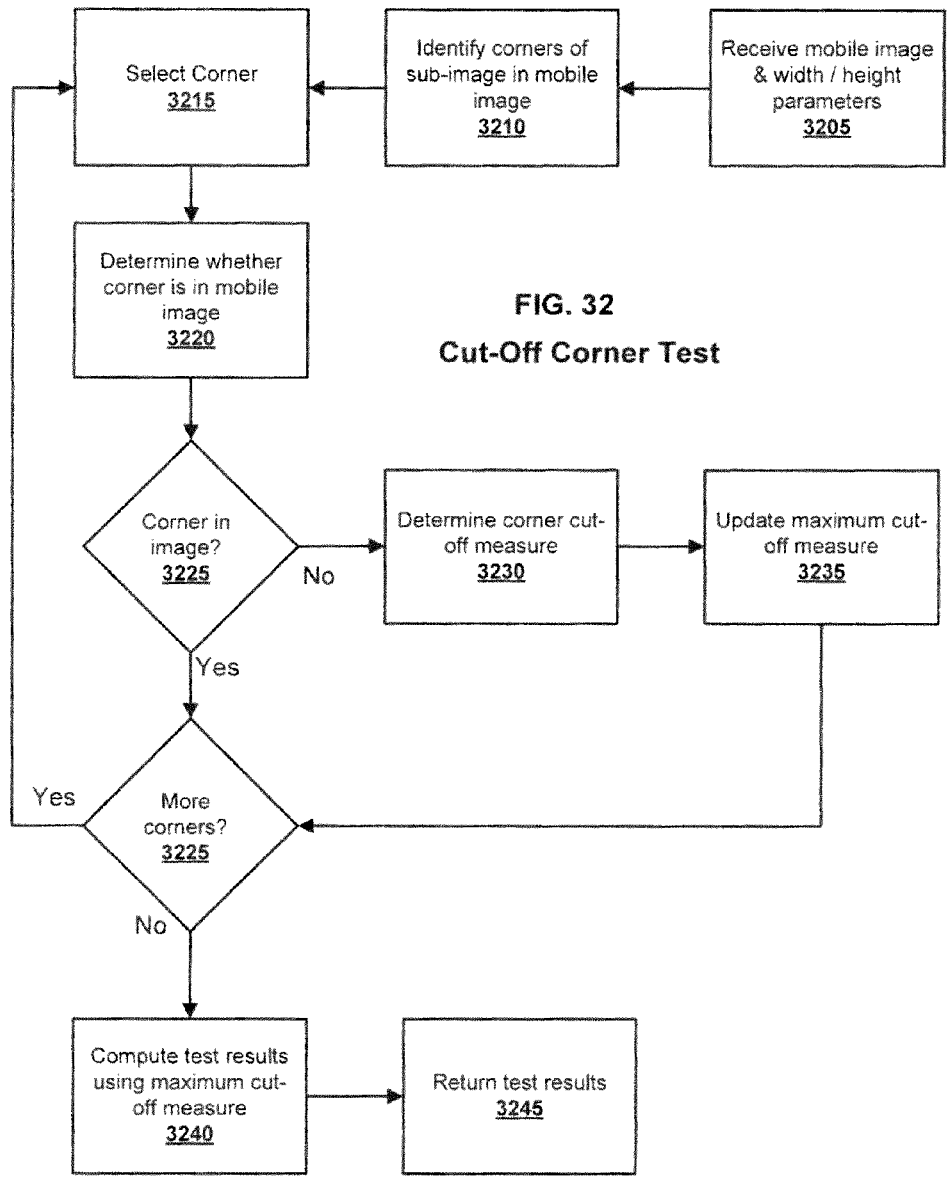
FIG. 32 illustrates a Cut-Off Corner Test that can be used for testing whether corners of a document in a document subimage have been cut off when the document was imaged according to an embodiment.

FIG. 32 illustrates a Cut-Off Corner Test that can be used with embodiments of the MDIPE 2100 for testing whether corners of a document in a document subimage have been cut off when the document was imaged. The mobile image including height and width parameters are received (step 3205). In an embodiment, the height and width of the mobile image can be determined by the preprocessing module 2110. The corners of the document subimage are then identified in the mobile document image (step 3210). Various techniques can be used to identify the corners of the image, including the various techniques described above. In an embodiment, the preprocessing module 2110 identifies the corners of the document subimage. As illustrated in FIG. 11, one or more of the corners of a document can be cut off. However, the preprocessing module 2110 can be configured to determine what the location of the corner should have been had the document not been cut off using the edges of the document in the subimage.

FIG. 31 illustrates how the preprocessing module 2110 has estimated the location of the missing corner of the document by extending lines from the sides of the document out to the point where the lines intersect. The preprocessing module 2110 can then provide the corners information for the document to the test execution module 2130 to execute the Cut-Off Corner IQA Test. In an embodiment, test variables and the test results values to be returned by the test are set to default values: the test value V to be returned from the test is set to a default value of 1000, indicating that all of the corners of the document are within the mobile document image, and a maximum cut off variable (MaxCutOff) is set to zero indicating that no corner was cut off.

A corner of the document is selected (step 3220). In an embodiment, the four corners are received as an array of x and y coordinates C[I], where I is equal to the values 1-4 representing the four corners of the document.

A determination is made whether the selected corner of the document is within the mobile document image (step 3225). The x & y coordinates of the selected corner should be at or between the edges of the image. According to an embodiment, the determination whether a corner is within the mobile document image can be determined using the following criteria: (1) $C[I].x>=0$ & $C[I].x<=Width$, where Width=the width of the mobile document image and C[I].x=the x-coordinate of the selected corner; and (2) $C[I].y>=0$ & $C[I].y<=Height$, where Height=the height of the mobile document image and C[I].y=the y-coordinate of the selected corner.

If the selected corner fails to satisfy the criteria above, the corner is not within the mobile image and has been cut-off. A corner cut-off measurement is determined for the corner (step 3230). The corner cut-off measurement represents the relative distance to the edge of the mobile document image. According to an embodiment, the corner cut-off measurement can be determined using the following:

Set $H[I]$ and $V[I]$ to zero (1)

where H[I] represents the horizontal normalized cut-off measure and V[I] represents the vertical normalized cut-off measure.

If $C[I].x<0$, then set $H[I]=-1000*C[I].x/Width$ (2)

If $C[I].x>Width$, set $H[I]=1000*(C[I].x-Width)/Width$ (3)

where Width is the width of the mobile image

If $C[I].y<0$, set $V[I]=-1000*C[I].y/Height$ (4)

where Height is the height of the mobile image

If $C[I].y>Height$, set $V[I]=1000*(C[I].y-weight)/Height$ (5)

Normalize $H[I]$ and $V[I]$ to fall within the 0-1000 range used by the mobile IQA tests by setting $H[I]=\min(1000, H[I])$ and $V[I]=\min(1000, V[I])$. (6)

Set $CutOff[I]=\min(H(I), V(I))$ (7)

which is the normalized cut-off measure of the corner. One can see that the CutOff[I] lies within [0-1000] range used by the mobile IQA tests and the value increases as the corner moves away from mobile image boundaries.

An overall maximum cut-off value is also updated using the normalized cut-off measure of the corner (step 3235). According to an embodiment, the following formula can be used to update the maximum cut-off value: MaxCutOff=max (MaxCutOff, CutOff[I]). Once the maximum cut-off value is determined, a determination is made whether more corners are to be tested (step 3225).

If the selected corner satisfies the criteria above, the corner is within the mobile document image and is not cut-off. A determination is then made whether there are additional corners to be tested (step 3225). If there are more corners to be processed, a next corner to be test is selected (step 3215). Otherwise, if there are no more corners to be tested, the test result value for the test is computing using the maximum test cut-off measurement. In an embodiment, the test result value V=1000−MaxCutOff. One can see that V lies within [0-1000] range for the mobile IQA tests and is equal to 1000 when all the corners are inside the mobile image and decreases as one or more corner move outside of the mobile image.

The test result value is then returned (3245). As described above, the test result value is provided to the test execution module 2130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. The user may simply need to retake the image with the document corners within the frame.

Cut-Side Test

Depending upon how carefully the user framed a document when capturing a mobile image, it is possible that one or more sides of the document can be cut off in the mobile document image. As a result, important information can be lost from the document. For example, if the bottom a check is cut off in the mobile image, the MICR-line might be cut off, rendering the image unusable for a Mobile Deposit application that uses the MICR information to electronically deposit checks. Furthermore, if the bottom of a remittance coupon is cut off in the mobile image, the code line may be missing, the image may be rendered unusable by a Remittance Processing application that uses the code information to electronically process the remittance.

Figure 33:
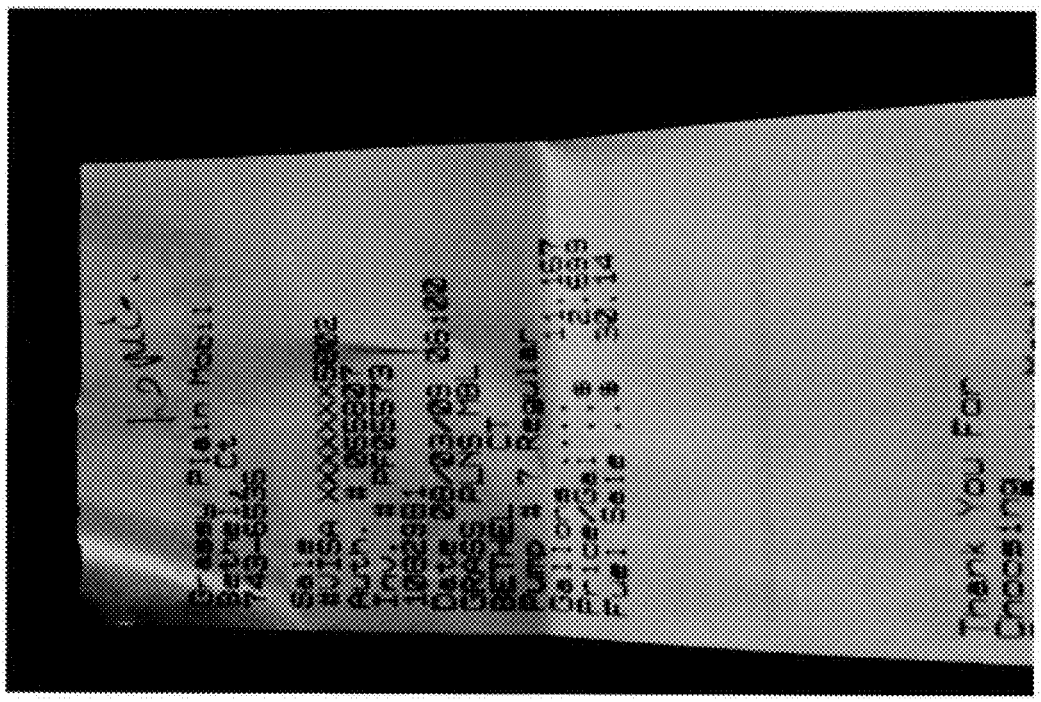
FIG. 33 illustrates an example of a mobile document image that features a document where one of the ends of the document has been cut off in the image.

FIG. 33 illustrates an example of a mobile document image that features a receipt where one of the ends of the receipt has been cut off in the image. Unlike the Cut-Corner Test described above which can be configured to allow a document to pass if the amount of cut-off falls is small enough that the document image still receives a test score that meets or exceeds the threshold associated with the test, the Cut-Side Test is either pass or fail. If one or more sides of the document subimage are cut off in the mobile document image, the potential to lose critical information is too high, and mobile document is marked as failing.

Figure 34:
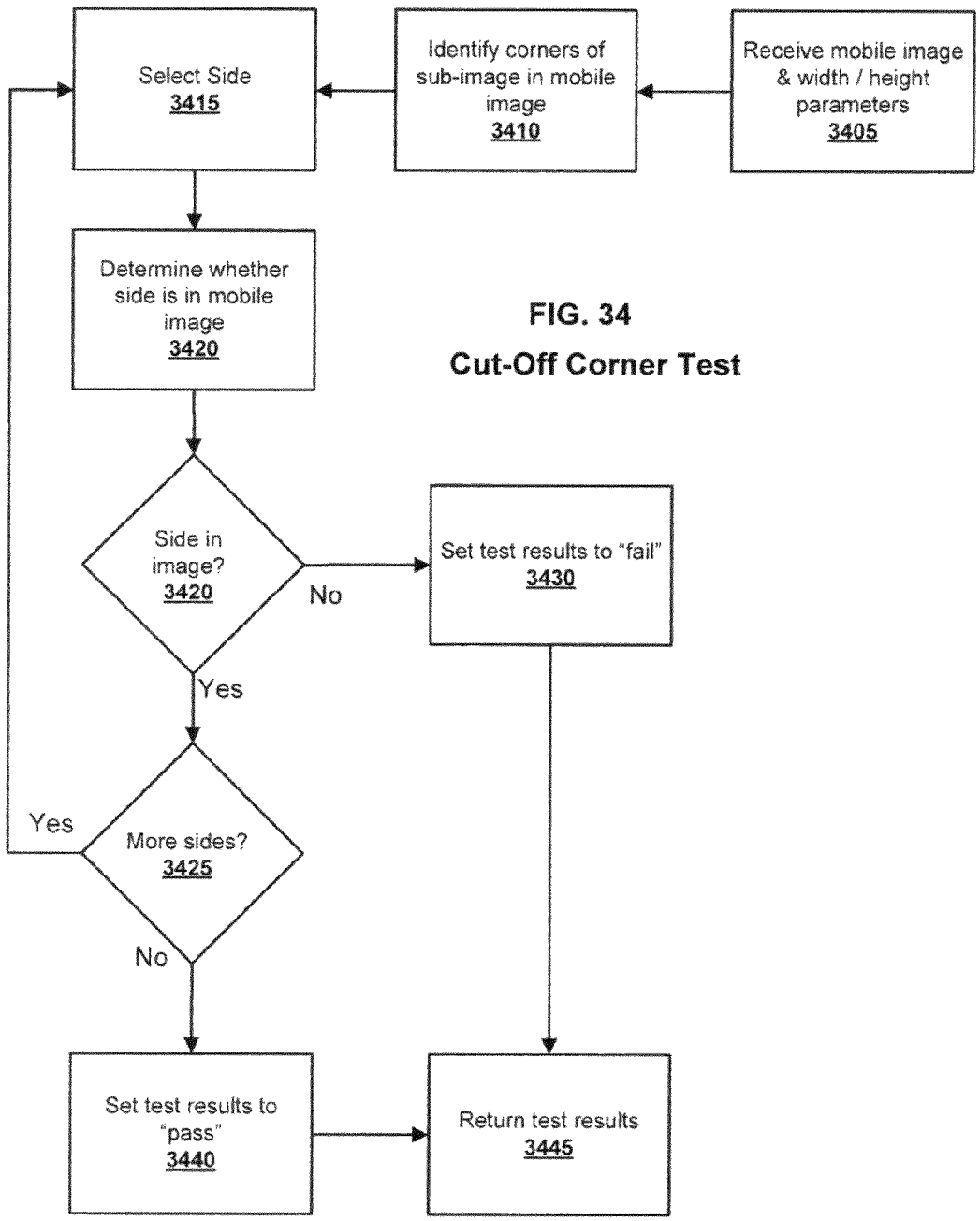
FIG. 34 is a flow diagram of a method for determining whether one or more sides of the document are cut off in the document subimage according to an embodiment.

FIG. 34 is a flow diagram of a method for determining whether one or more sides of the document are cut off in the document subimage according to an embodiment. The mobile image is received (step 3405). In an embodiment, the height and width of the mobile image can be determined by the preprocessing module 2110. The corners of the document subimage are then identified in the mobile document image (step 3410). Various techniques can be used to identify the corners of the image, including the various techniques described above. In an embodiment, the preprocessing module 2110 identifies the corners of the document subimage.

A side of the document is selected (step 3420). In an embodiment, the four corners are received as an array of x and y coordinates C[I], where I is equal to the values 1-4 representing the four corners of the document.

A determination is made whether the selected corner of the document is within the mobile document image (step 3425).

According to an embodiment, the document subimage has four side and each side S[I] includes two adjacent corners C1[I] and C2[I]. A side is deemed to be cut-off if the corners comprising the side are on the edge of the mobile image. In an embodiment, a side of the document is cut-off if any of the following criteria are met:

$$C1[I].x=C2[I].x=0 \quad (1)$$

where x=the x-coordinate of the corner $$C1[I].x=C2[I].x=\text{Width} \quad (2)$$

where Width=the width of the mobile image $$C1[I].y=C2[I].y=0 \quad (3)$$

where y=the y-coordinate of the corner $$C1[I].y=C2[I].y=\text{Height} \quad (4)$$

where Height=the height of the mobile image

If the side does not fall within the mobile image, the test result value is set to zero indicating that the mobile image failed the test (step 3430), and the test results are returned (step 3445).

If the side falls within the mobile image, a determination is made whether there are more sides to be tested (step 3425). If there are more sides to be tested, an untested side is selected (step 3415). Otherwise, all of the sides were within the mobile image, so the test result value for the test is set to 1000 indicating the test passed (step 3440), and the test result value is returned (step 3445).

Warped Image Test

The warped image test identifies images where document is warped. FIG. 35 illustrates an example of a mobile document image where the document is warped. In some embodiments, the preprocessing module 2110 can be configured to include de-warping functionality for correcting warped images. However, in some embodiments, a Warped Image Test is provided to detect and reject warped images. One solution for correcting warped images is to instruct the user to retake the image after flattening the hardcopy of the document being imaged.

FIG. 36 is a flow diagram of a method for identifying a warped image and for scoring the image based on how badly the document subimage is warped according to an embodiment. A warped image test score value is returned by the test, and this value can be compared with a threshold value by the test execution module 2130 to determine whether the image warping is excessive.

The mobile image is received (step 3605). In an embodiment, the height and width of the mobile image can be determined by the preprocessing module 2110. The corners of the document subimage are then identified in the mobile document image (step 3610). Various techniques can be used to identify the corners of the image, including the various techniques described above. In an embodiment, the preprocessing module 2110 identifies the corners of the document subimage.

A side of the document is selected (step 3615). According to an embodiment, the document subimage has four side and each side S[I] includes two adjacent corners C1[I] and C2[I].

A piecewise linear approximation is built for the selected side (step 3620). According to an embodiment, the piecewise-linear approximation is built along the selected side by following the straight line connecting the adjacent corners C1[I] and C2[I] and detecting position of the highest contrast starting from any position within [C1[I], C2[I]] segment and moving in orthogonal direction.

After the piecewise linear approximation is built along the [C1[I], C2[I]] segment, the [C1[I], C2[I]] segment is walked to compute the deviation between the straight line and the approximation determined using piecewise linear approximation (step 3625). Each time the deviation is calculated, a maximum deviation value (MaxDev) is updated to reflect the maximum deviation value identified during the walk along the [C1[I], C2[I]] segment.

The maximum deviation value for the side is then normalized to generate a normalized maximized deviation value for the selected size of the document image (step 3630). According to an embodiment, the normalized value can be determined using the following formula:

$$NormMaxDev[I]=1000*MaxDev[I]/Dim,$$

where Dim is the mobile image dimension perpendicular to side S[I].

An overall normalized maximum deviation value is then updated using the normalized deviation value calculated for the side. According to an embodiment, the overall maximum deviation can be determined using the formula:

$$OverallMaxDeviation=max(OverallMaxDeviation, NormMaxDev[I])$$

A determination is then made whether there are anymore sides to be tested (step 3640). If there are more sides to be tested, an untested side is selected for testing (step 3615). Otherwise, if no untested sides remain, the warped image test value is computed. According to an embodiment, the warped image test value can be determined using the following formula:

$$V=1000-OverallMaxDeviation$$

One can see that V lies within [0-1000] range used by the image IQA system and is equal to 1000 when the sides S[I] are straight line segments (and therefore no warp is present). The computed test result is then returned (step 3650). As described above, the test result value is provided to the test execution module 2130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may simply need to retake the image after flattening out the hardcopy of the document being imaged in order to reduce warping.

Image Size Test

The Image Size Test detects the actual size and the effective resolution of the document subimage. The perspective transformation that can be performed by embodiments of the preprocessing module 2110 allows for a quadrangle of any size to be transformed into a rectangle to correct for view distortion. However, a small subimage can cause loss of detail needed to process the subimage.

Figure 37:
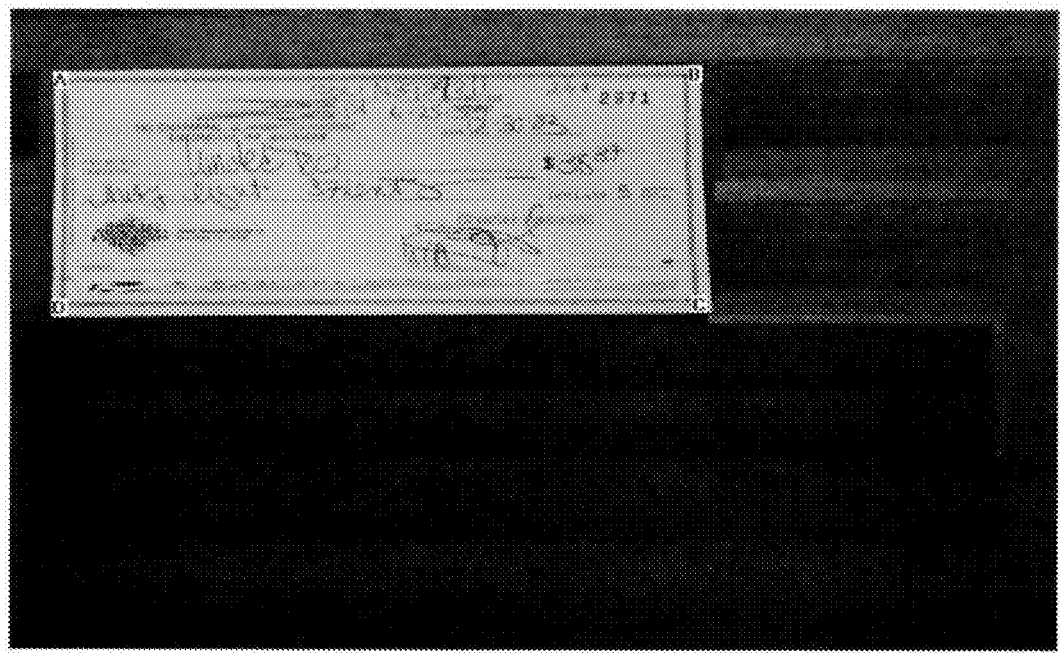
FIG. 37 illustrates an example of a document subimage within a mobile document image that is relatively small in comparison to the overall size of the mobile document image according to an embodiment.

FIG. 37 illustrates an example of a document subimage within a mobile document image that is relatively small. Small size of the subimage can cause the loss of important foreground information. This effect is similar to digital zooming in a digital camera where image of an object becomes larger, but the image quality of object can significantly degrade due to loss of resolution and important details can be lost.

FIG. 38 is a flow diagram of a process that for performing an Image Size Test on a subimage according to an embodiment. The mobile image is received (step 3805). In an embodiment, the height and width of the mobile image can be determined by the preprocessing module 2110. The corners of the document subimage are then identified in the mobile document image (step 3810). Various techniques can be used to identify the corners of the image, including the various techniques described above. In an embodiment, the preprocessing module 2110 identifies the corners of the document subimage. In the method the corners of the subimage are denoted as follows: A represents the top-left corner, B represents the top-right corner of the subimage, C represents the bottom-right corner of the subimage, and D represents the bottom-left corner of the subimage.

A subimage average width is computed (step 3815). In an embodiment, the subimage average width can be calculated using the following formula:

$$\text{Subimage average width as AveWidth}=(|AB|+|CD|)/2,$$

where |PQ| represents the Euclidian distance from point P to point Q.

A subimage average height is computed (step 3820). In an embodiment, the subimage average height can be calculated using the following formula:

$$AveHeight=(|BC|+|DA|)/2$$

The average width and average height values are then normalized to fit the 0-1000 range used by the mobile IQA tests (step 3822). The following formulas can be used determine the normalize the average width and height:

$$NormAveWidth=1000*AveWidth/Width$$

$$NormAveHeight=1000*AveWidth/Height$$

A minimum average value is then determined for the subimage (step 3825). According to an embodiment, the minimum average value is the smaller of the normalized average width and the normalized average height values. The minimum average value falls within the 0-1000 range used by the mobile IQA tests. The minimum average value will equal 1000 if the document subimage fills the entire mobile image.

The minimum average value is returned as the test result (step 3865). As described above, the test result value is provided to the test execution module 2130 where the test result value can be compared to a threshold value associated with the test. If the test result value falls below the threshold associated with the test, detailed test result messages can be retrieved from the test result message data store 2136 and provided to the user to indicate why the test failed and what might be done to remedy the test. For example, the user may simply need to retake the image by positioning the camera closer to the document.

MICR-Line Test

The MICR-line Test is used to determine whether a high quality image of a check front has been captured using the mobile device according to an embodiment. The MICR-line Test can be used in conjunction with a Mobile Deposit application to ensure that images of checks captures for processing with the Mobile Deposit information are of a high enough quality to be processed so that the check can be electronically deposited. Furthermore, if a mobile image fails the MICR-line Test, the failure may be indicative of incorrect subimage detections and/or poor overall quality of the mobile image, and such an image should be rejected anyway.

FIG. 39A is a flow chart of a method for executing a MICR-line Test according to an embodiment. A mobile image is received (step 3905) and a bitonal image is generated from the mobile image (step 3910). In an embodiment, preprocessor 110 extracts the document subimage from the mobile image as described above, including preprocessing such as geometric correction. The extracted subimage can then be converted to a bitonal snippet by the preprocessor 110. The MICR line is then identified in the bitonal snippet (step 3915). According to an embodiment, a MICR recognition engine is then applied to identify the MICR-line and to compute character-level and overall confidence values for the image (step 3920). These confidences can then be normalized to the 0-1000 scale used by the mobile IQA tests where 1000 means high quality and 0 means poor MICR quality. The confidence level is then returned (step 3925). As described above, the test result value is provided to the test execution module 2130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may simply need to retake the image to adjust for geometrical or other factors, such as poor lighting or a shadowed document. In some instances, the user may not be able to correct the errors. For example, if the MICR line on the document is damaged or incomplete and the document will continue to fail the test even if the image were retaken.

Code Line Test

The Code Line Test can be used to determine whether a high quality image of a remittance coupon front has been captured using the mobile device according to an embodiment. The Code Line Test can be used in conjunction with a Remittance Processing application to ensure that images of remittance coupon captures for processing with the Remittance Processing information are of a high enough quality to be processed so that the remittance can be electronically processed. Furthermore, if a mobile image fails the Code Line Test, the failure may be indicative of incorrect subimage detections and/or poor overall quality of the mobile image, and such an image should be rejected anyway.

FIG. 39B is a flow chart of a method for executing a Code Line Test according to an embodiment. A mobile image of a remittance coupon is received (step 3955) and a bitonal image is generated from the mobile image (step 3960). In an embodiment, preprocessor 110 extracts the document subimage from the mobile image as described above, including preprocessing such as geometric correction. The extracted subimage can then be converted to a bitonal snippet by the preprocessor 110. The code line is then identified in the bitonal snippet (step 3965). According to an embodiment, a code line recognition engine is then applied to identify the code line and to compute character-level and overall confidence values for the image (step 3970). These confidences can then be normalized to the 0-1000 scale used by the mobile IQA tests where 1000 means high quality and 0 means poor code line quality. The confidence level is then returned (step 3975). As described above, the test result value is provided to the test execution module 2130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may simply need to retake the image to adjust for geometrical or other factors, such as poor lighting or a shadowed document. In some instances, the user may not be able to correct the errors. For example, if the code line on the document is damaged or incomplete and the document will continue to fail the test even if the image were retaken.

Aspect Ratio Tests

The width of a remittance coupon is typically significantly longer than the height of the document. According to an embodiment, an aspect ratio test can be performed on a document subimage of a remittance coupon to determine whether the aspect ratio of the document in the image falls within a predetermined ranges of ratios of width to height. If the document image falls within the predetermined ranges of ratios, the image passes the test. An overall confidence value can be assigned to different ratio values or ranges of ratio values in order to determine whether the image should be rejected.

According to some embodiments, the mobile device can be used to capture an image of a check in addition to the remittance coupon. A second aspect ratio test is provided for two-sided documents, such as checks, where images of both sides of the document may be captured. According to some embodiments, a remittance coupon can also be a two-sided document and images of both sides of the document can be captured. The second aspect ratio test compares the aspect ratios of images that are purported to be of the front and back of a document to determine whether the user has captured images of the front and back of the same document according to an embodiment. The Aspect Ratio Test could be applied to various types two-sided or multi-page documents to determine whether images purported to be of different pages of the document have the same aspect ratio.

Figure 40:
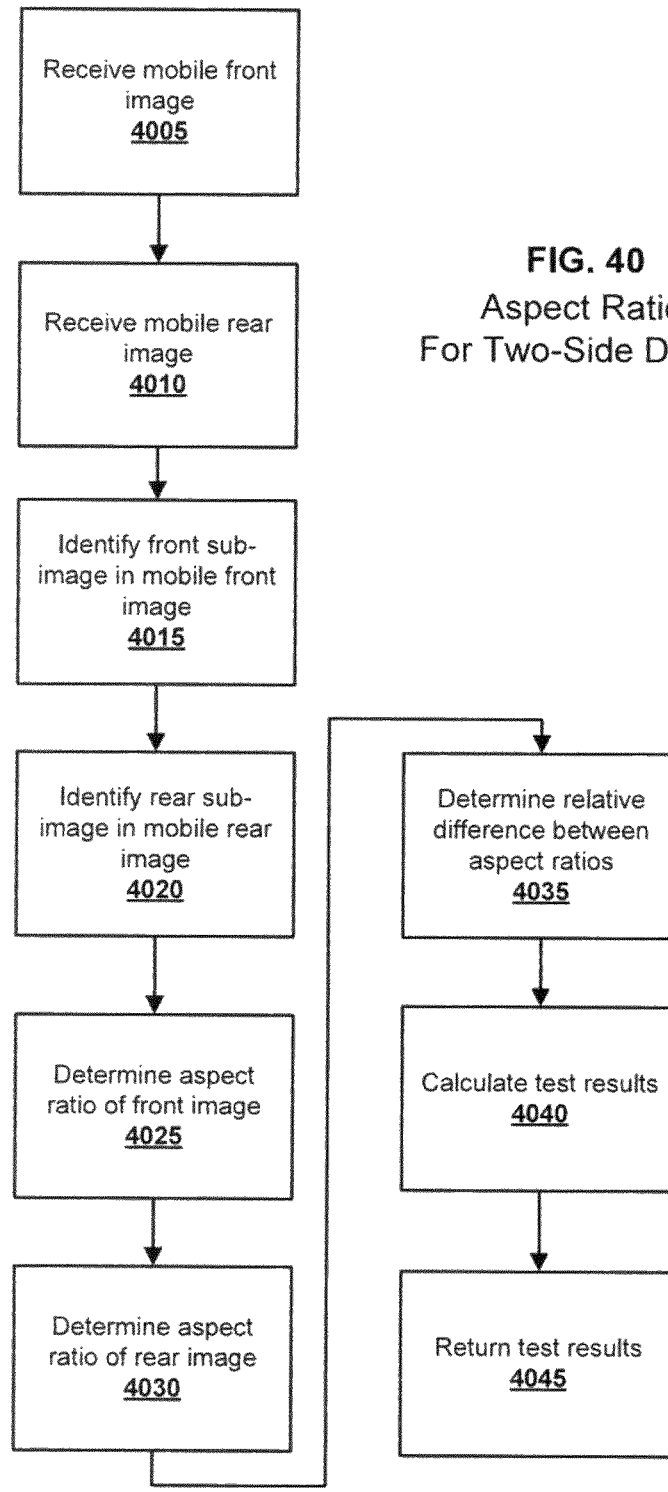
FIG. 40 illustrates a method for executing an Aspect Ratio Test according to an embodiment.

FIG. 40 illustrates a method for executing an Aspect Ratio Test for two-sided documents according to an embodiment. In the embodiment illustrated in FIG. 40, the test is directed to determining whether the images purported to be of the front and back side of a document have the same aspect ratio. However, the method could also be used to test whether two images purported to be from a multi-page and/or multi-sided document have the same aspect ratio.

A front mobile image is received (step 4005) and a rear mobile image is received (step 4010). The front mobile image is supposed to be of the front side of a document while the rear mobile image is supposed to be the back side of a document. If the images are really of opposite sides of the same document, the aspect ratio of the document subimages should match. Alternatively, images of two different pages of the same document may be provided for testing. If the images are really of pages of the same document, the aspect ratio of the document subimages should match.

The preprocessing module 2110 can process the front mobile image to generate a front-side snippet (step 4015) and can also process the back side image to generate a back-side snippet (step 4020).

The aspect ratio of the front-side snippet is then calculated (step 4025). In an embodiment, the AspectRatioFront=Width/Height, where Width=the width of the front-side snippet and Height=the height of the front-side snippet.

The aspect ratio of the back-side snippet is then calculated (step 4030). In an embodiment, the AspectRatioBack=Width/Height, where Width=the width of the back-side snippet and Height=the height of the back-side snippet.

The relative difference between the aspect ratios of the front and rear snippets is then determined (step 4035). According to an embodiment, the relative difference between the aspect ratios can be determined using the following formula:

$$\text{RelDiff}=1000*abs(\text{AspectRatioFront}-\text{AspectRatioBack})/\max(\text{AspectRatioFront}, \text{AspectRatioBack})$$

A test result value is then calculated based on the relative difference between the aspect ratios (step 4040). According to an embodiment, the test value V can be computed using the formula V=1000−RelDiff.

The test results are then returned (step 4045). As described above, the test result value is provided to the test execution module 2130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may have mixed up the front and back images from two different checks having two different aspect ratios. If the document image fails the test, the user can be prompted to verify that the images purported to be the front and back of the same document (or images of pages from the same document) really are from the same document.

Front-as-Rear Test

Figure 41:
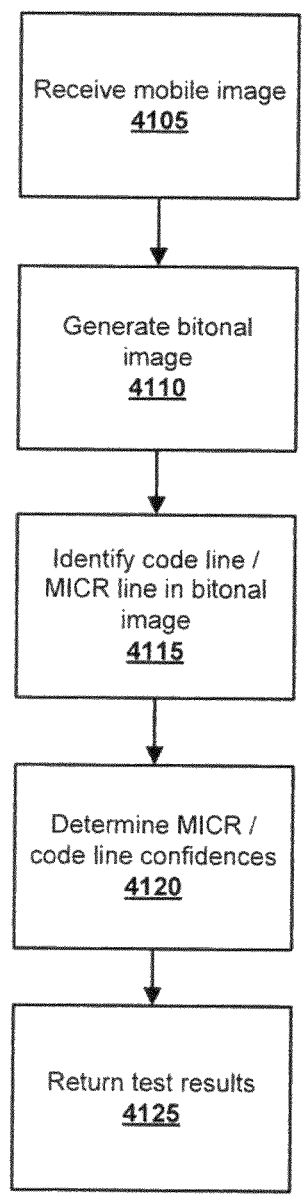
FIG. 41 illustrates a method for performing a front-as-rear test on a mobile document image.

FIG. 41 illustrates a method for performing a front-as-rear test on a mobile document image. The front-as-rear test can be adapted to be performed on images purported to be the front and back side of a check. The Front-as-Rear Test can be used to determine whether an image that is purported to be the back of a check is actually an image of the front of the document according to an embodiment. The Front-as-Rear Test can be used in embodiments where a user has captured an image of a check to be processed as payment for a remittance.

The Front-as-Rear Test is a check specific Boolean test. The test returns a value of 0 if an image fails the test and a value of 1000 if an image passes the test. According to an embodiment, if a MICR-line is identified on what is purported to be an image of the back of the check, the image will fail the test and generate a test message that indicates that the images of the check have been rejected because an image of the front of the check was mistakenly passed as an image of the rear of the check. Similarly, if a code line is identified on what is purported to be the back of a remittance coupon, the image will fail the test and generate a test message that indicates that the images of the remittance coupon have been rejected because an image of the front of the coupon was mistakenly passed as an image of the rear of the coupon.

An image of the rear of the document is received (step 4105) and the image is converted to a bitonal snippet by preprocessor 110 of the MDIPE 2100 (step 4110). The image may be accompanied by data indicating whether the image is of a check or of a remittance coupon. In some embodiments, no identifying information may be provided, and the testing will be performed to identify either a code line or an MICR line in the bitonal snippet.

If the document is identified as a check, a MICR recognition engine can then be applied to identify a MICR-line in the bitonal snippet (step 4115). Various techniques for identifying the MICR-line in an image of a check are described above. The results from the MICR recognition engine can then be normalized to the 0-1000 scale used by the mobile IQA tests, and the normalized value compared to a threshold value associated with the test. If the document is identified as a remittance coupon, a code line recognition engine can be applied to identify the code line in the image of the coupon. Various techniques for identifying the code line in an image of a remittance coupon are described above, such as identifying text in OCR-A font within the image. If no information as to whether the image to be tested includes a check or a remittance coupon is provided, both MICR-line and code line testing can be performed to see if either a MICR-line or code line can be found. In an embodiment, the highest normalized value from the MICR-line and code line tests can be selected for comparison to the threshold.

According to an embodiment, the test threshold can be provided as a parameter to the test along with the with mobile document image to be tested. According to an embodiment, the threshold used for this test is lower than the threshold used in the MICR-line Test described above.

If the normalized test result equals or exceeds the threshold, then the image includes an MICR-line or code line and the test is marked as failed (test result value=0), because a MICR-line or code line was identified in what was purported to be an image of the back of the document. If the normalized test result is less than the threshold, the image did not include a MICR line and the test is marked as passed (test result value=1000). The test results value is then returned (step 4125).

Form Identification of Remittance Coupon

According to an embodiment, the remittance processing step 525 of the method illustrated in FIG. 5 can include a form identification step. In the form identification step, the mobile remit server attempts to identify a coupon template that is associated with a remittance coupon that has been captured in a mobile image. A coupon template identifies the layout of information on a remittance coupon. This layout information can be used improve data capture accuracy because data should be in known locations on the remittance coupon.

Form identification can be used in a number of different situations. For example, form identification can be used for frequently processed remittance coupons. If the layout of the coupon is known, capturing the data from known locations on the coupon can be more accurate than relying on a dynamic data capture technique to extract the data from the coupon.

Form identification can also be used for remittance coupons that lack keywords that can be used to identify key data on the coupon. For example, if a coupon does not include an "Account Number" label for an account number field, the dynamic data capture may misidentify the data in that field. Misidentification can become even more likely if multiple fields have similar formats. Form identification can also be used for coupons having ambiguous data. For example, a remittance coupon might include multiple fields that include data having a similar format. If a remittance coupon includes multiple unlabeled fields having similar formats, dynamic data capture may be more likely to misidentify the data. However, if the layout of the coupon is known, the template information can be used to extract data from known positions in the image of the remittance coupon.

Form identification can also be used for remittance coupons having a non-OCR friendly layout. For example, a remittance coupon may use fonts where identifying keywords and/or form data is printed using a non-OCR friendly font. Form identification can also be used to improve the chance of correctly capturing remittance coupon data when a poor quality image is presented. A poor quality image of a remittance coupon can make it difficult to locate and/or read data from the remittance coupon.

Figure 42:
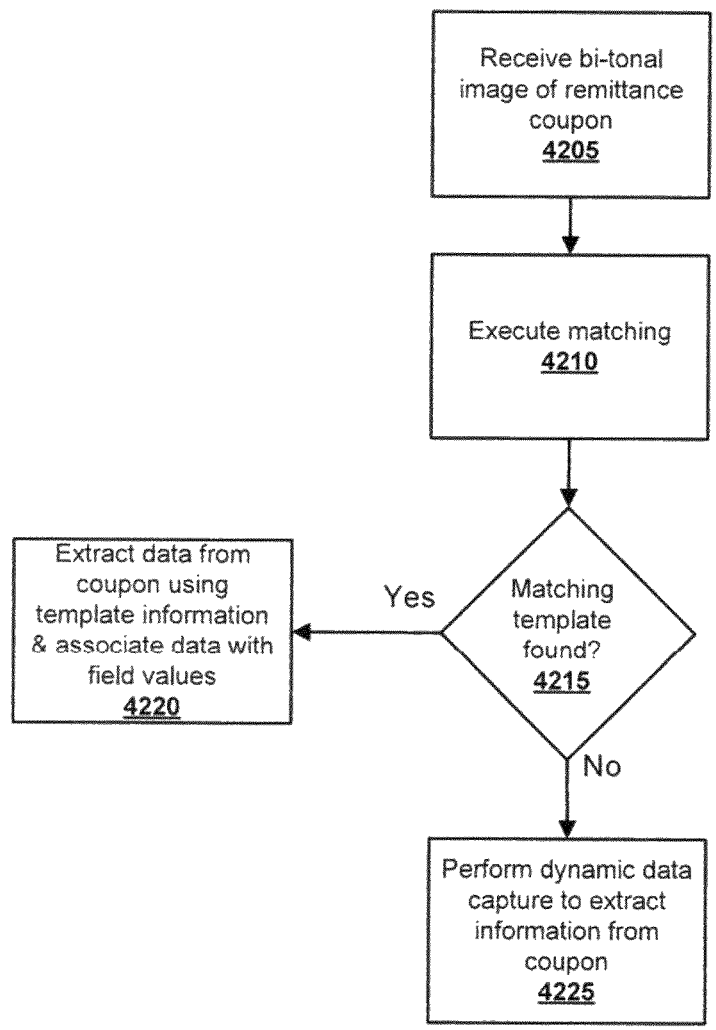
FIG. 42 is a flow chart of a method for processing an image of a remittance coupon using form identification according to an embodiment.

FIG. 42 is a flow chart of a method for processing an image of a remittance coupon using form identification according to an embodiment. The method of FIG. 42 can be executed in step 525 of the method illustrated in FIG. 5. According to an embodiment, the mobile remittance server can include a remittance processing module that can be configured to perform step 525 of the method illustrated in FIG. 5 and the method illustrated in FIG. 42. The method begins with receiving a binarized document image of a remittance coupon (step 4205). Various techniques for creating a bi-tonal subimage from a mobile image are provided above. For example, step 625 of FIG. 6 describes binarization of a document subimage. FIG. 10 also illustrates a method binarization of an image that can be used to generate a bi-tonal image from a mobile image of a remittance coupon.

A matching algorithm is executed on the bi-tonal image of the remittance coupon in an attempt to find a matching remittance coupon template (step 4210). According to an embodiment, the remittance server 310 can include a remittance template data store that can be used to store templates of the layouts of various remittance coupons. Various matching techniques can be used to match a template to an image of a coupon. For example, optical character recognition can be used to identify and read text content from the image. The types of data identified and the positions of the data on the remittance coupon can be used to identify a matching template. According to another embodiment, a remittance coupon can include a unique symbol or identifier that can be matched to a particular remittance coupon template. In yet other embodiments, the image of the remittance coupon can be processed to identify "landmarks" on the image that may correspond to labels and/or data. In some embodiments, these landmarks can include, but are not limited to positions of horizontal and/or vertical lines on the remittance coupon, the position and/or size of boxes and/or frames on the remittance coupon, and/or the location of pre-printed text. The position of these landmarks on the remittance coupon may be used to identify a template from the plurality of templates in the template data store. According to some embodiments, a cross-correlation matching technique can be used to match a template to an image of a coupon. In some embodiments, the positions of frames/boxes found on image and/or other such landmarks, can be cross-correlated with landmark information associated a template to compute the matching confidence score. If the confidence score exceeds a predetermined threshold, the template is considered to be a match and can be selected for use in extracting information from the mobile image of the remittance coupon.

A determination is made whether a matching template has been found (step 4215). If no matching template is found, a dynamic data capture can be performed on the image of the remittance coupon (step 4225). Dynamic data capture is described in detail below and an example method for dynamic data capture is illustrated in the flow chart of FIG. 43.

If a matching template is found, data can be extracted from the image of the remittance coupon using the template (step 4220). The template can provide the location of various data, such as the code line, amount due, account holder name, and account number. Various OCR techniques can be used to read text content from the locations specified by the template. Because the location of various data elements are known, ambiguities regarding the type of data found can be eliminated. The mobile remittance server 310 can distinguish between data elements having a similar data type.

Dynamic Data Capture

Figure 43:
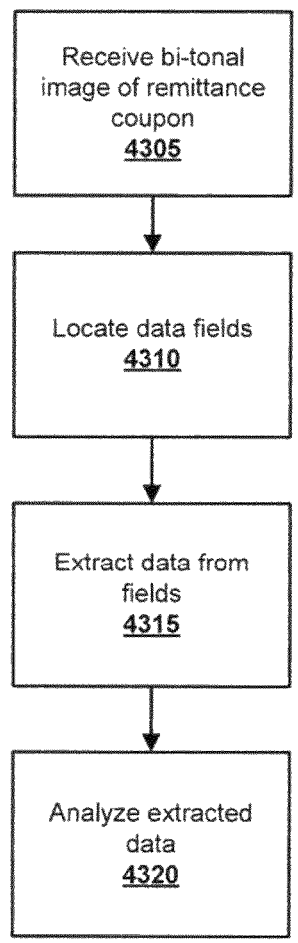
FIG. 43 is a flow chart of a method for processing an image of a remittance coupon using form identification according to an embodiment.

FIG. 43 is a flow chart of a dynamic data capture method for extracting data from an image of a remittance coupon using form identification according to an embodiment. The method of FIG. 42 can be executed in step 525 of the method illustrated in FIG. 5. The dynamic data capture method illustrated in FIG. 43 can be used if a form ID for identifying a particular format of remittance coupon is not available. The form ID can be provided by a user or in some instance be read from the image of the remittance coupon. The method illustrated in FIG. 43 can also be used if the form ID does not match any of the templates stored in the template data store. The method begins with receiving a binarized document image of a remittance coupon (step 4305). Various optical character recognition techniques can then be used to locate and read fields from the bitonal image of the remittance coupon (step 4310). Some example OCR techniques are described below. Once data fields have been located the data can be extracted from the image of the remittance coupon (step 4315). In some embodiments, steps 4310 and 4315 can be combined into a single step where the field data is located and the data extracted in a combined OCR step. Once the data has been extracted from the image, the data can be analyzed to identify what data has been extracted (step 4320). The data can also be analyzed to determine whether any additional data is required in order to be able to process the remittance coupon.

According to an embodiment, a keyword-based detection technique can be used to locate and read the data from the bitonal image of the remittance coupon in steps 4310 and 4315 of the method of FIG. 43. The method uses a set of field-specific keywords to locate fields of interest in the bitonal image. For example, the keywords "Account Number," "Account #," "Account No.," "Customer Number," and/or other variations can be used to identify the account number field on the remittance coupon. According to an embodiment, text located proximate to the keyword can be associated with the keyword. For example, text located within a predetermined distance to the right of or below an "Account Number" keyword could be identified and extracted from the image using OCR and the text found in this location can then be treated as the account number. According to an embodiment, the distance and directions in relation to the keyword in which the field data can be located can be configured based on the various parameters, such as locale or language. The position of the keyword in relation to field that includes the data associated with the keyword could vary based on the language being used, e.g. written right to left versus left to right.

According to an embodiment, a format-based detection technique can be used to locate and read the data from the bitonal image of the remittance coupon in steps 4310 and 4315 of the method of FIG. 43. For example, an OCR technique can be used to recognize text in the image of the remittance coupon. A regular expression mechanism can then be applied to the text extracted from the bitonal image. A regular expression can be used to formalize the format description for a particular field, such as "contains 7-12 digits," "may start with 1 or 2 uppercase letters," or "contains the letter "U" in the second position." According to an embodiment, multiple regular expressions could be associated with a particular field, such as an account number, in order to increase the likelihood of a correct match.

According to yet another embodiment, a combination of keyword-based and format-based matching can be used to identify and extract field data from the bitonal image (steps 4310 and 4315). This approach can be particularly effective where multiple fields of the same or similar format are included on the remittance coupon. A combination of keyword-based and format-based matching can be used to identify field data can be used to disambiguate the data extracted from the bitonal image.

According to an embodiment, a code-line validation technique can be used to locate and read the data from the bitonal image of the remittance coupon in steps 4310 and 4315 of the method of FIG. 43. One or more fields may be embedded into the code-line, such as amount field 215 on the coupon shown in FIG. 2, which appears in the code line 205. While parsing the code line itself may be difficult, code-line characters can be cross-checked against fields recognized in other parts of the remittance coupon. According to an embodiment, in the event that a particular field is different from a known corresponding value in the code line, the value in the code line can be selected over the field value because the code-line recognition may be more reliable.

According to an embodiment, a cross-validation technique can be used where multiple bitonal images of a remittance coupon have been captured, and one or more OCR techniques are applied the each of the bitonal images, such as the techniques described above. The results from the one or more OCR technique from one bitonal image can be compared to the results of OCR techniques applied one or more other bitonal images in order to cross-validate the field data extracted from the images. If conflicting results are found, a set of results having a higher confidence value can be selected to be used for remittance processing.

Exemplary Hardware Embodiments

Figure 44:
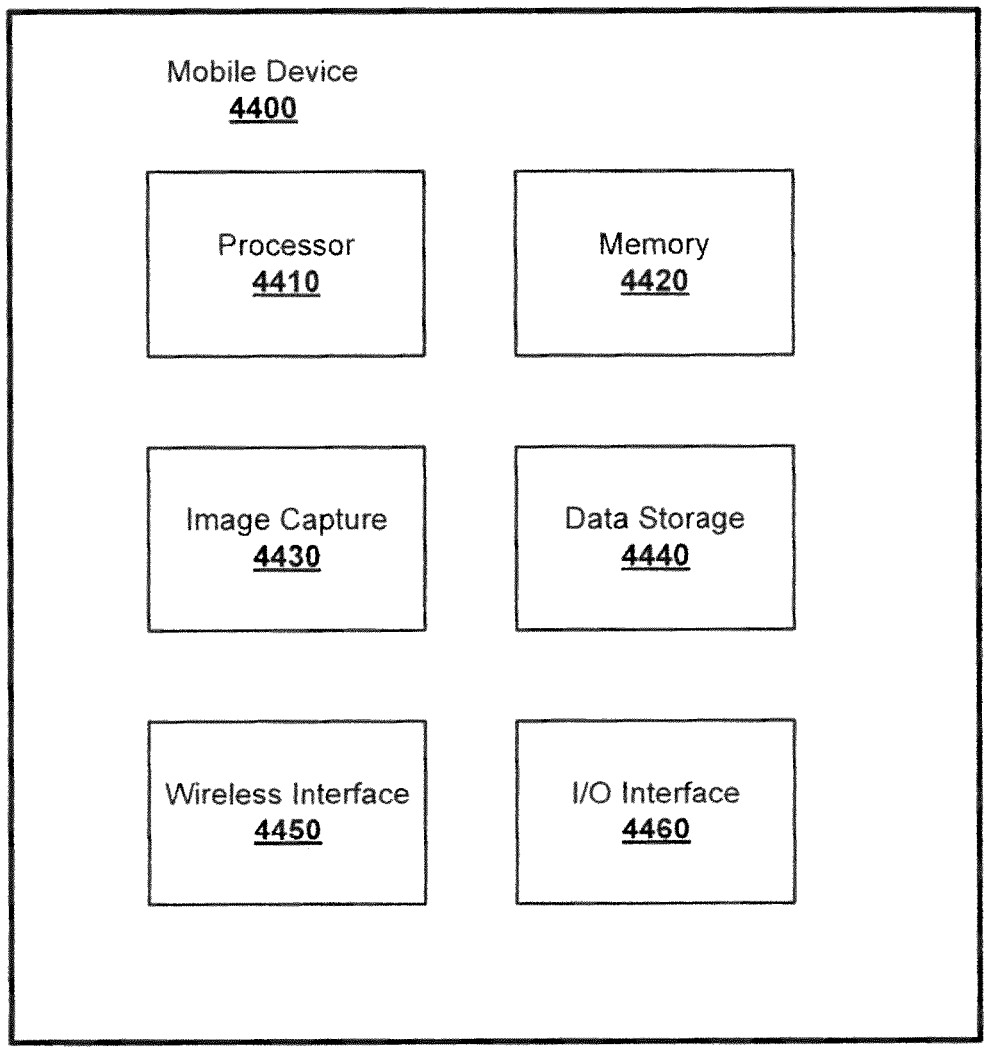
FIG. 44 is a block diagram of various functional elements of a mobile device that can be used with the various systems and methods described herein according to an embodiment.

FIG. 44 is an exemplary embodiment of a mobile device 4400 according to an embodiment. Mobile device 4400 can be used to implement the mobile device 340 of FIG. 3. Mobile device 4200 includes a processor 4410. The processor 4410 can be a microprocessor or the like that is configurable to execute program instructions stored in the memory 4420 and/or the data storage 4440. The memory 4420 is a computer-readable memory that can be used to store data and or computer program instructions that can be executed by the processor 4410. According to an embodiment, the memory 4420 can comprise volatile memory, such as RAM and/or persistent memory, such as flash memory. The data storage 4440 is a computer readable storage medium that can be used to store data and or computer program instructions. The data storage 4440 can be a hard drive, flash memory, a SD card, and/or other types of data storage.

The mobile device 4400 also includes an image capture component 4430, such as a digital camera. According to some embodiments, the mobile device 4400 is a mobile phone, a smart phone, or a PDA, and the image capture component 4430 is an integrated digital camera that can include various features, such as auto-focus and/or optical and/or digital zoom. In an embodiment, the image capture component 4430 can capture image data and store the data in memory 4220 and/or data storage 4440 of the mobile device 4400.

Wireless interface 4450 of the mobile device can be used to send and/or receive data across a wireless network. For example, the wireless network can be a wireless LAN, a mobile phone carrier's network, and/or other types of wireless network.

I/O interface 4460 can also be included in the mobile device to allow the mobile device to exchange data with peripherals such as a personal computer system. For example, the mobile device might include a USB interface that allows the mobile to be connected to USB port of a personal computer system in order to transfers information such as contact information to and from the mobile device and/or to transfer image data captured by the image capture component 4430 to the personal computer system.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of processes used in conjunction with the operations described herein are implemented in whole or in part using software, in one embodiment, these software elements can be implemented to operate with a computing or processing module capable of carrying out the functionality described with respect thereto. One such example-computing module is shown in FIG. 43. Various embodiments are described in terms of this example-computing module 1900. After reading this description, it will become apparent to a person skilled in the relevant art how to implement the invention using other computing modules or architectures.

Referring now to FIG. 43, computing module 1900 may represent, for example, computing or processing capabilities found within desktop, laptop and notebook computers; mainframes, supercomputers, workstations or servers; or any other type of special-purpose or general-purpose computing devices as may be desirable or appropriate for a given application or environment. Computing module 1900 might also represent computing capabilities embedded within or otherwise available to a given device. For example, a computing module might be found in other electronic devices. Computing module 1900 might include, for example, one or more processors or processing devices, such as a processor 1904. Processor 1904 might be implemented using a general-purpose or special-purpose processing engine such as, for example, a microprocessor, controller, or other control logic.

Computing module 1900 might also include one or more memory modules, referred to as main memory 1908. For example, random access memory (RAM) or other dynamic memory might be used for storing information and instructions to be executed by processor 1904. Main memory 1908 might also be used for storing temporary variables or other intermediate information during execution of instructions by processor 1904. Computing module 1900 might likewise include a read only memory ("ROM") or other static storage device coupled to bus 1902 for storing static information and instructions for processor 1904.

The computing module 1900 might also include one or more various forms of information storage mechanism 1910, which might include, for example, a media drive 1912 and a storage unit interface 1920. The media drive 1912 might include a drive or other mechanism to support fixed or removable storage media 1914. For example, a hard disk drive, a floppy disk drive, a magnetic tape drive, an optical disk drive, a CD or DVD drive (R or RW), or other removable or fixed media drive. Accordingly, storage media 1914 might include, for example, a hard disk, a floppy disk, magnetic tape, cartridge, optical disk, a CD or DVD, or other fixed or removable medium that is read by, written to or accessed by media drive 1912. As these examples illustrate, the storage media 1914 can include a computer usable storage medium having stored therein particular computer software or data.

In alternative embodiments, information storage mechanism 1910 might include other similar instrumentalities for allowing computer programs or other instructions or data to be loaded into computing module 1900. Such instrumentalities might include, for example, a fixed or removable storage unit 1922 and an interface 1920. Examples of such storage units 1922 and interfaces 1920 can include a program cartridge and cartridge interface, a removable memory (for example, a flash memory or other removable memory module) and memory slot, a PCMCIA slot and card, and other fixed or removable storage units 1922 and interfaces 1920 that allow software and data to be transferred from the storage unit 1922 to computing module 1900.

Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1924 might typically be carried on signals, which can be electronic, electromagnetic (which includes optical) or other signals capable of being exchanged by a given communications interface 1924. These signals might be provided to communications interface 1924 via a channel 1928. This channel 1928 might carry signals and might be implemented using a wired or wireless communication medium. These signals can deliver the software and data from memory or other storage medium in one computing system to memory or other storage medium in computing system 1900. Some examples of a channel might include a phone line, a cellular link, an RF link, an optical link, a network interface, a local or wide area network, and other wired or wireless communications channels.

Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMAX, 802.XX or other interface), a communications port (such as for example, a USB port, IR port, RS232 port, Bluetooth interface, or other port), or other communications interface. Software and data transferred via communications interface 1924 might typically be carried on signals, which can be electronic, electromagnetic, optical or other signals capable of being exchanged by a given communications interface 1924. These signals might be provided to communications interface 1924 via a channel 1928. This channel 1928 might carry signals and might be implemented using a wired or wireless medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 1908, storage unit 1920, and media 1914. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1900 to perform features or functions of the present invention as discussed herein.

While various embodiments of the present invention have been described above, it should be understood that they have been presented by way of example only, and not of limitation. The breadth and scope of the present invention should not be limited by any of the above-described exemplary embodiments. Where this document refers to technologies that would be apparent or known to one of ordinary skill in the art, such technologies encompass those apparent or known to the skilled artisan now or at any time in the future. In addition, the invention is not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the present invention.

Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method of processing balance transfers using a mobile device, comprising:
  receiving a mobile image of a financial statement captured with the mobile device;
  detecting the financial statement within the mobile image of the financial statement;
  generating a document sub-image that includes a portion of the mobile image that corresponds to the financial statement;
  geometrically correcting the document sub-image of the financial statement to generate a geometrically corrected image;
  processing the geometrically corrected image to generate a processed image;
  executing one or more mobile image quality assurance tests on the processed image to assess the quality of the processed image;
  extracting information from the processed image;
  transmitting the information to a remote server;
  creating a balance transfer offer based on the information; and
  transmitting the balance transfer offer to the mobile device.

2. The method of claim 1, wherein the financial statement is a credit card statement.

3. The method of claim 2, wherein the information includes at least one of a credit card number, a balance, an interest rate, an account number, a bank routing number, a yield, a cost, a fee, a user name, a user address, a user phone number, and a user e-mail address.

4. The method of claim 3, wherein the information is extracted from the mobile image by identifying at least one of a credit card number field, a balance field, an interest rate field, an account number field, a bank routing number field, a yield field, a cost field, a fee field, a user name field, a user address field, a user phone number field, and a user e-mail address field.

5. The method of claim 1, further comprising displaying the balance transfer offer on a display of the mobile device.

6. The method of claim 1, further comprising determining a balance transfer offer based on a credit history of a user.

7. The method of claim 1, wherein the remote server is located at a financial institution.

8. The method of claim 1, wherein the extraction of information from the processed image, the transmission of information to the remote server, the creation of the balance transfer offer and the transmission of the balance transfer offer to the mobile device are performed in real-time.

9. The method of claim 1, wherein a plurality of balance transfer offers is created and transmitted to the mobile device.

10. A system for processing balance transfers using a mobile device, comprising:
- a receiving unit which receives a mobile image of a financial statement captured with the mobile device;
- an image correction unit which is configured to:
  - detect the financial statement within the mobile image of the financial statement;
  - generate a document sub-image that includes a portion of the mobile image that corresponds to the financial statement;
  - geometrically correct the document sub-image of the financial statement to generate a geometrically corrected image;
  - process the geometrically corrected image to generate a processed image;
  - execute one or more mobile image quality assurance tests on the processed image to assess the quality of the processed image;
- an extraction unit which extracts information from the processed image;
- a communication unit which transmits the information to a remote server; and
- a calculation unit at the remote server which creates a balance transfer offer based on the information;
- wherein the communication unit receives the balance transfer offer from the calculation unit and transmits the balance transfer offer to the mobile device.

11. The system of claim 10, wherein the financial statement is a credit card statement.

12. The system of claim 11, wherein the information includes at least one of a credit card number, a balance, an interest rate, an account number, a bank routing number, a yield, a cost, a fee, a user name, a user address, a user phone number and a user e-mail address.

13. The system of claim 12, wherein the extraction unit extracts the information from the mobile image by identifying at least one of a credit card number field, a balance field, an interest rate field, an account number field, a bank routing number field, a yield field, a cost field, a fee field, a user name field, a user address field, a user phone number field and a user e-mail address field.

14. The system of claim 10, further comprising an image capture unit on the mobile device which captures the mobile image of a financial statement.

15. The system of claim 14, further comprising a display unit on the mobile device which displays the balance transfer offer to a user.

16. The system of claim 10, wherein the calculation unit determines the balance transfer offer based on a credit history.

17. The system of claim 10, wherein the remote server is located at a financial institution.

18. The system of claim 10, wherein the extraction of information from the processed image, the transmission of information to the remote server, the creation of the balance transfer offer and the transmission of the balance transfer offer to the mobile device are performed in real-time.

19. The system of claim 10, wherein the calculation unit creates a plurality of balance transfer offers.

* * * * *